United States Patent
Uehama et al.

(10) Patent No.: US 8,220,426 B2
(45) Date of Patent: Jul. 17, 2012

(54) VALVE TIMING CONTROL DEVICE

(75) Inventors: Motoki Uehama, Kariya (JP); Yasushi Morii, Nagoya (JP)

(73) Assignee: Denso Corporation, Kariya (JP)

( * ) Notice: Subject to any disclaimer, the term of this patent is extended or adjusted under 35 U.S.C. 154(b) by 369 days.

(21) Appl. No.: 12/602,842

(22) PCT Filed: Jun. 2, 2008

(86) PCT No.: PCT/JP2008/001385
§ 371 (c)(1),
(2), (4) Date: Dec. 3, 2009

(87) PCT Pub. No.: WO2008/149538
PCT Pub. Date: Dec. 11, 2008

(65) Prior Publication Data
US 2010/0180844 A1    Jul. 22, 2010

(30) Foreign Application Priority Data

Jun. 4, 2007 (JP) ................................. 2007-148607
May 16, 2008 (JP) ................................. 2008-130009

(51) Int. Cl.
*F01L 1/34* (2006.01)
(52) U.S. Cl. .................. 123/90.15; 123/90.17; 318/689; 464/160
(58) Field of Classification Search .............. 123/90.15, 123/90.17; 464/1, 2, 160; 318/689
See application file for complete search history.

(56) References Cited

U.S. PATENT DOCUMENTS

| 7,669,568 B2 * | 3/2010 | Sugiura et al. ............. 123/90.17 |
| 2005/0199200 A1 | 9/2005 | Miyakoshi et al. |
| 2006/0207539 A1 | 9/2006 | Miyakoshi |
| 2007/0295294 A1 | 12/2007 | Morii et al. |
| 2008/0083383 A1 | 4/2008 | Sudou |
| 2008/0083384 A1 | 4/2008 | Morii |

FOREIGN PATENT DOCUMENTS

| JP | 2003-129805 | 5/2003 |
| JP | 2004-132323 | 4/2004 |
| JP | 2004-156508 | 6/2004 |
| JP | 2005-054754 | 2/2005 |
| JP | 2005-076518 | 3/2005 |
| JP | 2005-146993 | 6/2005 |
| JP | 2006-274959 | 10/2006 |

OTHER PUBLICATIONS

Korean Office Action dated Jun. 24 2011, issued in corresponding Korean Application No. 10-2009-7027260 with English Translation.
International Search Report for PCT/JP2008/001385, mailed Sep. 9, 2008.
Written Opinion of the International Searching Authority and partial translation for PCT/JP2008/001385, mailed Sep. 9, 2008.
Chinese Office Action dated Jun. 20, 2011, issued in corresponding Chinese Application No. 200880008010.2 with English Translation.

* cited by examiner

*Primary Examiner* — Ching Chang
(74) *Attorney, Agent, or Firm* — Nixon & Vanderye PC

(57) ABSTRACT

A valve timing control device is provided with an electric motor (4) generating a magnetic retaining torque (Th) and a motor torque (Tm) in a motor shaft (102) based on a power supply. A power supply control system (6) controls the motor torque (Tm) by controlling the power supply supplied to the electric motor (4). A phase control mechanism (8) transmits a cam torque (Tca) that can alternate between a positive and a negative direction in response to rotation of a cam shaft, to the motor shaft (102) and controls a relative phase between the crank shaft and the cam shaft in accordance with a torque balance in the motor shaft (102). The power supply control system (6) eliminates the motor torque (Tm) that is balanced with the magnetic retaining torque (Th) and the cam torque (Tca) after a stop of the internal combustion engine (S105).

32 Claims, 38 Drawing Sheets

FIG. 10

| POWER SUPPLY PATTERN | DRIVE SIGNAL | | | | | |
|---|---|---|---|---|---|---|
| | UPPER | | | LOWER | | |
| | FU | FV | FW | GU | GV | GW |
| i | L | H | L | P | L | L |
| ii | L | L | H | P | L | L |
| iii | L | L | H | L | P | L |
| iv | H | L | L | L | P | L |
| v | H | L | L | L | L | P |
| vi | L | H | L | L | L | P |

FIG. 11

| POWER SUPPLY PATTERN | DRIVE SIGNAL | | | | | |
|---|---|---|---|---|---|---|
| | UPPER | | | LOWER | | |
| | FU | FV | FW | GU | GV | GW |
| i | H | L | L | L | P | L |
| ii | H | L | L | L | L | P |
| iii | L | H | L | L | L | P |
| iv | L | H | L | P | L | L |
| v | L | L | H | P | L | L |
| vi | L | L | H | L | P | L |

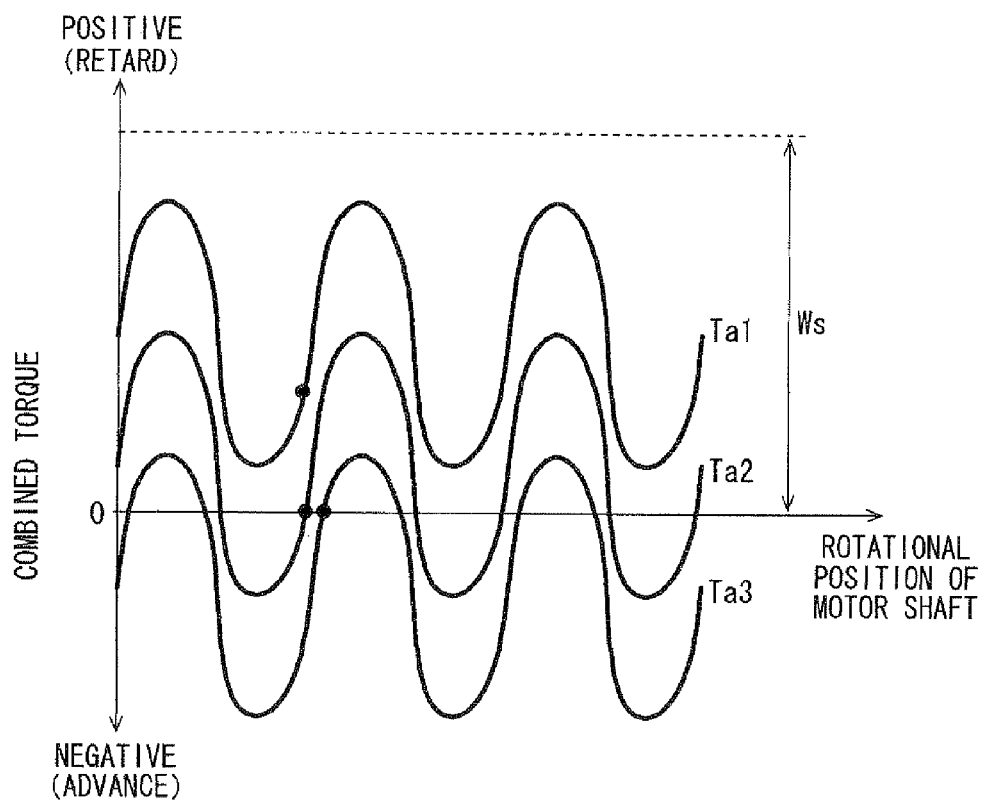

VALVE TIMING CONTROL DEVICE

CROSS REFERENCE TO RELATED APPLICATION

This application is the U.S. national phase of International Application No. PCT/JP2008/001385 filed Jun. 2, 2008, which designated the U.S. and claims priority to Japanese Patent Application No. 2007-148607 filed on Jun. 4, 2007 and Japanese Patent Application No. 2008-130009 filed on of May 16, 2008, the entire contents of each of which are hereby incorporated by reference.

TECHNICAL FIELD

The present application is related to a valve timing control device in an internal combustion engine for controlling valve timing of at least one of an intake valve and an exhaust valve opened/closed by a cam shaft through torque transmission from a crank shaft.

BACKGROUND ART

A conventional valve timing control device controls a relative phase between a crank shaft and a cam shaft, which is hereinafter referred to as an "engine phase," to determine a valve timing by applying torque generated by an electric motor or an electromagnetic actuator such as an electromagnetic brake device to a phase control mechanism. JP2005-146993A describes a valve timing control device that ensures start performance of an internal combustion engine by retaining the engine phase of the internal combustion engine, which is in a stop state, in a start phase allowing start of the internal combustion engine.

The control device is provided with an electromagnetic brake device that operates during the stop state of the internal combustion engine to apply brake torque from a brake shaft to the phase control mechanism. As a result, in the stop state of the internal combustion, the brake torque of the electromagnetic brake device acting on the brake shaft and the spring torque of the phase control mechanism are made to be balanced, thereby retaining the engine phase in the start phase.

The above described electromagnetic brake device that operates at the stop state of the internal combustion engine is provided in addition to an electromagnetic brake device controlling the engine phase by applying the brake torque from the brake shaft to the phase control mechanism in an operating state of the internal combustion engine. Therefore, such a device leads to increased complexity and size of the device structure. In the operating state of the internal combustion engine, cam torque alternating between a positive and a negative direction in response to rotation of the cam shaft is transmitted through the phase control mechanism to the brake shaft. The cam torque acts on the brake shaft as positive torque or negative torque while the internal combustion engine is in the stop state. The torque balance in the brake shaft is disrupted depending upon the positive or the negative direction of the cam torque or the magnitude of the cam torque, possibly creating a large shift of the engine phase from the start phase.

The present application is associated with using an electric motor as an electromagnetic actuator by generating a magnetic retaining torque such as cogging torque in a motor shaft even when power is removed due to stopping of the internal combustion engine. According to various exemplary embodiments, in an operating state of the internal combustion engine, the engine phase is controlled by applying motor torque to a phase control mechanism. The motor torque is generated in the motor shaft by supplying power to the electric motor. In the stop state of the internal combustion engine, the engine torque is retained to the start phase by balancing the magnetic retaining torque generated in the electric motor with the cam torque. By controlling the engine phase in the operating state of the internal combustion engine and the retaining of a desired engine phase when the engine is in the stop state with the electric motor, it is possible to achieve simplification and downsizing of the device structure.

According to various studies conducted in connection with the present application, since the magnetic retaining torque alternates between a positive and a negative torque direction in response to the rotation of the motor shaft, it becomes difficult to balance the torques when a direction of the cam torque is in agreement with a direction of the magnetic retaining torque whether in a positive or negative direction, at a point where the motor torque is eliminated by the removing the power. Further, in a state where the magnetic retaining torque and the cam torque can not be balanced, it has been discovered that the motor shaft is made to rotate and therefore, when the magnetic retaining torque is averaged by alternation thereof between the positive and negative direction, damping of the rotation can not be obtained.

DISCLOSURE OF THE INVENTION

The present application has been made based upon the above described studies and the findings and an object is to provide a valve timing control device that ensures start performance of an internal combustion engine.

According to various embodiments, a valve timing control device includes an electric motor for generating magnetic retaining torque and motor torque in a motor shaft by supplying power thereto, a control unit for controlling the motor torque by controlling the power supplied to the electric motor, and a phase control mechanism for transmitting a cam torque to the motor shaft, the cam torque alternating between a positive and a negative torque, the cam torque transmitted in response to rotation of the cam shaft, the cam torque transmitted to control an engine phase in accordance with a torque balance in the motor shaft. The control unit includes balancing means for balancing the motor torque with the magnetic retaining torque and the cam torque even after the internal combustion engine is stopped, and eliminating means for eliminating the motor torque balanced with the magnetic retaining torque and the cam torque by the balancing means.

According to the above described construction, by balancing the motor torque with the magnetic retaining torque and the cam torque through the controlling of the power supply to the electric motor after the stop of the internal combustion engine, it is possible to realize the engine phase in accordance with the torque balance. By removing the motor torque when balanced with the magnetic retaining torque and the cam torque through the controlling of the power supply to the electric motor causes the magnetic retaining torque and the cam torque to be more easily balanced at the point when the torque is removed. By balancing the magnetic retaining torque and the cam torque at the point when the motor torque is removed, a phase shift from the engine phase realized in accordance with the torque balance before the motor torque is restricted. Therefore, it is possible to ensure the start performance of the internal combustion engine by retaining the engine phase in the start phase after the motor torque is removed.

According to a different aspect, the eliminating means gradually reduces the motor torque set by the balancing means against the cam torque in such a manner as to balance with the magnetic retaining torque and the cam torque. Such a construction can restrict a rapid change of the torque balance in the motor shaft and also at the same time, eliminate the motor torque. Accordingly, it is possible to avoid the event that the magnetic retaining torque and the cam torque can not be balanced at the elimination point of the motor torque due to the rapid rotation of the motor shaft by the rapid change of the torque balance.

According to a different aspect, the eliminating means gradually reduces a power supply amount to the electric motor. According to such a construction, since the motor torque is also gradually reduced with the gradual reduction of the power supply amount to the electric motor, it is possible to enhance a rapid change restricting effect of the torque balance in the motor shaft by controlling a time for reducing, for example, a rate of the power supply amount, or the like.

According to a different aspect, the eliminating means applies a braking force to the motor shaft by controlling the power supply to the electric motor. According to such a construction, since the motor torque is gradually reduced with an application of the braking force to the motor shaft, for example, it is possible to enhance a rapid change restricting effect of the torque balance in the motor shaft by efficiently controlling the application of the braking force to the rotation of the motor shaft or the like.

Since a friction force is unavoidably generated between movable elements in the phase control mechanism or in the electric motor, the friction force possibly affects the torque balance in the motor shaft. Therefore, according to a different aspect, after the eliminating means first reduces the motor torque to a zero value, the balancing means gradually reduces the motor torque balanced with the magnetic retaining torque and the cam torque. According to such a construction, when the motor torque is first reduced to a zero value, the motor shaft is rapidly rotated, but the friction force generated in the phase control mechanism or in the electric motor is primarily composed of a dynamic friction force. Therefore, after the motor torque is first reduced to a zero value, when the motor torque is balanced with the magnetic retaining torque and the cam torque, the influence of the friction force to the torque balance can be reduced to be small. Accordingly, it is possible to avoid an event that, after the motor torque is balanced with the magnetic retaining torque and the cam torque is gradually reduced to be eliminated, the friction force reduces after the elimination, thereby resulting in rotation of the motor shaft.

In a state where the motor torque is not correctly balanced against the cam torque, that is, the motor torque assists the cam torque, it becomes potentially difficult to restrict the rapid rotation of the motor shaft. Therefore, according to a different aspect, the control unit includes torque direction determining means for determining a cam torque direction represented as a positive or a negative direction of the cam torque acting on the motor shaft, and the eliminating means gradually reduces the motor torque generated by the balancing means in the reverse direction of the determined direction of the cam torque direction by the torque direction determining means. According to such a construction, when the motor torque in the reverse direction of the cam torque direction determined as an operational direction of the cam torque to the motor shaft is gradually reduced as the torque correctly opposing the cam torque, the rapid rotation of the motor shaft can be restricted:

According to a different aspect, the balancing means provides feedback-control of the power supply to the electric motor based upon a phase difference between an actual phase and a target phase of the engine phase to balance the motor torque with the magnetic retaining torque and the cam torque, and the torque direction determining means determines the cam torque direction based upon a shift generated in the actual phase and at least one physical amount that correlates with the actual phase by the feedback control of the balancing means. According to such a construction, in a state where the power supply to the electric motor is feedback-controlled based upon the phase difference between the actual phase and the target phase to balance the motor torque with magnetic retaining torque and the cam torque, the shift in accordance with the cam torque direction is generated in the actual phase and the correlating physical amount. Therefore, the cam torque direction can be determined based upon the shift of the actual phase and the correlating physical amount.

According to a different aspect, the control unit includes correctness/incorrectness determining means for determining correctness/incorrectness of the determination direction based upon a correlation between a change state of the actual phase of the engine phase generated by generating the motor torque in the reverse direction of the determination direction and a direction of the motor torque. According to such a construction, when the determination direction of the cam torque direction is correct, the change state of the actual phase generated by the motor torque in the reverse direction of the determination direction depends on the motor torque direction. Therefore, the correctness/incorrectness of the determination direction can be determined based upon the correlation between the change state of the actual phase of the engine phase generated by the motor torque in the reverse direction of the determination direction and the direction of the motor torque.

According to a different aspect, the eliminating means gradually reduces the motor torque balanced with the magnetic retaining torque and the cam torque, by reversing the motor torque direction by the balancing means when the correctness/incorrectness determining means makes a determination that the determination direction is incorrect. According to such a construction, when the determination direction is incorrect, after the motor torque is immediately reversed in direction to balance with the magnetic retaining torque and the cam torque, the motor torque can be gradually reduced. Accordingly, even if generation of the motor torque in the reverse direction of the incorrect cam torque direction causes rotation of the motor shaft to create the shift of the engine phase, the shift amount can be restricted to be small in order to ensure start performance of the internal combustion engine.

According to a different aspect, the torque direction determining means determines the cam torque direction based upon a correlation between a change state of an actual phase of the engine phase generated by generating the motor torque in a predetermined set direction and the actual set direction. According to such a construction, the change state of the actual phase generated by the motor torque in the reverse direction of the actual cam torque direction depends on the motor torque direction. Therefore, the cam torque direction can be determined based upon the correlation between the change state of the actual phase generated by the motor torque in the predetermined set direction and the actual set direction.

According to a different aspect, the torque direction determining means determines the cam torque direction based upon a change state of an actual phase of the engine phase generated by reducing the motor torque to a zero value. That is, since the change state of the actual phase generated by reducing the motor torque to a zero value depends on the actual cam torque direction, the cam torque direction can be easily determined based upon the change state.

According to a different aspect, a peak value of the magnetic retaining torque is set larger than an absolute value of the cam torque acting on the motor shaft at a stop state of the internal combustion engine. According to such a construction, it is possible to generate with certainty the magnetic retaining torque balancing with the cam torque at an elimination point and after the elimination point of the motor torque.

According to a different aspect, the electric motor includes a motor stator forming a magnetic field by power supply, and a permanent magnet provided in an outer peripheral wall of the motor shaft arranged in an inner periphery side of the motor stator to rotate with the motor shaft due to the action of the formed magnetic field of the motor stator. According to such a construction, since the magnetic field formed by the permanent magnet can act directly on the motor stator in the outer peripheral wall of the motor shaft arranged in the inner periphery side of the motor stator, it is possible to efficiently generate the magnetic retaining torque by the action of the magnetic field. The permanent magnet rotating with the motor shaft by the action of the formed magnetic filed of the motor stator may be embedded, for example, inside the motor shaft.

When strain energy is accumulated in a construction element of a rotation system in the phase control mechanism, releasing the strain energy facilitates disruption of the torque balance. Therefore, according to a different aspect, after the motor torque is first reduced, the motor torque balanced with the magnetic retaining torque and the cam torque by the balancing means is eliminated. According to such a construction, by first reducing the motor torque, the motor shaft is positively rotated in the direction of the cam torque. Thereby, the strain energy in the phase control mechanism can be released. Accordingly, at an elimination point and after the elimination point of the motor torque balanced with the magnetic retaining torque and the cam torque after first reducing the motor torque, it is possible to restrict the rotation of the motor shaft due to the release of the strain energy, finally the shift of the engine phase.

According to a different aspect, after the eliminating means first reduces the motor torque to a zero value, the eliminating means eliminates the motor torque balanced with the magnetic retaining torque and the cam torque by the balancing means. According to such a construction, since the strain energy can be released with certainty by first reducing the motor torque to a zero value, a rotation restricting effect of the motor shaft at the elimination point and after the elimination point of the motor torque can be enhanced.

According to a different aspect, after the eliminating means first reduces the motor torque to a predetermined value larger than a zero value, the eliminating means eliminates the motor torque balanced with the magnetic retaining torque and the cam torque by the balancing means. According to such a construction, since the strain energy is released and at the same time, the rapid rotation of the motor shaft due to the releasing can be restricted by first reducing the motor torque to the predetermined valued larger than a zero value, the engine phase is difficult to be shifted.

According to a different aspect, after the eliminating means first gradually reduces the motor torque, the eliminating means eliminates the motor torque balanced with the magnetic retaining torque and the cam torque by the balancing means. According to such a construction, since the strain energy is released and, at the same time, the rapid rotation of the motor shaft due to the releasing can be restricted with certainty by first gradually reducing the motor torque, the engine phase is difficult to be shifted.

According to a different aspect, the control unit includes engine determining means for determining an operating state of the internal combustion engine, and the eliminating means first reduces the motor torque when the engine determining means makes an engine stop determination, which can be defined as a determination that the internal combustion engine has stopped, thereafter eliminating the motor torque balanced with the magnetic retaining torque and the cam torque by the balancing means. According to such a construction, since the motor torque is first reduced when, among determinations on the operating state, the engine stop determination is made it is possible to avoid interruption of the release of the strain energy due to the rotation of the motor shaft by the rotation of the internal combustion engine.

According to a different aspect, the engine determining means makes the engine stop determination by detecting a stop of at least one of the crank shaft and the cam shaft. According to such a construction, the stop of the internal combustion engine is directly obtained by detecting the stop of at least one of the crank shaft and the cam shaft, thereby making it possible to make an accurate engine stop determination.

According to a different aspect, the engine determining means detects a condition required for stopping the internal combustion engine in order to estimate a stop time of the internal combustion engine, thus making the engine stop determination. According to such a construction, since the stop time of the internal combustion engine can be indirectly estimated by detecting the required condition at the stop time, it is possible to simplify the construction for making the engine stop determination.

According to a different aspect, the control unit includes torque direction determining means for determining a cam torque direction that represents a positive or a negative direction of the cam torque acting on the motor shaft, and the eliminating means eliminates the motor torque generated by the balancing means in the reverse direction of the determined direction of the cam torque direction by the torque direction determining means. According to such a construction, since the motor torque in the reverse direction of the cam torque direction, determined as an operational direction of the cam torque, acts against the cam torque, the motor torque is easily balanced with the cam torque together with the magnetic retaining torque. Therefore, the motor torque required for balancing with the magnetic retaining torque and the cam torque is correctly generated before eliminating the motor torque for balancing with the magnetic retaining torque and the cam torque, making it possible to enhance a restricting effect to the shift of the engine phase.

According to a different aspect, the balancing means feedback-controls the power supply of the electric motor based upon the phase difference between the actual phase and the target phase of the engine phase to balance the motor torque with the magnetic retaining torque and the cam torque, and the torque direction determining means determines the cam torque direction based upon the shift generated in the actual phase and at least one of the physical amounts correlating with the actual phase by the feedback control of the balancing means. According to such a construction, in a state where the power supply to the electric motor is feedback-controlled based upon the phase difference between the actual phase and the target phase to balance the motor torque with magnetic retaining torque and the cam torque, the shift in accordance with the cam torque direction is generated in the actual phase and the correlating physical amount. Therefore, the cam torque direction can be accurately determined based upon the shift of the actual phase and the correlating physical amount.

According to a different aspect, a valve timing control device in an internal combustion engine for controlling valve timing of at least one of an intake valve and an exhaust valve opened/closed by a cam shaft through torque transmission from a crank shaft includes an electric motor for generating magnetic retaining torque and motor torque by power supply in a motor shaft, a control unit for controlling the motor torque by controlling the power supply to the electric motor, and a phase control mechanism for transmitting cam torque alternating between a positive and a negative direction in response to rotation of the cam shaft to the motor shaft and controlling an engine phase in accordance with a torque balance in the motor shaft. The control unit includes engine determining means for determining an operating state of the internal combustion engine, and power supply control means for performing power supply control stopping the power supply to the electric motor after a power supply amount to the electric motor is first reduced and then increased when the engine determining means makes an engine stop determination.

According to such a construction, when strain energy is accumulated in a construction element in a rotation system in the phase control mechanism, releasing the strain energy facilitates disruption of the torque balance. However, by first reducing the power supply amount to the electric motor, the motor shaft is positively rotated in the direction of the cam torque. Therefore, the strain energy in the phase control mechanism can be released. Further, since the power supply amount is reduced first when an engine stop determination is made among determinations of the operating state, it is possible to avoid interruption of the release of the strain energy by rotation of the motor shaft caused by rotation of the internal combustion engine.

Further, when the power supply amount to the electric motor is first reduced and then increased, the motor torque acting as a balance to the magnetic retaining torque and the cam torque is generated to stop the motor shaft. As a result, setting the engine phase in accordance with the torque balance can be realized. In addition, when the power supply itself to the electric motor is stopped after increasing the power supply amount, the motor torque balanced with the magnetic retaining torque and the cam torque is eliminated, and the magnetic retaining torque and the cam torque can be easily balanced. Therefore, a phase shift away from the engine phase realized before the power supply stop is restricted. Further, at the time of the power supply stop and thereafter, rotation of the motor shaft and the shift of the engine phase due to the release of the above described strain energy can be restricted. According to the above, it is possible to retain the engine phase that acts as a start phase after the power supply is stopped, thereby ensuring start performance of the internal combustion engine.

According to a different aspect, the phase control mechanism includes a resilient member having a resilient strain caused by rotation of the motor shaft. According to such a construction, since the resilient strain is generated in the resilient member by the rotation of the motor shaft in the phase control mechanism, strain energy by the resilient strain tends to be easily accumulated. However, when the power supply amount to the electric motor is first reduced, the strain energy due to the resilient strain of the resilient member can be released. Therefore, the shift of the engine phase at a point when the power supply is removed and after the power supply is removed is restricted.

According to a different aspect, the engine determining means makes an engine stop determination based upon detecting a stop of at least one of the crank shaft and the cam shaft. Accordingly, the stop of the internal combustion engine is directly detected by the stop detection of at least one of the crank shaft and the cam shaft, making it possible to make an accurate engine stop determination.

According to a different aspect, the engine determining means detects an essential condition for stopping the internal combustion engine to estimate a stop time of the internal combustion engine, thereby making an engine stop determination. According to such a construction, since the stop time of the internal combustion engine can be indirectly detected by the detection of the essential condition at the stop time, it is possible to simplify the construction for making the engine stop determination.

According to a different aspect, the power supply control means first reduces the power supply amount to the electric motor to a zero value and then increases the reduced power supply amount. According to such a construction, the power supply amount is first reduced to a zero value and thereby, the strain energy can be released with certainty leading to enhancement of the rotation restricting effect of the motor shaft when the power supply stops and thereafter.

According to a different aspect, the power supply control means first reduces the power supply amount to the electric motor to a predetermined value larger than a zero value and then increases the reduced power supply amount. According to such a construction, the power supply amount is first reduced to the predetermined value larger than a zero value and thereby, the rapid rotation of the motor shaft caused by the release of the strain energy can be restricted while releasing the strain energy. It is accordingly difficult to shift the engine phase.

According to a different aspect, the power supply control means first gradually reduces the power supply amount to the electric motor and then increases the reduced power supply amount. According to such a construction, the power supply amount is first gradually reduced and thereby, the rapid rotation of the motor shaft caused by the release of the strain energy can be restricted with certainty while releasing the strain energy. It is accordingly difficult to shift the engine phase.

According to a different aspect, the power supply control means first reduces the power supply amount to the electric motor and then gradually increases the reduced power supply amount. According to such a construction of first reducing the power supply amount to the electric motor and then gradually increasing the reduced power supply amount, in the phase control mechanism where the strain energy is released by first reducing the power supply amount, an event that the motor torque is excessively increased to accumulate the strain energy again is difficult to bring about. The above described aspect leads to enhancement of the rotation restricting effect of the motor shaft at a point of the power supply stop and after the power supply stop.

According to a different aspect, the power supply control means gradually reduces the increased power supply amount to a zero value, thereby stopping the power supply to the electric motor. By gradually reducing the increased power supply amount to a zero value thus, the power supply to the electric motor can be stopped while restricting a rapid change of the torque balance in the motor shaft. Therefore, it is possible to avoid an inability to balance the magnetic retaining torque and the came torque when the motor shaft rapidly rotates due to the rapid change of the torque balance at a point of the power supply stop.

According to a different aspect, the control unit includes motor determining means for determining an operational state of the motor shaft, and the power supply control means increases the power supply amount to the electric motor when the motor determining means makes an angle change determination that a rotational angle of the motor shaft changes after the power supply amount to the electric motor starts to reduce first. According to such a construction, when the angle change determination that the rotational angle of the motor shaft changes after the power supply amount starts to reduce first is made among determinations of the operational state, the power supply amount is to be increased. Therefore, the release of the strain energy can be ensured.

According to a different aspect, the motor determining means makes the angle change determination by detecting a movement of the motor shaft. According to such a construction, the rotational angle change of the motor shaft is directly obtained by detecting the movement of the motor shaft, making it possible to make an accurate angle change determination.

In an exemplary valve timing control device in which the phase control mechanism controls an engine phase as the relative phase between the crank shaft and the cam shaft in accordance with the torque balance in the motor shaft, a correlation between a movement of at least one of the crank shaft and the cam shaft and a movement of the motor shaft occurs. Therefore, according to a different aspect, the motor determining means detects the movement of at least one of the crank shaft and the cam shaft to estimate the movement of the motor shaft, thus making the angle change determination. According to such a construction, by indirectly estimating the rotational angle change due to the movement of the motor shaft by detecting the movement of at least one of the crank shaft and the cam shaft, it is possible to make an accurate angle change determination.

According to a different aspect, the power supply control means increases the power supply amount to the electric motor in a power supply direction associated with applying a brake torque to the motor shaft when the motor determining means makes the angle change determination. According to such a construction, when the power supply amount is first reduced to rotate the motor shaft toward a direction of the cam torque, thereby making the angle change determination, since the power supply amount is increased in the power supply direction of applying the brake torque to the motor shaft, the motor torque generated in the motor shaft opposes the cam torque, thereby more easily balancing with the magnetic retaining torque and the cam torque. Accordingly, the motor torque required for balancing with the magnetic retaining torque and the cam torque is generated before stopping the power supply for balancing with the magnetic retaining torque and the cam torque, thereby making it possible to restrict the shift of the engine phase.

According to a different aspect, the control unit includes change direction determining means for determining a change direction of a rotational angle of the motor shaft based upon an operational state of the motor shaft generated by first reducing the power supply amount to the electric motor, and, based on the power supply direction a brake torque is applied against the determination direction by the change direction determining means. According to such a construction, since the motor shaft is subjected to a braking force in the reverse direction of the change direction of the rotational angle determined based upon the movement state, the motor torque generated in the motor shaft acts as a balance against the cam torque in the change direction, and is easily balanced with the cam torque together with the magnetic retaining torque. Accordingly, the motor torque required for balancing the magnetic retaining torque and the cam torque is generated correctly before stopping the power supply for balancing the magnetic retaining torque and the cam torque, thereby restricting the shift of the engine phase.

According to a different aspect, the change direction determining means determines the change direction of the rotational angle of the motor shaft by detecting a movement of the motor shaft. According to such a construction, the rotational angle change of the motor shaft is directly obtained by detecting the movement of the motor shaft, making it possible to accurately determine the change direction.

In the valve timing control device in which the phase control mechanism controls an engine phase in accordance with a torque balance in the motor shaft, a correlation exists between a movement of at least one of the crank shaft and the cam shaft and a movement of the motor shaft. Therefore, according to a different aspect, the change direction determining means detects the movement of at least one of the crank shaft and the cam shaft to estimate the movement of the motor shaft, thus determining the change direction. According to such a construction, by indirectly estimating the rotational angle change due to the movement of the motor shaft by detecting the movement of at least one of the crank shaft and the cam shaft, it is possible to accurately determine the change direction.

According to a different aspect, the control unit includes correctness/incorrectness determining means for determining correctness/incorrectness in the determination direction determined by the change direction determining means, based upon an operational state of the motor shaft generated by increasing the power supply amount to the electric motor. According to such a construction, when the determination direction in regard to the change direction of the rotational angle of the motor shaft is correct, the operational state of the motor shaft generated by increasing the power supply amount shows reduction of a changing speed of the rotational angle, that is, the rotation speed. Accordingly, the correctness/incorrectness of the determination direction can be determined based upon the operational state of the motor shaft by increasing the power supply amount.

According to a different aspect, the correctness/incorrectness determining means determines correctness/incorrectness of the determination direction made by the change direction determining means, by detecting a movement of the motor shaft. According to such a construction, the rotational angle change of the motor shaft is directly obtained by detecting the movement of the motor shaft, making it possible to accurately make the correctness/incorrectness determination in regard to the determination direction of the change direction.

In the valve timing control device in which the phase control mechanism controls the engine phase in accordance with the torque balance in the motor shaft, a correlation occurs between a movement of at least one of the crank shaft and the cam shaft and a movement of the motor shaft. Therefore, according to a different aspect, the correctness/incorrectness determining means detects the movement of at least one of the crank shaft and the cam shaft to estimate the movement of the motor shaft, thus determining correctness/incorrectness of determination direction by the change direction determining means. According to such a construction, by indirectly estimating the rotational angle change due to the movement of the motor shaft by detecting the movement of at least one of the crank shaft and the cam shaft, it is possible to accurately make the correctness/incorrectness determination in regard to the determination direction in the change direction.

According to a different aspect, the power supply control means reverses the power supply direction when the correctness/incorrectness determining means makes a determination that the determination direction made by the change direction determining means is incorrect. According to such a construction, when the determination direction is incorrect, the power supply direction is immediately reversed, making it possible to balance the motor torque with the magnetic retaining torque and the cam torque. Therefore, even if the motor shaft is rotated by an increase of the power supply amount toward the incorrect power supply direction to cause the shift of the engine phase, the shift amount can be restricted to be small.

According to a different aspect, the power supply control means further increases a power supply amount to the electric motor when the motor determining means again makes the angle change determination after a point of starting an increase of the power supply amount to the electric motor. According to such a construction, when the motor shaft continues to rotate regardless of the increase of the power supply amount to again make the angle change determination, the motor torque is balanced with the magnetic retaining torque and the cam torque by further increasing the power supply amount, thereby restricting the shift amount of the engine phase due to the continuous rotation to a small amount.

According to a different aspect, the power supply control means increases the power supply amount when a set time elapses after the power supply amount to the electric motor first starts to reduce. According to such a construction, when the set time elapses after the power supply amount to the electric motor first starts to reduce, the strain energy is released. Since it is possible to automatically increase the power supply amount under such a condition, the processing required for such a release is simplified.

According to a different aspect, the power supply control means increases the power supply amount to the motor shaft in the power supply direction associated with generating the motor torque against the direction of cam torque when a set time elapses. According to such a construction, when the set time elapses after the power supply amount first starts to reduce, since the power supply amount increases in the power supply direction associated with generating the motor torque against the cam torque, the motor torque tends to easily balance with the cam torque together with the magnetic retaining torque. Therefore, the motor torque required for balancing the magnetic retaining torque and the cam torque is generated before stopping the power supply for balancing the magnetic retaining torque and the cam torque, making it possible to achieve a restricting effect to the shift of the engine phase.

According to a different aspect, the control unit includes torque direction determining means for determining a cam torque direction representing a positive or a negative direction of the cam torque acting on the motor shaft, and, based on the power supply direction the motor torque is generated in the reverse direction of the determination direction by the torque direction determining means. According to such a construction, the motor torque generated in the reverse direction of the cam torque direction determined as an operational direction of the cam torque to the motor shaft acts as a balance against the cam torque, thereby more easily balancing with the cam torque and the magnetic retaining torque. Therefore, the motor torque required for balancing the magnetic retaining torque and the cam torque is correctly generated before eliminating the motor torque for balancing the magnetic retaining torque and the cam torque, making it possible to restrict the shift of the engine phase.

According to a different aspect, the power supply control means feedback-controls the power supply to the electric motor based upon a phase difference between an actual phase and a target phase of the engine phase before first reducing the power supply amount provided to the electric motor by the power supply control, and the torque direction determining means determines the cam torque direction based upon a shift generated in the actual phase and at least one physical amount that correlates with the actual phase by the feedback control of the power supply control means. According to such a construction, in a state where the power supply to the electric motor is feedback-controlled based upon the phase difference between the actual phase and the target phase, the shift in accordance with the cam torque direction can be generated in the actual phase and the correlating physical amount. Therefore, the cam torque direction can be accurately determined based upon the shift of the actual phase and the correlating physical amount.

According to a different aspect, the control unit includes motor determining means for determining an operational state of the motor shaft, and the power supply control means stops the power supply to the electric motor when the motor determining means makes a motor stop determination that the motor shaft stops after an increase of the power supply amount to the electric motor is started. According to such a construction, the power supply is stopped when the motor determining means makes the motor stop determination that the motor shaft stops after a point of starting the increase of the power supply amount to the electric motor among the determinations of the operational state. Therefore, a stop state of the motor shaft due to the balance of the motor torque with the magnetic retaining torque and the cam torque can be obtained with certainty. As a consequence, the shift of the engine phase is restricted.

According to a different aspect, the motor determining means makes the motor top determination by detecting a stop of the motor shaft. According to such a construction, an accurate motor stop determination can be made by directly obtaining the stop of the motor shaft by the detection thereof.

As described above, in the valve timing control device in which the phase control mechanism controls the engine phase in accordance with the torque balance in the motor shaft, a correlation occurs between the movement of at least one of the crank shaft and the cam shaft, and the movement of the motor shaft. Therefore, according another aspect, the motor determining means detects a stop of at least one of the crank shaft and the cam shaft to estimate the stop of the motor shaft, thereby making a stop determination. According to such a construction, an accurate motor stop determination can be made by indirectly estimating the stop of the motor shaft from the crank shaft or cam shafts.

According to a different aspect, the power supply control means stops the power supply to the electric motor when a set time elapses after the power supply amount to the electric motor starts to increase. According to such a construction, when the set time elapses after the power supply amount to the electric motor starts to increase, the motor torque is to balance with the magnetic retaining torque and the cam torque. Since it is possible to automatically stop the power supply under such a condition, the processing required for such a balance can be simplified.

According to a different aspect, the control unit includes the motor determining means for determining the operational state of the motor shaft, and the power supply control means, when the motor determining means makes the angle change determination that the rotational angle of the motor shaft changes after the power supply to the electric motor stops, repeats the power supply control that the stop of the power supply is replaced by actions such as by first reducing the power supply amount to the electric motor. According to such a construction, when the motor shaft in which the torque balance is disrupted is rotated to make the angle change determination in the stop state of the power supply, the power supply amount is increased from the power supply stop state to be replaced by first reducing the power supply amount, thereby making it possible to first better establish the balance of the motor torque with the magnetic retaining torque and the cam torque. Therefore, by the elimination of the motor torque due to the power supply stop of the motor torque balanced with the magnetic retaining torque and the cam torque, the power supply control can be repeated until the magnetic retaining torque and the cam torque are balanced with certainty. Therefore, the start performance of the internal combustion engine can be ensured.

According to a different aspect, a peak value of the magnetic retaining torque is set to be larger than an absolute value of the cam torque acting on the motor shaft at the stop state of the internal combustion engine. According to such a construction, it is possible to generate the magnetic retaining torque balanced with the cam torque at and after the power supply to the electric motor is removed.

According to a different aspect, the electric motor includes a motor stator forming a magnetic field by power supply, and a permanent magnet provided in an outer peripheral wall of the motor shaft arranged in an inner periphery side of the motor stator to rotate with the motor shaft due to the action of the formed magnetic field of the motor stator. According to such a construction, since the magnetic field formed by the permanent magnet can act directly on the motor stator in the outer peripheral wall of the motor shaft arranged in the inner periphery side of the motor stator, it is possible to efficiently generate the magnetic retaining torque by the action of the magnetic field. The permanent magnet rotating with the motor shaft by the action of the formed magnetic filed of the motor stator may be embedded inside the motor shaft.

BRIEF DESCRIPTION OF THE DRAWINGS

The above and other objects, constructions and advantages will become more apparent from the following detailed description by referring to the following drawings in which:

FIG. 10 is a table illustrating exemplary values associated with operation of a drive unit in FIG. 9;

FIG. 11 is a table further illustrating exemplary values associated with the operation of the drive unit in FIG. 9;

FIG. 12 is a graph illustrating values associated with exemplary torque eliminating processing with a correctness/incorrectness determination;

FIG. 13 is a table illustrating exemplary values associated with the exemplary torque eliminating processing with the correctness/incorrectness determination;

BEST MODES FOR CARRYING OUT THE INVENTION

Hereinafter, plural embodiments will be explained with reference to the drawings.
(First Embodiment)

Figure 2:
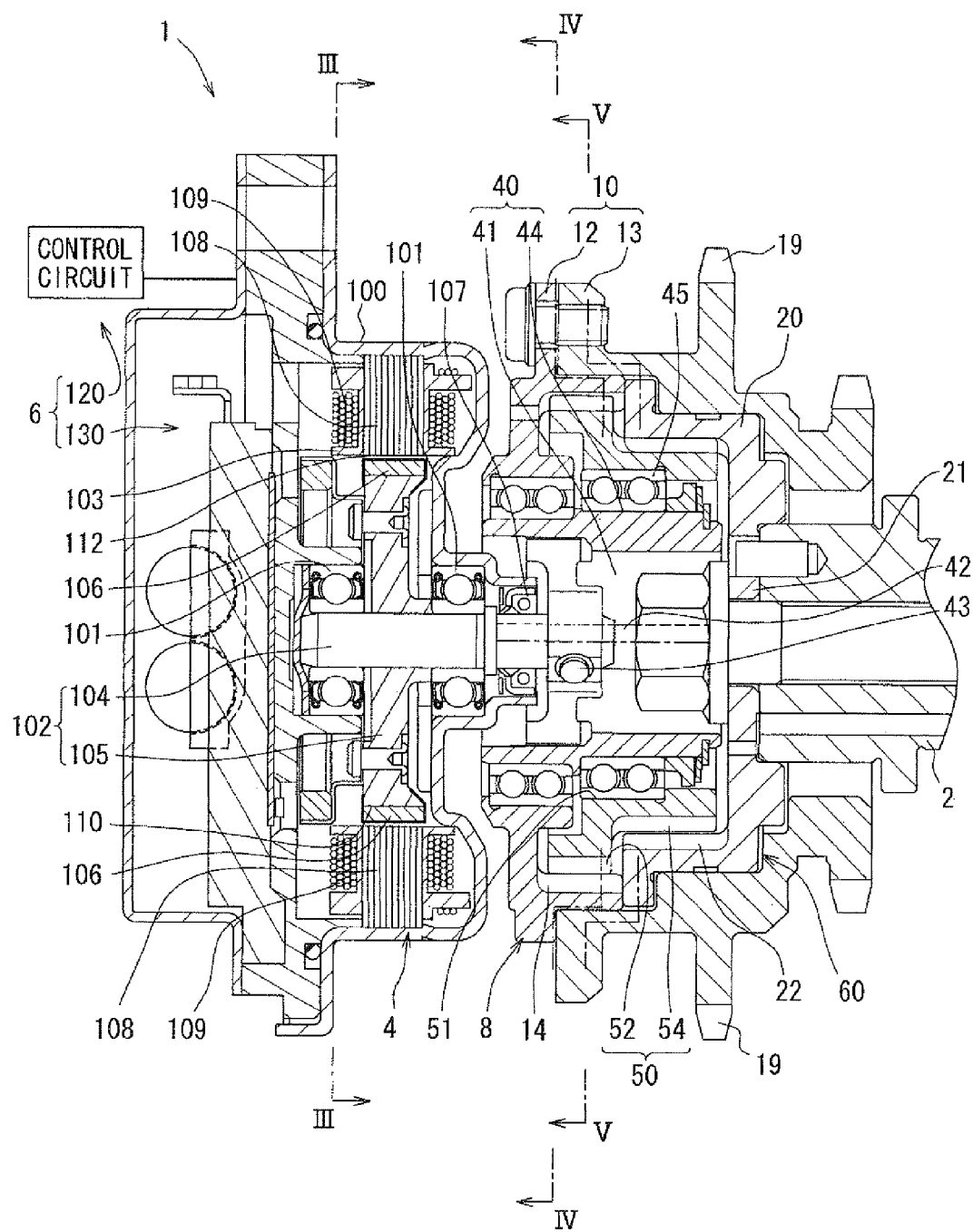
FIG. 2 is a diagram illustrating an exemplary construction of the valve timing control device according to a first embodiment and a cross section taken along line II-II in FIG. 4.

FIG. 2 shows a valve timing control device 1 according to a first embodiment. The valve timing control device 1 is provided in a transmission system mounted in a vehicle for transmitting engine torque from a crank shaft (not shown) to a cam shaft 2 of an internal combustion engine mounted in a vehicle.

Hereinafter, a basic construction of the valve timing control device 1 will be explained. The valve timing control device 1 can be configured to combine an electric motor 4, a power supply control system 6 and a phase control mechanism 8, and controls an engine phase between the crank shaft and the cam shaft 2 for determining valve timing. In the present embodiment, the cam shaft 2 opens/closes an intake valve (not shown) of the internal combustion engine, and the valve timing control device 1 controls the valve timing of the intake valve.

Figure 3:
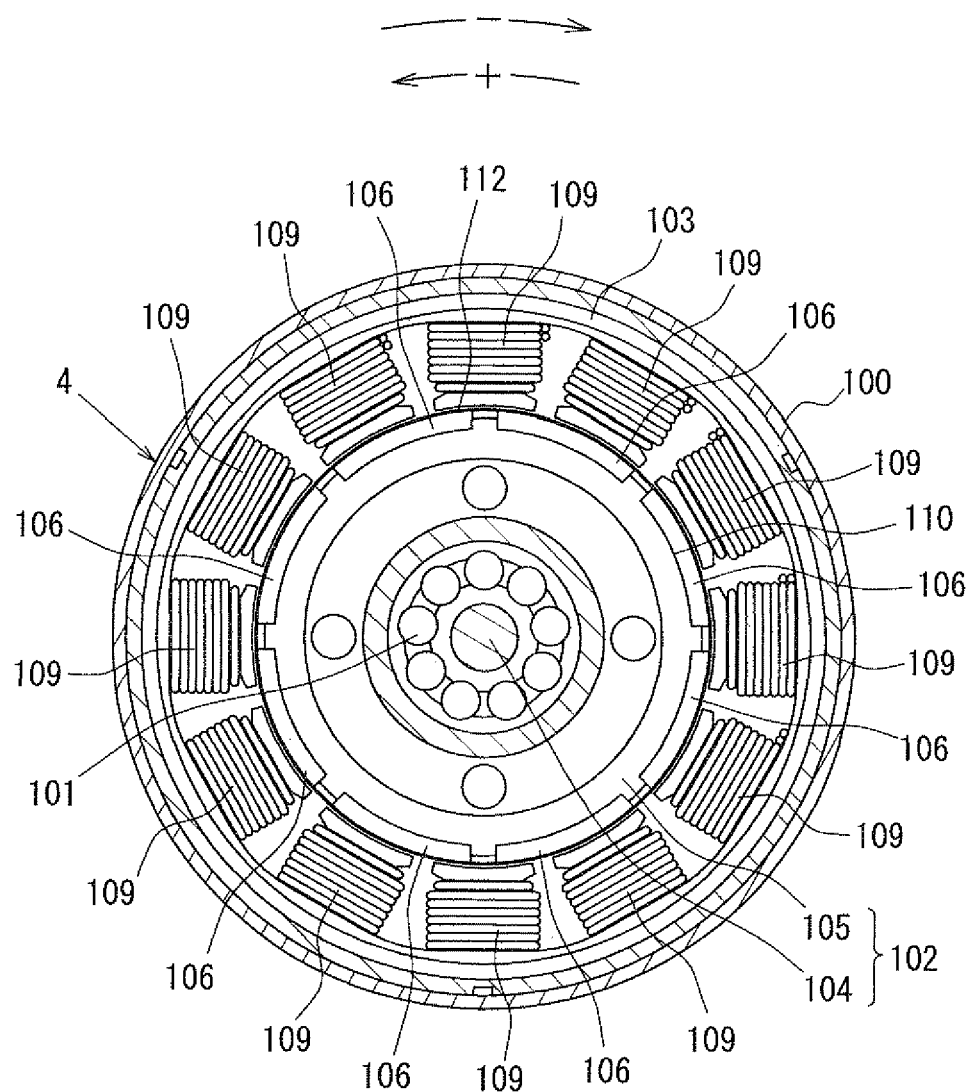
FIG. 3 is a diagram illustrating a cross section taken along line III-III in FIG. 2.

As shown in FIG. 2 and FIG. 3, the electric motor 4 can be a brushless motor provided with a housing 100, bearings 101, a motor shaft 102, an oil seal 107, and a motor stator 103. The housing 100 is fixed through a stay (not shown) to the internal combustion engine. The two bearings 101 and the motor stator 103 are accommodated and fixed in the housing 100. Each bearing 101 rotatably supports a shaft body 104 in the motor shaft 102 and the oil seal 107 is provided between the shaft body 104 and the housing 100 for sealing. A rotor portion 105 in the motor shaft 102 projecting from the shaft body 104 toward an outer periphery side is provided with plural permanent magnets 106 arranged at equal intervals in the rotational direction. Permanent magnets 106 are configured to be capable of rotating with the motor shaft 102. The permanent magnets 106 are in proximity to each other in the rotational direction and form magnetic poles having opposite polarities at an outer periphery side of the rotor portion 105. The motor stator 103 is arranged coaxially with the rotor portion 105 at the outer periphery side thereof, and has cores 108 and coils 109. The cores 108 are formed by laminating metal pieces and are arranged at equal intervals in the rotational direction of the motor shaft 102. The coils 109 respectively are wound around each core 108.

The power supply control system 6 is electrically connected to each coil 109 and controls power supply, such as an amount of power supply supplied, to the coils 109 in accordance with an operating state of the internal combustion engine or the like. With the above described power supply, the electric motor 4 forms a rotational magnetic field acting on each permanent magnet 106 by excitation of each coil 109 and thereby, generates motor torque Tm in a positive or negative direction in accordance with the formed magnetic field in the motor shaft 102. In the present embodiment, a counterclockwise direction in FIG. 3 is defined as a positive direction (+) of the motor shaft 102, and a clockwise direction in FIG. 3 is defined as a negative direction (−) of the motor shaft 102.

As shown in FIG. 2, the phase control mechanism 8 is provided with a driving side rotary element 10, a driven side rotary element 20, a planetary carrier 40 and a planetary gear 50.

Figure 4:
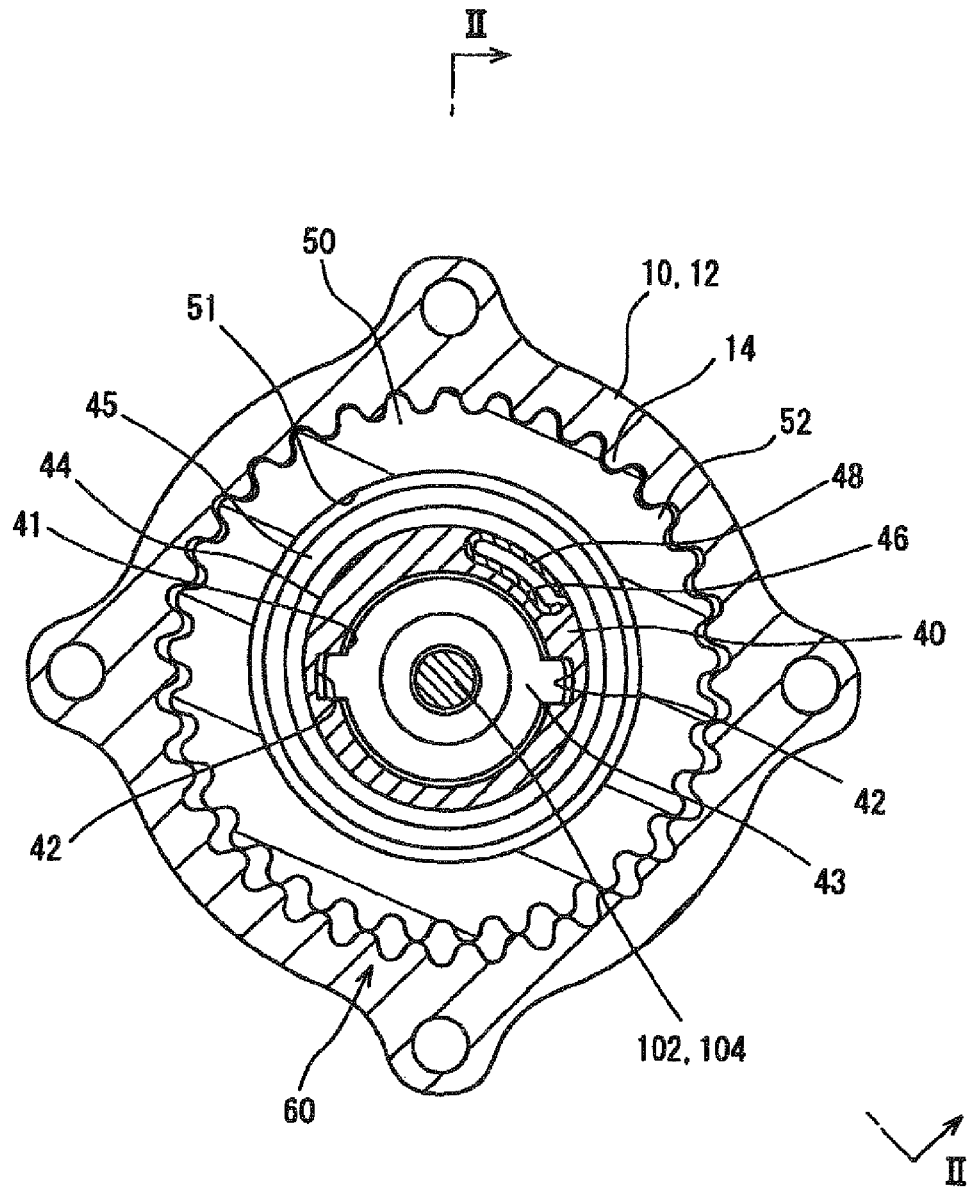
FIG. 4 is a diagram illustrating a cross section taken along line IV-IV in FIG. 2.
Figure 5:
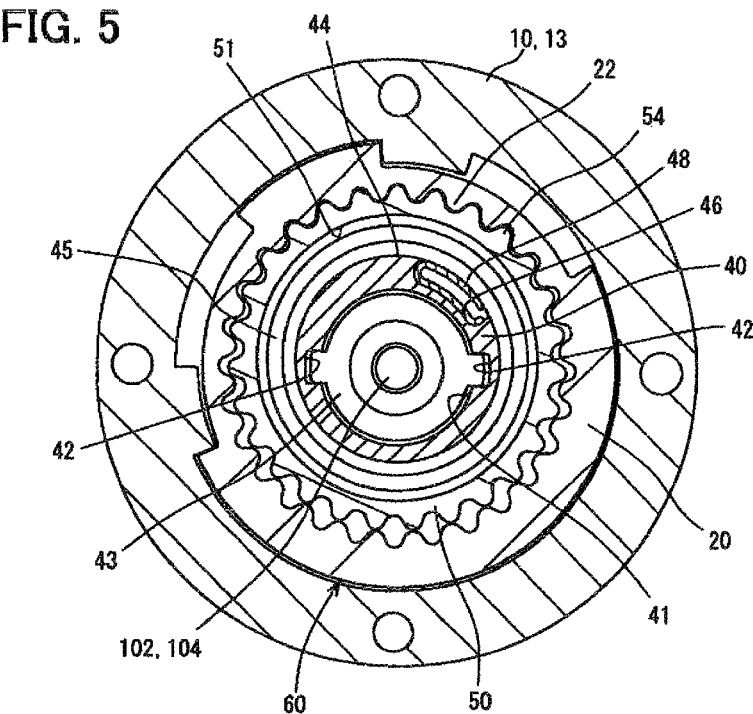
FIG. 5 is a diagram illustrating a cross section taken along line V-V in FIG. 2.

As shown in FIG. 2, FIG. 4 and FIG. 5, the driving side rotary element 10 is constituted so that a gear member 12 is threaded coaxially with a sprocket 13. A peripheral wall part of the tubular or circular gear member 12 forms a driving side internal gear part 14 having a tip circle on the inner peripheral side of a bottom circle. A plurality of teeth 19 are provided in the tubular or circular sprocket 13 so as to protrude to the outer periphery side. An annular timing chain (not shown) is wound between the teeth 19 and a plurality of teeth of the crankshaft thereby linking the sprocket 13 to the crankshaft. When the engine torque outputted from the crank shaft is inputted into the sprocket 13 through the timing chain, the driving side rotary element 10 moves with the crankshaft to rotate while keeping the relative phase to the crank shaft. In the present embodiment, the rotational direction of the driving side rotary element 10 is a counterclockwise direction in FIG. 4 and FIG. 5.

As shown in FIG. 2 and FIG. 5, the driven side rotary element 20 is of a tubular or circular type with a bottom, and is coaxially arranged at an inner periphery side of the driving side rotary element 10. A bottom wall part of the driven side rotary element 20 forms a connecting portion 21 threaded coaxially onto the camshaft 2 to move together therewith. By such a connection, the driven side rotary element 20 moves together with the camshaft 2 and can rotate while maintaining the relative rotational phase to the camshaft 2, and can rotate relative to the driving side rotary element 10. In the present embodiment, the clockwise direction in FIG. 5 is a relative rotational direction in which the driven side rotary element 20 retards relative to the driving side rotary element 10, and the counterclockwise direction in FIG. 5 is a relative rotational direction in which the driven side rotary element 20 advances relative to the driving side rotary element 10.

The peripheral wall part of the driven side rotary element 20 has a driven side internal gear part 22 in which the tip circle exists on the inner periphery side of the bottom circle. Here, the inside diameter of the driven side internal gear part 22 is set smaller than the inside diameter of the driving side internal gear part 14, and the number of the teeth of the driven side internal gear part 22 is set smaller than the number of the teeth of the driving side internal gear part 14. The driven side internal gear part 22 is engaged with the inner peripheral wall in the sprocket 13 in such a manner as to be adjacent to the driving side internal gear part 14 as shifted in the axial direction.

As shown in FIG. 2, FIG. 4 and FIG. 5, the planetary carrier 40 is formed in a tubular shape as a whole and is provided with an input part 41 formed by the inner periphery part. The input part 41 is arranged coaxially with the rotary elements 10 and 20, and the motor shaft 102. A groove 42 is opened in the input part 41, and by a joint 43 fitted into the groove 42, the planetary carrier 40 is connected to the shaft body 104 in the motor shaft 102. With such connection, the planetary carrier 40 can rotate with the motor shaft 102 and also can rotate relative to the driving side rotary element 10, together with the motor shaft 102.

The planetary carrier 40 is further provided with an eccentric part 44 formed by the outer periphery part, and the eccentric part 44 is arranged to be eccentric to the internal gear parts 14 and 22 and is fitted through the bearing 45 into the inner periphery side of a central bore 51 of the planetary gear 50. With such a fitting, the planetary gear 50 can realize a planetary movement in such a manner as to rotate on its axis around the eccentric center of the eccentric part 44 and rotate in the rotational direction of the planetary carrier 40. A resilient member 48 formed of a U-shaped leaf spring is accommodated in one recessed part 46 opened to the eccentric part 44 and a returning force of the resilient member 48 acts on the inner periphery surface of the central bore 51 of the planetary gear 50.

The planetary gear 50 is of a two-step tubular or circular type, and is provided with a driving side external gear part 52 and a driven side external gear part 54 each having a tip circle on the outer periphery side of the bottom circle formed respectively by a larger diameter portion and a smaller diameter portion. The number of the teeth of the driving side external gear part 52 is set smaller than the number of the teeth of the driving side internal gear part 14 by a predetermined number N, which, in the present example is 1. The number of the teeth of the driven side external gear part 54 is set to be smaller than the number of teeth on the driven side internal gear part 22 by the predetermined number N. Accordingly, the number of the teeth of the driven side external gear part 54 is smaller than the number of the teeth of the driving side external gear part 52. The driving side external gear part 52 is arranged on the inner periphery side of the driving side internal gear part 14, and meshed with the gear part 14. The driven side external gear part 54, which is located closer to the connecting part 21 than the driving side external gear part 52, is arranged on the inner periphery side of the driven side internal gear part 22, and meshed with the gear part 22.

According to the above construction, a differential gear mechanism 60 is formed in the rotary elements 10 and 20 so that the driving side internal gear part 14 and the driven side internal gear part 22 are linked through the planetary gear 50. The phase control mechanism 8 provided with the differential gear mechanism 60 is designed to transmit cam torque Tca alternating between a positive and a negative direction in response to rotation of the cam shaft 2 to the motor shaft 102 and also control the engine phase in accordance with the torque balance in the motor shaft 102.

More specifically, by retaining the torque balance in the motor shaft 102 when the motor shaft 102 does not rotate relative to the driving side rotary element 10, the planetary gear 50 rotates with the rotary elements 10 and 20 while keeping mesh positions with the internal gear parts 14 and 22. As a result, since the engine phase does not change, the valve timing is held to be constant.

By increasing the motor torque Tm of the motor shaft 102, for example, in a positive direction, when the motor shaft 102 rotates in the positive direction relative to the driving side rotary element 10, the planetary gear 50 performs a planetary motion while changing mesh positions with the internal gear parts 14 and 22. As a result, since the driven side rotary element 20 retards relative to the driving side rotary element 10, the engine phase changes toward a retard side of the cam shaft 2 as compared to the crank shaft, which side can be referred to as the "retard side." In the present embodiment thus, the positive direction of the motor shaft 102 can correspond to the retard side of the engine phase.

By increasing the motor torque Tm of the motor shaft 102 in, for example, a negative direction, when the motor shaft 102 rotates relative to the driving side rotary element 10 in the negative direction, the planetary gear 50 performs a planetary motion while changing mesh positions with the internal gear parts 14 and 22. As a result, since the driven side rotary element 20 advances relative to the driving side rotary element 10, the engine phase changes toward an advance side of the cam shaft 2 to the crank shaft, which side can be referred to hereinafter, as the "advance side." Thus, in the present embodiment, the negative direction of the motor shaft 102 can correspond to the advance side of the engine phase.

Next, a motor part of a first embodiment will be explained in detail.

Hereinafter, the electric motor 4 will be explained. As shown in FIG. 2 and FIG. 3, each permanent magnet 106 of the electric motor 4 is mounted to an outer periphery wall 110 of the rotor portion 105 arranged in the inner periphery side of the motor stator 103. Each permanent magnet 106 and the motor stator 103 face with each other so as to have a magnetic gap 112 therebetween in a diameter direction of the motor shaft 102. Therefore, in a stop state of power supply to the electric motor 4 in which the motor torque Tm is not generated, when the formed magnetic field of each permanent magnet 106 acts directly on each core 108 through the magnetic gap 112, the cores 108 are magnetized. Thereby, as shown in FIG. 6, the magnetic retaining torque Th, alternating between positive and negative directions in accordance with the rotation, can be efficiently generated in the motor shaft 102.

Figure 6:
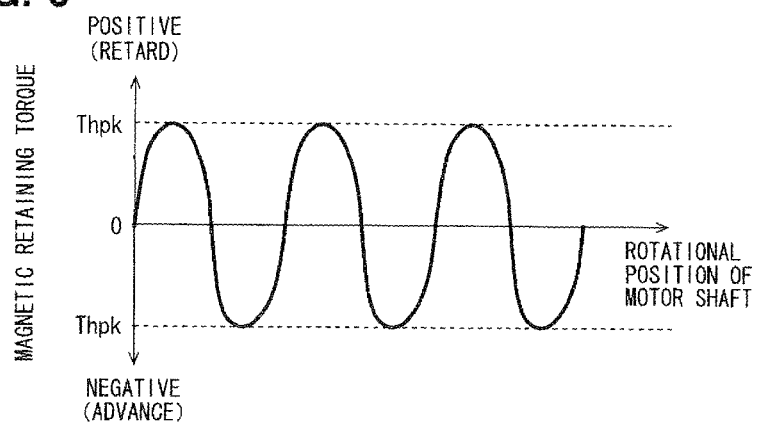
FIG. 6 is a graph illustrating a characteristic of an electric motor.

The magnetic retaining torque Th of the present embodiment is set so that a peak value Thpk, as shown in FIG. 6, is larger than an absolute value of cam torque Tca acting on the motor shaft 102 in a stop state of the internal combustion engine. The magnetic retaining torque Th is set to meet Equation (1) shown below. Where Tcamax represents the maximum values predicted in regard to both of an absolute value in a positive direction and an absolute value in a negative direction of the cam torque Tca.

$$\text{Thpk} > \text{Tcamax} \tag{1}$$

In the present embodiment, a friction force is unavoidably generated between the electric motor 4 and movable elements of the phase control mechanism 8, for example, between the shaft body 104 of the motor shaft 102 and the contact elements 101 and 107, and between the bearing 45 and the contact elements 40 and 48.

Hereinafter, a construction of the power supply control system 6 will be explained in greater detail. The power supply control system 6 is, as shown in FIG. 2, provided with a control circuit 120 and a drive circuit 130. In the present embodiment, the control circuit 120 is arranged outside the electric motor 4 and the drive circuit 130 is arranged inside the electric motor 4, but both of the control circuit 120 and the drive circuit 130 may be arranged either outside or inside of the electric motor 4.

Figure 7:
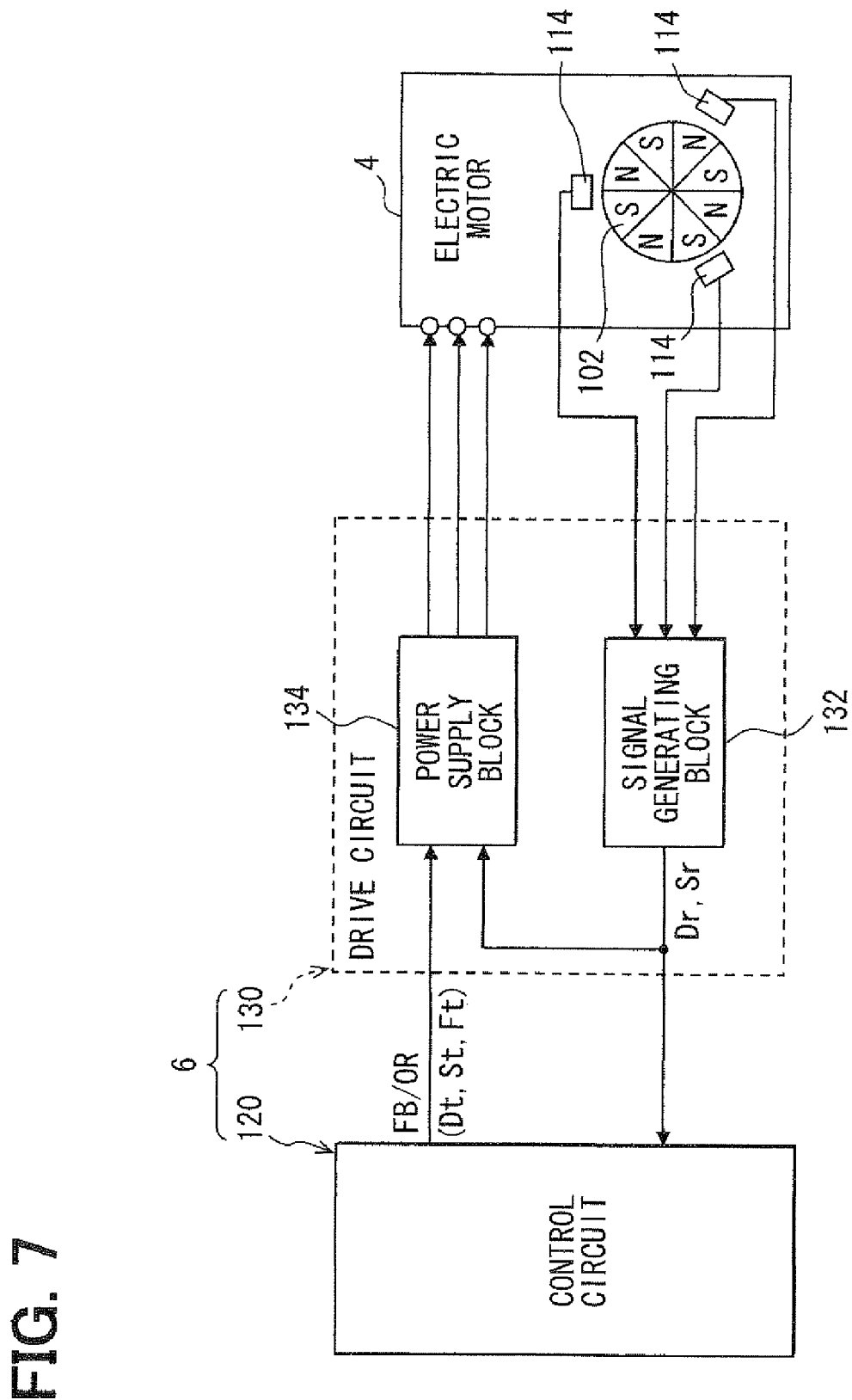
FIG. 7 is a block diagram illustrating an exemplary construction of the power supply control system in FIG. 2.

The control circuit 120 is constructed mainly of a microcomputer and is, as shown in FIG. 7, connected electrically to the drive circuit 130. The control circuit 120 has a function of controlling the internal combustion engine and also a function of controlling power supply to the electric motor 4, which supply can be referred to as the "motor power supply." The control circuit 120 realizes a feedback (FB) control mode and an open loop (OR) control mode as control modes of the motor power supply.

More specifically, in the FB control mode, the control circuit 120 calculates an actual phase Pr of the engine phase based upon an actual rotational direction Dr, an actual rotational number Sr and the like of the electric motor 4 provided by the drive circuit 130 and also calculates a target phase Pt of the engine phase based upon an operating state of the internal combustion engine or the like. The control circuit 120 sets a target rotational direction Dt, a target rotational number St and a target drive system Ft of the electric motor 4 respectively based upon a phase difference $\Delta P$ between the calculated actual phase Pr and the calculated target phase Pt, as shown in FIG. 8(a), and outputs the set results to the drive circuit 130 as FB control values. In regard to the target drive system Ft of the present embodiment, a regular drive for generating motor torque Tm in the target rotational direction Dt in the motor shaft 102 and a brake drive for applying a brake torque in the target rotational direction Dt to the motor shaft 102 are prepared.

In the OR control mode, the control circuit 120 sets in advance the following values, the target rotational direction Dt, the target rotational number St, and the target drive system Ft. The values are determined in accordance with the control contents, and are output to the drive circuit 130 as OR control values.

The drive circuit 130 is, as shown in FIG. 7, provided with a signal generating block 132 and a power supply block 134. In the present embodiment, the respective blocks 132 and 134 are constructed in hardware from electrical circuit elements.

The signal generating block 132 is connected electrically to rotational angle sensors 114 of the electric motor 4, the control circuit 120 and the power supply block 134. The plural rotational angle sensors 114 are provided in the rotational direction of the motor shaft 102 and each of them outputs a detection signal which changes in voltage between when the magnetic field of the motor shaft 102 is positioned within a predetermined angle range and when it is not positioned within the predetermined angle range. When the signal generating block 132 receives the detection signal, the signal generating block 132 calculates the actual rotational direction Dr and the actual rotational number Sr of the electric motor 4 based upon the detection signal of each rotational angle sensor 114 and outputs the calculated result to the control circuit 120 and the power supply block 134.

Figure 9:
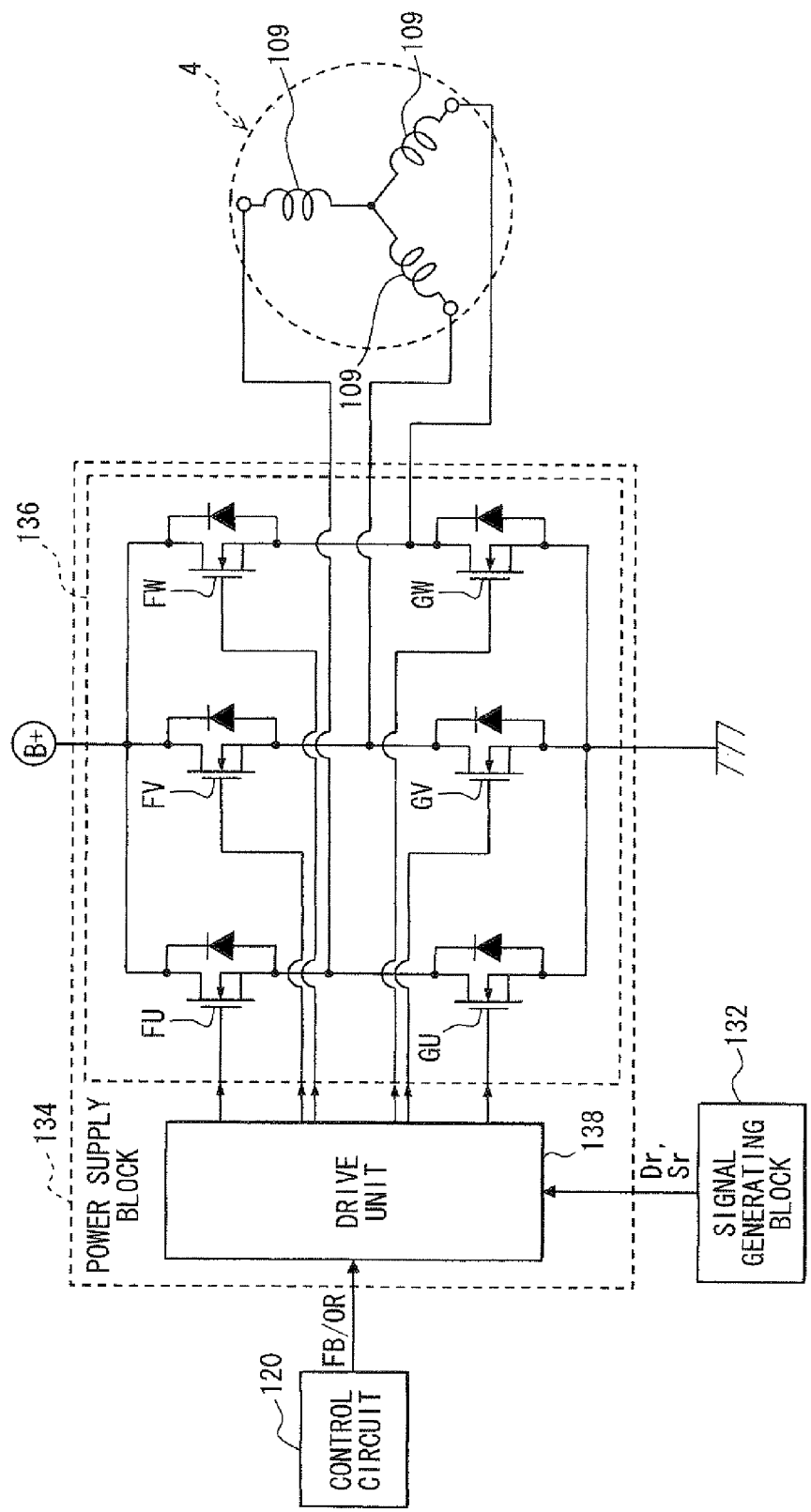
FIG. 9 is a block diagram illustrating a construction of a power supply block in FIG. 7.

As shown in FIG. 9, the power supply block 134 includes an inverter part 136 and a drive part 138. The inverter part 136 is formed of a bridge circuit and includes upper switching elements FU, FV and FW and lower switching elements GU, GV and GW. The switching element FU is connected electrically to the switching element GU, the switching element FV is connected electrically to the switching element GV and the switching element FW is connected electrically to the switching element GW. The coils 109 of the electric motor 4 form a star wire connection between respective connecting points. Each switching element FU, FV, FW, GU, GV and GW switches on by a drive signal of a high voltage level and switches off by the drive signal of a low voltage level.

The drive unit 138 is connected electrically to each switching element FU, FV, FW, GU, GV and GW of the control circuit 120, the signal generating block 132 and the inverter part 136. The drive unit 138 drives on/off each switching element FU, FV, FW, GU, GV and GW based upon the FB or OR control value, which can be referred to hereinafter as the "FB/OR control value," provided by the control circuit 120 and the actual rotational direction Dr and the actual rotational number Sr provided by the signal generating block 132. As a result, the motor power supply is realized, so that the motor torque Tm is generated in the motor shaft 102.

The drive unit 138, as shown in FIG. 10 and FIG. 11, controls a power supply amount such as, for example, electric current, to each coil 109 based upon a voltage level of a drive signal provided to each switching element FU, FV, FW, GU, GV and GW for controlling the motor torque Tm. In FIG. 10 and FIG. 11, each of the entries "i-vi" in the left-hand column is associated with a row containing a pattern of the voltage level of the drive signal provided to each switching element FU, FV, FW, GU, GV and GW, which pattern can be referred to hereinafter as the "power supply pattern." Each power supply pattern i-vi in FIG. 10 and FIG. 11 shows a case where the voltage level of the drive signal is high is shown as H, a case where the voltage level of the drive signal is low is shown as L and a case of the voltage level of the drive signal where a pulse width is modulated is shown as P.

More specifically, when the target rotational direction Dt and the target drive system Ft are set in a positive direction and the FB/OR control value of the regular drive is provided, the drive unit 138 generates the motor torque Tm in a positive direction in the motor shaft 102 by switching the power supply patterns i-vi shown in FIG. 10 in the forward direction. When the target rotational direction Dt and the target drive system Ft are set in a negative direction and the FB/OR control value of the regular drive is provided, the drive unit 138 generates the motor torque Tm in a negative direction in the motor shaft 102 by switching the power supply patterns i-vi shown in FIG. 11 in the forward direction. When the target rotational direction Dt and the target drive system Ft are set in a positive direction and the FB/OR control value of the brake drive is provided, the drive unit 138 controls the motor torque Tm to apply a brake torque in a positive direction to the motor shaft 102 by switching the power supply patterns i-vi shown in FIG. 10 in the reverse direction. When the target rotational direction Dt and the target drive system Ft are set in a negative direction and the FB/OR control value of the brake drive is provided, the drive unit 138 controls the motor torque Tm to apply a brake torque in a negative direction to the motor shaft 102 by switching the power supply patterns i-vi shown in FIG. 11 in the reverse direction.

When the FB control value is provided regardless of the direction Dt and the system Ft, the drive unit 138 sets an on-duty ratio Rd, which can be referred to as the "drive duty ratio," of a pulse width modulation in each power supply pattern i-vi. The drive duty ration is set by a PI or PID control calculation based upon a difference in rotational number between the target rotational number St and the actual rotational number Sr. When the OR control value is provided regardless of the direction Dt and the system Ft, the drive unit 138 sets the drive duty ratio Rd to a value corresponding to the target rotational number St.

Figure 1:
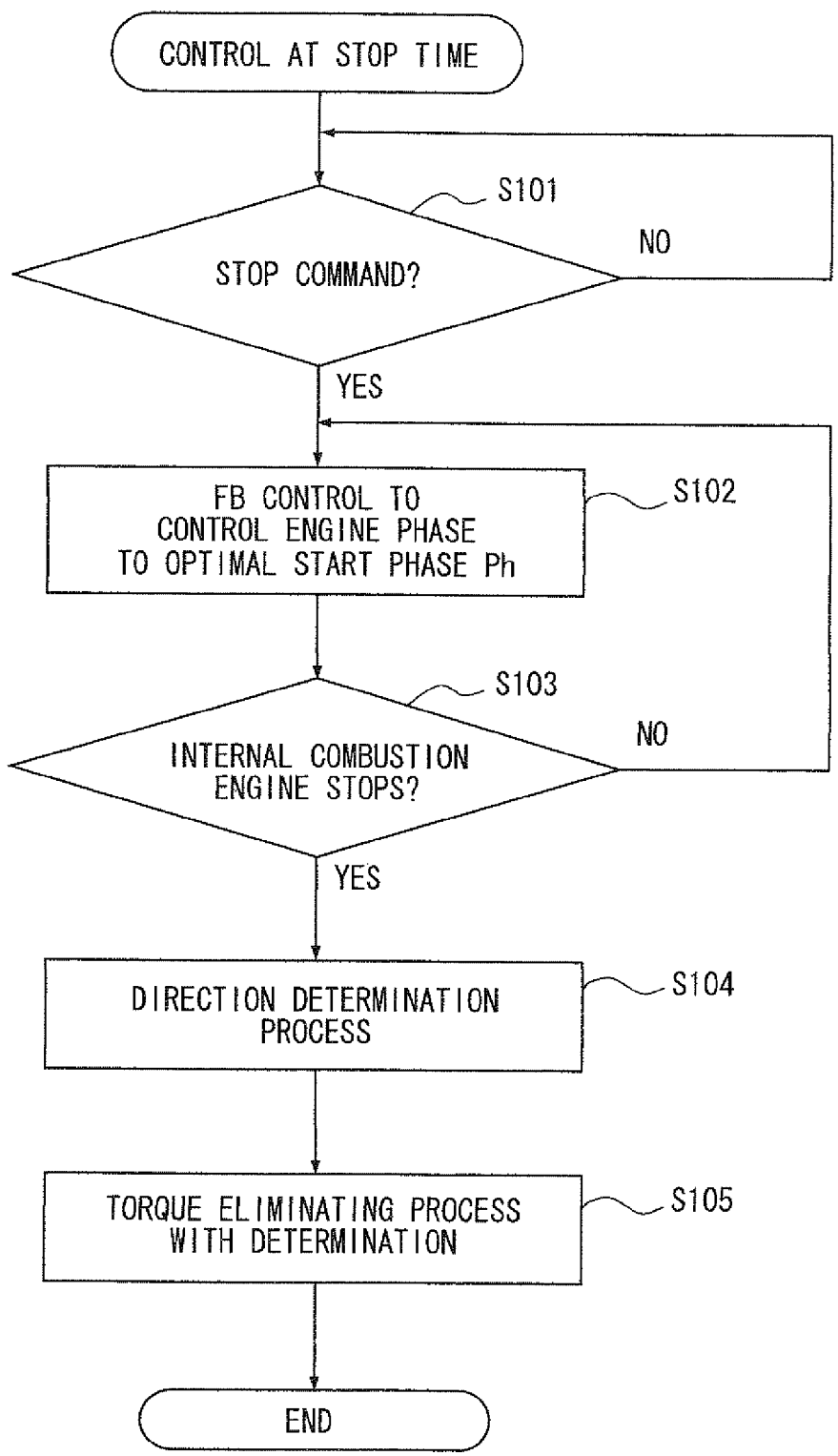
FIG. 1 is a flow chart illustrating control processing at a stop time of a power supply control system in a valve timing control device according to a first embodiment.

Hereinafter, a flow of control processing at a stop time performed in response to a stop of the internal combustion engine will be explained in connection with the power supply control system 6 with reference to FIG. 1.

First, the control circuit 120 determines whether or not a stop command such as an off-command of an ignition switch is received in an idling rotation condition of the internal combustion engine at S101.

In a case of receiving the stop command, corresponding to a YES at S101, the control circuit 120 realizes the FB control mode in such a manner that the engine phase becomes a predetermined phase Ph at S102, and also waits for a stop of the internal combustion engine at S103. If a stop command is not received, corresponding to a NO at S101, the process at S101 is repeated. In the present embodiment, the phase Ph is set to an optimal phase among a start phase within a range for allowing a start of the internal combustion engine and also improving a fuel consumption, which can be referred to hereinafter as the "optimal start phase." In the present embodiment, the optimal start phase is set to an intermediate phase between the most retarded phase and the most advanced phase, but may be set to the most retarded phase or the most advanced phase.

When the internal combustion engine stops, the control circuit 120 realizes the FB control mode and also determines the present cam torque direction Dca as will be described herein below in connection with S104. The cam torque direction Dca represents a positive or a negative direction of the cam torque Tca acting on the motor shaft 102 in the stop state of the internal combustion engine, that is, a positive or negative direction of the cam torque Tca in the motor shaft 102 shown for example, as a plus or minus in FIG. 3.

When the determination of the cam torque direction Dca is completed, the control circuit 120 realizes the OR control mode to set the motor torque Tm against the cam torque Tca to be balanced with the cam torque Tca and the magnetic retaining torque Th, thus eliminating the motor torque Tm as described below in connection with S105. The control circuit 120 then makes a correctness/incorrectness determination of a determination direction Dca0 as the determination result of the cam torque direction Dca. When the control circuit 120 determines that the determination direction Dca0 is incorrect, the control circuit 120 reverses a direction of the motor torque Tm and then eliminates the motor torque Tm as described below in connection with S105.

Hereinafter, the direction determining processing executed by S104 of control processing at a stop time will be explained in detail with reference to FIG. 8, which shows an example where the cam torque direction Dca is a negative direction. In FIG. 8(c), a power supply pattern switching state is applied in accordance with the values associated with the forward direction as shown in FIG. 10 for generating the motor torque Tm in a positive direction in the regular drive is shown as "+," and a power supply pattern switching state applied in accordance with the values associated with the reverse direction in FIG. 11 generating the motor torque Tm in a negative direction in the regular drive is shown as "−".

In the direction determining processing, the control circuit 120 sets the control mode as the FB control mode. First, the control circuit 120, as shown in FIG. 8(a), sets the optimal start position Ph as the target phase Pt to calculate a phase difference ΔP between the target phase Pt and the actual phase Pr. Next, the control circuit 120, as shown in FIG. 8(b), sets the target rotational direction Dt (+ or −) and the target rotational number St based upon the phase difference ΔP and also sets the target drive system Ft as the regular drive, outputting the set results to the power supply block 134 in the drive circuit 130 as the FB control value.

A drive unit 138 of the power supply block 134, which has received the FB control value from the control circuit 120, sets the power supply pattern switching state (+ or −) and the drive duty ratio Rd according to the control value, as shown in FIG. 8(c), thereby generating the motor torque Tm in the target rotational direction Dt. As a result, the motor shaft 102 rotates to a position where the motor torque Tm balances with the cam torque Tca and the magnetic retaining torque Th, and thereby, the actual phase Pr is controlled to a phase in the vicinity of the optimal start phase Ph.

Figure 8:
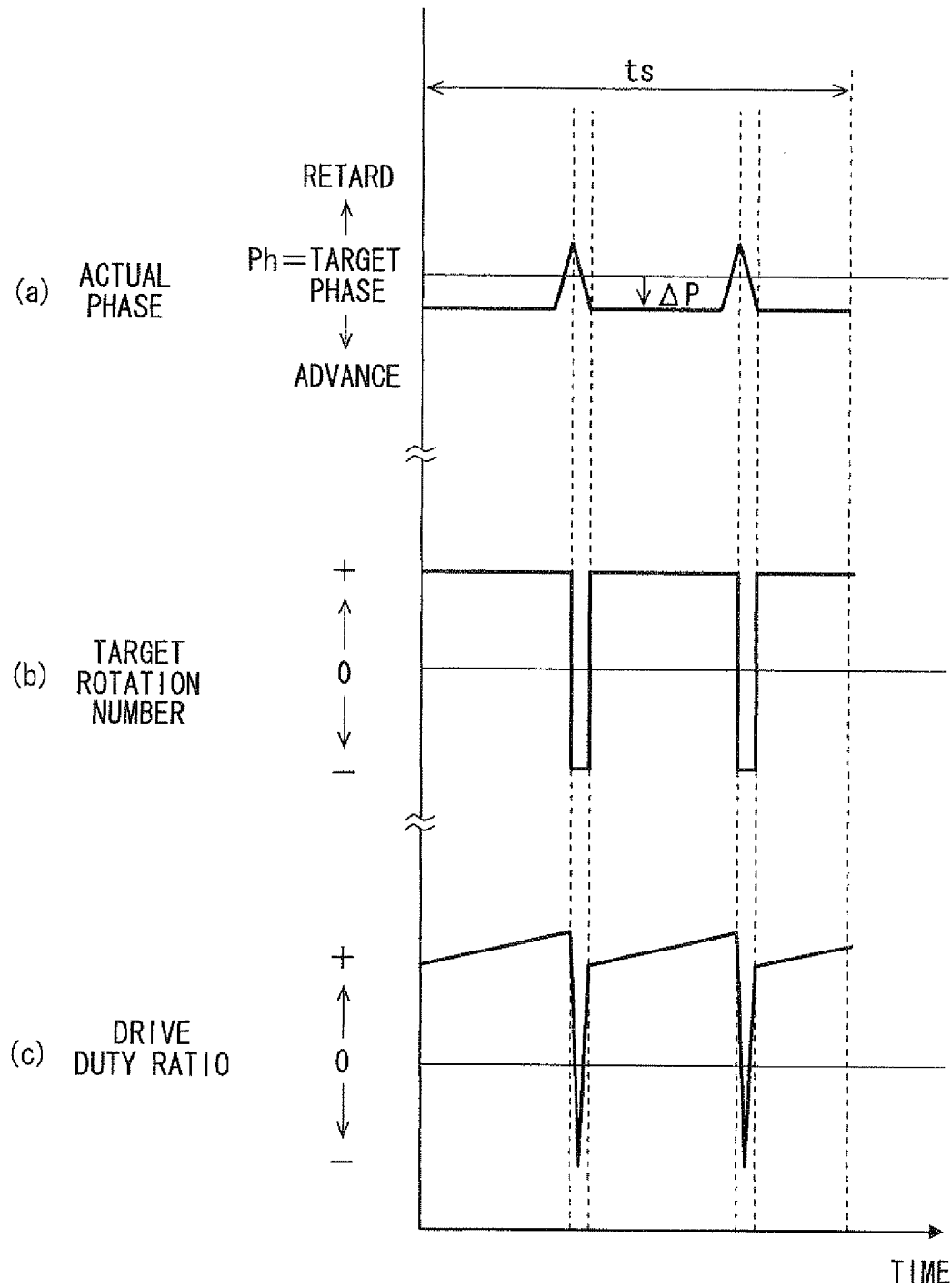
FIG. 8 is a graph illustrating values associated with exemplary direction determining processing as shown in FIG. 1.

As shown in an example in FIG. 8 where the cam torque direction Dca is a negative direction, with the above described FB control achieved using the motor torque Tm generated by setting the target rotational direction Dt in a positive direction to the actual phase Pr in an advance side from the target phase Pt, the actual phase Pr does not change until the drive duty ratio Rd becomes sufficiently large. That is, until the motor torque Tm in the motor shaft 102 becomes sufficiently large in a direction opposite to the cam torque Tca, the actual phase Pr does not change. On the other hand, when control is achieved by the motor torque Tm generated by setting the target rotational direction Dt in a negative direction to the actual phase Pr in a retard side from the target phase Pt, the actual phase Pr changes even if the drive duty ratio Rd is relatively small. That is, since the motor torque Tm in the motor shaft 102 acts in the same direction as the cam torque Tca, the actual phase Pr easily changes.

Therefore, when the motor torque Tm is generated by the FB control based upon the phase difference ΔP between the phases Pt and Pr, the actual phase Pr is shifted to a side corresponding to the cam torque Dca among the retard side and the advance side from the target phase Pt, that is, to the advance side in the example in FIG. 8(a). Accordingly, in the direction determining processing of the present embodiment, the cam torque direction Dca is determined based upon the shift generated in the actual phase Pr within a set time ts.

In the direction determining processing of the present embodiment, the target rotational direction Dt and the target rotational number St are physical amounts determined in accordance with the actual phase Pr and the drive duty ratio Rd is a physical amount determined in accordance with the target rotational number St. That is, since the target rotational direction Dt and the drive duty ratio Rd are physical amounts correlating to the actual phase Pr, when the motor torque Tm is generated by the FB control based upon the phase difference ΔP, the shifts are generated in both of the physical amounts within the set time ts as shown in FIG. 8(b) and (c). Since the shift of each of the target rotational direction Dt and the drive duty ratio Rd is generated in the reverse direction of the cam torque direction Dca, the cam torque direction Dca can be determined based also upon either of the target rotational direction Dt and the drive duty ratio Rd. The determination accuracy of the cam torque direction Dca can be also enhanced based upon at least two of the shifts of the actual phase Pr, the target rotational direction Dt and the drive duty ratio Rd. The determination of the cam torque direction Dca based upon the shift of the drive duty ratio Rd can be realized by outputting the drive duty ratio Rd from the drive circuit 130 to the control circuit 120 as needed.

Figure 14:
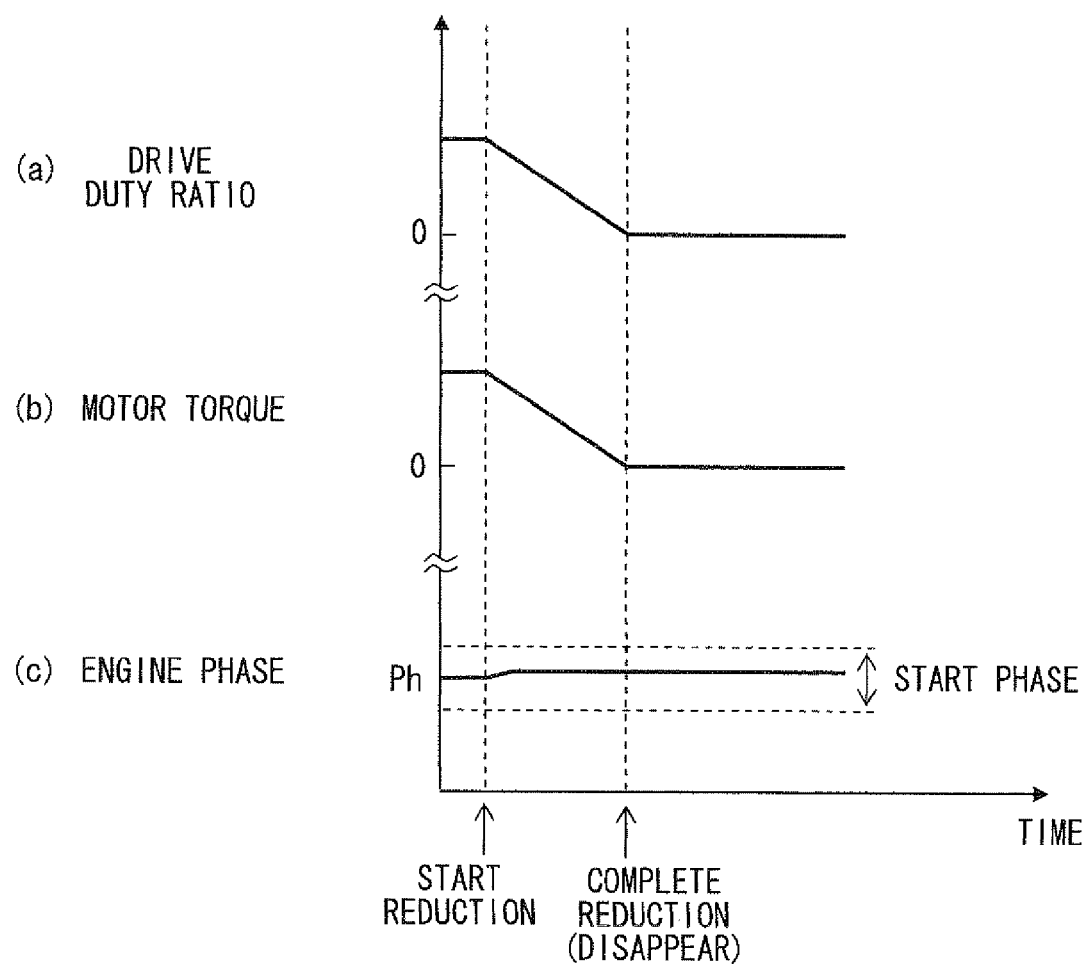
FIG. 14 is a graph further illustrating values associated with the exemplary torque eliminating processing with the correctness/incorrectness determination.

Hereinafter, torque eliminating processing with a correctness/incorrectness determination executed at S105 of control processing at a stop time will be explained in detail with reference to FIG. 12 to FIG. 14. FIG. 12 shows the results Ta1 Ta2 and Ta3 found by changing combined torque Ta of the torques Tm, Tca and Th acting on the motor shaft 102 by an increase/a decrease of the drive duty ratio Rd when the cam torque direction Dca is a negative direction. In FIG. 12, Ws shows a torque region in which the motor shaft 102 is balanced by a function of the combined torque Ta and also by receiving an influence of friction forces generating in the phase control mechanism 8 and the electric motor 4.

In the torque eliminating processing with the correctness/incorrectness determination, the control circuit 120 sets the control mode as the OR control mode. First, the control circuit 120 sets the target rotational direction Dt in the reverse direction of the determination direction Dca0 of the cam torque direction Dca by the direction determining processing. The control circuit 120 further sets the target rotational number St and the target drive system Ft respectively to an initial value and the regular drive, and outputs the set results of them and the set result of the above target rotational direction Dt to the power supply block 134 in the drive circuit 130, as the OR control values. Here the initial value of the target rotational number St is a value for generating the motor torque Tm balancing with the cam torque Tca and the magnetic retaining torque Th by the drive duty ratio Rd according to the initial value when the determination direction Dca0 is correct.

The drive unit 138 of the power supply block 134 which has received the OR control value from the control circuit 120 sets the power supply pattern switching state and the drive duty ratio Rd according to the control value, thereby generating the motor torque Tm in the target rotational direction Dt.

As a result, when the determination direction Dca0 is correct, that is, when the motor torque Tm is correctly applied against the cam torque Tca, the motor torque Tm balances with the torques Tca and Th without rotation of the motor shaft 102 or when the motor shaft 102 slightly rotates in the reverse direction of the target rotational direction Dt. A balance point is shown, for example, with a black circle on Ta1 in FIG. 12. Therefore, the actual phase Pr is held or changes toward a side corresponding to the reverse direction of the target rotational direction Dt among the retard side and the advance side.

More specifically, when the cam torque direction Dca and the determination direction Dca0 both are positive directions as shown in FIG. 13(a), when the motor torque Tm is generated in a negative direction as the target rotational direction Dt, the actual phase Pr is held or changes to the retard side. When the cam torque direction Dca and the determination direction Dca0 both are negative directions as shown in FIG. 13(b), when the motor torque Tm is generated in a positive direction as the target rotational direction Dt, the actual phase Pr is held or changes to the advance side.

When the determination direction is incorrect, that is, when the motor torque Tm assists the cam torque Tca in the same direction, the balance of the motor torque Tm with the torques Tca and Th disappears and the motor shaft 102 rotates in the target rotational direction Dt. Therefore, the actual phase Pr changes toward a side corresponding to the target rotational direction Dt among the retard side and the advance side.

More specifically, when the cam torque direction Dca is a positive direction and the determination direction Dca0 is a negative direction as shown in FIG. 13(c), when the motor torque Tm is generated in a positive direction as the target rotational direction Dt, the actual phase Pr changes to the retard side. When the cam torque direction Dca is a negative direction and the determination direction Dca0 is a positive direction as shown in FIG. 13(d), when the motor torque Tm is generated in a negative direction as the target rotational direction Dt, the actual phase Pr changes to the advance side.

From the above, the control circuit 120 of the present embodiment determines correctness/incorrectness of the determination direction Dca0 based upon a correlation between the change state of the actual phase Pr generated by generating the motor torque Tm in the reverse direction of the determination direction Dca0 and the target rotational direction Dt which is a direction of the motor torque Tm. As a result, when it is determined that the determination direction Dca0 is incorrect, the target rotational direction Dt is switched to reverse the direction of the motor torque Tm, thereby making the motor torque Tm balance with the torques Tca and Th. Therefore, also when the determination direction Dca0 is incorrect, rotation of the motor shaft 102 caused by the correctness/incorrectness determination can be restricted to be very small. When it is determined that the determination direction Dca0 is correct, the target rotational direction Dt is held, continuously realizing a balance state of the torques Tm, Tca and Th.

After thus balancing the torques Tm, Tca and Th, the control circuit 120 holds the target rotational direction Dt and the target drive system Ft among the OR control values outputted to the power supply block 134 and at the same time, gradually reduces the target rotational number St from an initial value at a correctness/incorrectness determination time. The drive unit 138 of the power supply block 134 sets the power supply pattern switching state and the drive duty ratio Rd according to the OR control value received from the control circuit 120. Particularly the drive duty ratio Rd determining a power supply amount to the electric motor 4 is gradually reduced as shown in FIG. 14(a) according to the target rotational number St. Accordingly, the motor torque Tm, which gradually reduces as shown in FIG. 14(b), can be generated in a state of opposing the cam torque Tca. The balance point of the torques Tm, Tca and Th, shown, for example with a black circle on Ta2 in FIG. 12, is realized as needed, resulting in restriction of rapid rotation of the motor shaft 102. It should be noted that in the present embodiment, a time reducing rate of the motor torque Tm associated with the target rotational number St and drive duty ratio Rd affecting a restricting effect to the rapid rotation is set constant. However, the rate may alternatively be gradually reduced, gradually increased or may be changed stepwise with time.

As a result, when the motor torque Tm is completely eliminated by setting the target rotational number St and the drive duty ratio Rd to a zero value, the magnetic retaining torque Th and the cam torque Tca are balanced in the motor shaft 102 receiving the restriction function of the rapid rotation until a point immediately before the elimination, such as, for example, a balance point shown with a black circle on Ta3 in FIG. 12. The engine phase, as shown in FIG. 14(c), remains to be shifted within a range of the start phase to a phase in the vicinity of the an optimal start phase Ph realized by the direction determining processing immediately before start of the torque eliminating processing with the correctness/incorrectness determination. The engine phase can be shifted in the vicinity of the optimal phase because the rotation of the motor shaft 102 is restricted to be very small at the time of the correctness/incorrectness determination of the determination direction Dca0 and also the time of elimination of the rapid rotation of the motor shaft 102. Therefore, after the elimination of the motor torque Tm, the magnetic retaining torque Th in which a peak value Thpk is larger than an absolute value of the cam torque Tca prevents rotation of the motor torque 102, making it possible to maintain the engine phase within the start phase as it is as shown in FIG. 14(c). According to the present embodiment, the start performance of the internal combustion engine can be assured.

In a first embodiment which has been explained so far, the power supply control system 6 can correspond to "control unit," the power supply control system 6 executing S104 and S105 of the control processing at the stop time can correspond to "balance means," the power supply control system 6 executing S104 of the control processing at the stop time can correspond to "torque direction determining means," and the power supply control system 6 executing S105 of the control processing at the stop time can correspond to "eliminating means" and correctness/incorrectness determining means.

(Second Embodiment)

Figure 15:
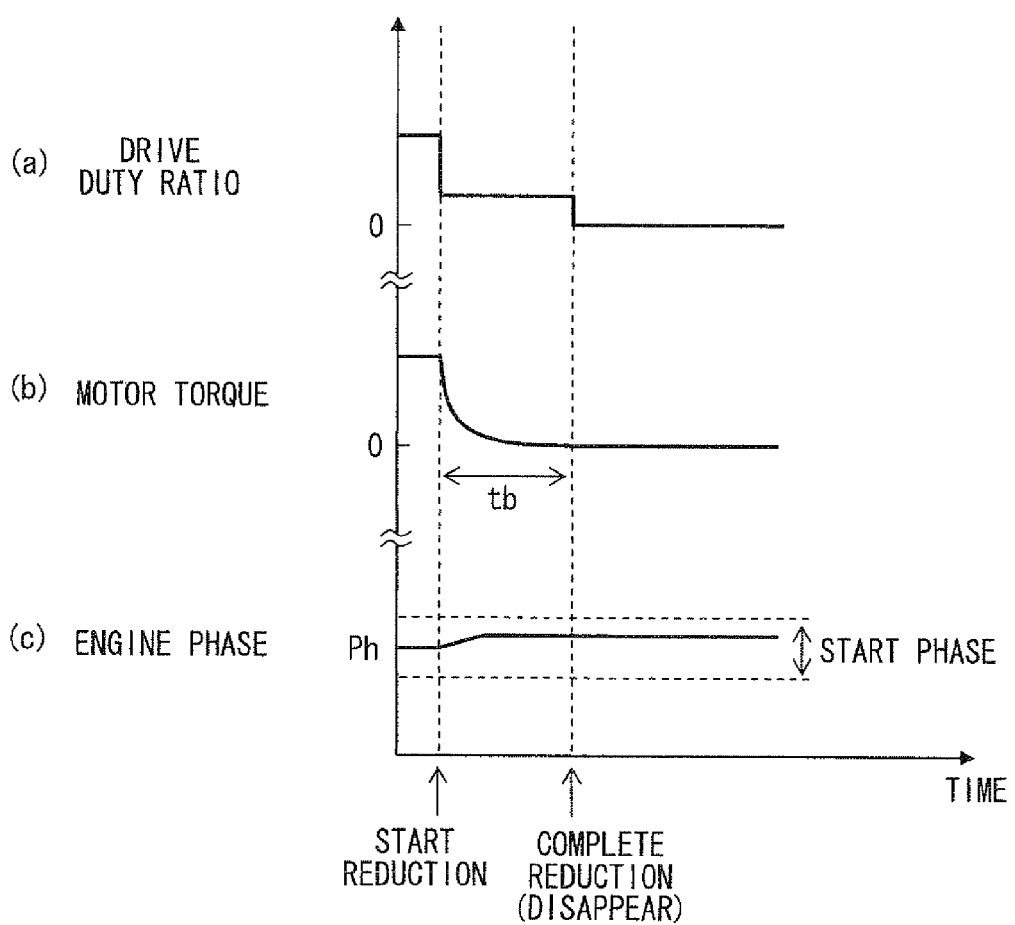
FIG. 15 is a graph illustrating values associated with exemplary torque eliminating processing with a correctness/incorrectness determination according to a second embodiment.

A second embodiment is, as shown in FIG. 15, a modification of a first embodiment. In the torque eliminating processing with the correctness/incorrectness determination by S105 in a second embodiment, after correctness/incorrectness of the determination direction Dca0 is determined according to a first embodiment, a brake torque is applied to the motor shaft 102 to gradually eliminate the motor torque Tm.

More specifically, after the control circuit 120 makes the correctness/incorrectness determination of the determination direction Dca0 to balance the torques Tm, Tca and Th, the control circuit 120 first sets the target rotational number St, the target rotational direction Dt and the target drive system Ft as the OR control values and outputs the results to the power supply block 134 of the drive circuit 130. The target rotational number St is set as a predetermined intermediate value between an initial value at a correctness/incorrectness determination time and a zero value. The target rotational direction Dt and the target drive system Ft are held in the same way as in a first embodiment.

The drive unit 138 of the power supply block 134 which has received the OR control value from the control circuit 120 sets the power supply pattern switching state and the drive duty ratio Rd according to the control value. Here particularly in the present embodiment, since the drive duty ratio Rd, as shown in FIG. 15(a), reduces to a value corresponding to the intermediate value of the target rotational number St, the motor torque Tm opposing the cam torque Tca is, as shown in FIG. 15(b), first reduced largely. As a result, the balance between the torques Tm, Tca and Th in the motor shaft 102 is disrupted, and the motor shaft 102 starts to rotate in the reverse direction of the target rotational direction Dt.

Accordingly, in the present embodiment, among the OR control values outputted from the control circuit 120 to the power supply block 134, the target rotational direction Dt and the target rotational number St are next held and the target drive system Ft is set to the brake drive. The drive unit 138 sets the power supply pattern switching state and the drive duty ratio Rd according to the OR control value received from the control circuit 120, thereby applying a brake torque to the motor shaft 102 starting to rotate in the reverse direction of the target rotational direction Dt. As a result, reduction of the motor torque Tm opposing the cam torque Tca is restricted as shown in FIG. 15(b) to create a gradual reduction state of the motor torque Tm, and therefore, the balance of the torques Tm, Tca and TH is again realized to restrict the rapid rotation of the motor shaft 102. In the present embodiment, a brake efficiency affecting the restricting effect to the rapid rotation is set constant by holding the target rotational number St and the drive duty ratio Rd, but may change with time.

The motor torque Tm thus gradually reduced becomes substantially a zero value after the time tb, corresponding to the above brake efficiency, elapses, as shown for example, in FIG. 15(b). Therefore, in the present embodiment, when the time tb elapses after the target rotational number St is set to the above intermediate value, the target rotational direction Dt and the target drive system Ft among the OR control values outputted from the control circuit 120 to the power supply block 134 are held and also the target rotational number St is set to a zero value. Thereby, the drive unit 138 sets the power supply pattern switching state and the drive duty ratio Rd according to the OR control value received from the control circuit 120, thereby completely eliminating the motor torque Tm.

According to the above construction, when the motor torque Tm is completely eliminated in the motor shaft 102, the magnetic retaining torque Th and the cam torque Tca are balanced. The motor shaft 102 is subjected to the restriction function for restricting the rapid rotation until immediately before the elimination is achieved. Upon elimination, the engine phase, as shown in FIG. 15(c), remains to be shifted within a range of the start phase based upon the principle according to a first embodiment. Therefore, after the elimination of the motor torque Tm, the magnetic retaining torque Th prevents rotation of the motor torque 102, making it possible to maintain the engine phase within a range of the start phase as it is as shown in FIG. 15(c). As a result, the start performance of the internal combustion engine can be assured.

(Third Embodiment)

Figure 16:
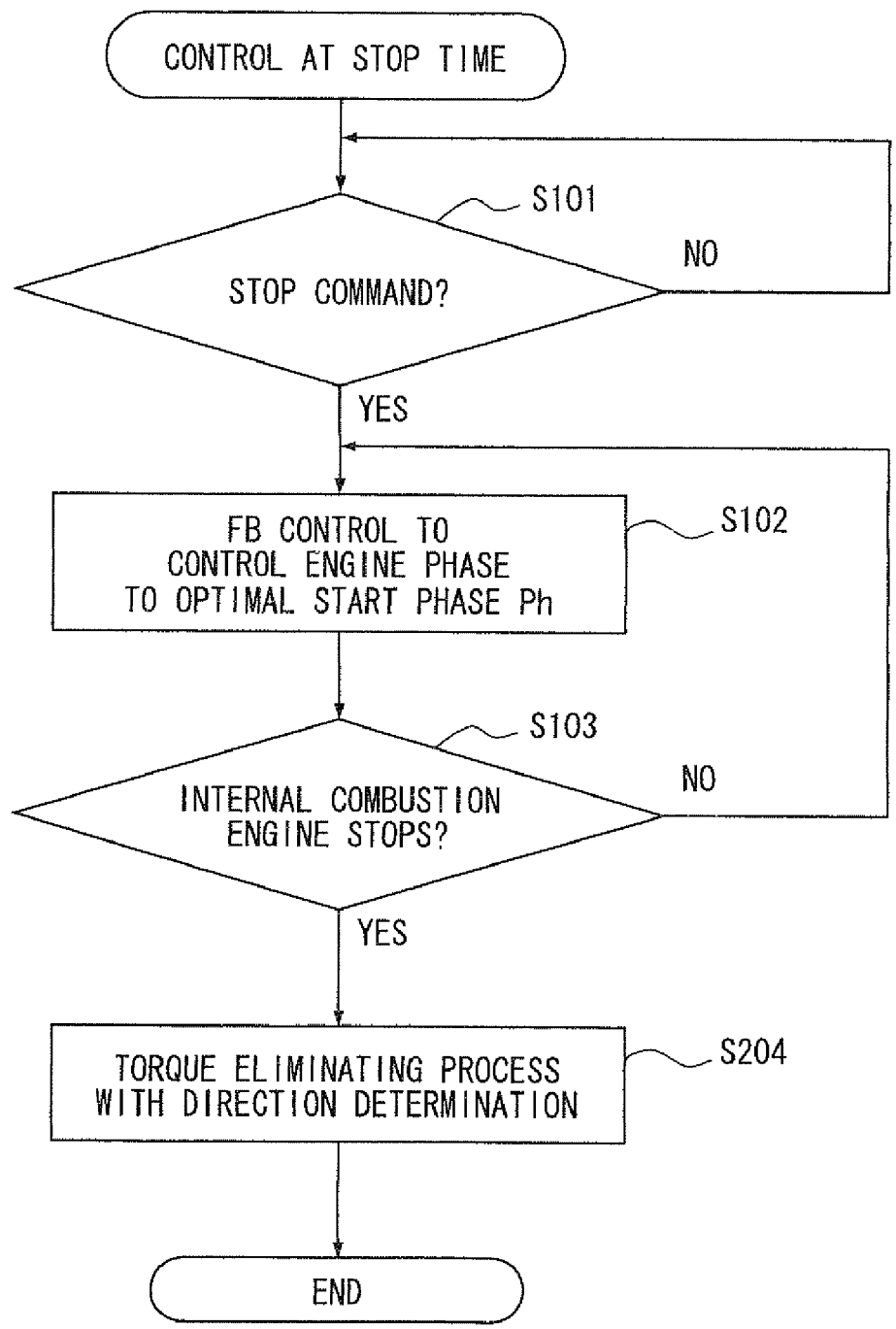
FIG. 16 is a flow chart illustrating exemplary control processing at a stop time of a power supply control system of a valve timing control device according to a third embodiment.

As shown in FIG. 16, a third embodiment is a modification of a first embodiment. In the control processing at the stop time in a third embodiment, S104 is not executed after executing S101 to S103, and the torque eliminating processing with the direction determination is executed as S204, different from S105 of a first embodiment.

More specifically, at S204, except for setting the target rotational direction Dt to a set direction Ds, which is determined in advance, the motor torque Tm corresponding to the initial value of the target rotational number St is first generated according to the correctness/incorrectness determination of the determination direction Dca0 in a first embodiment.

Thereby, when the motor torque Tm is generated in the set direction Ds to correctly oppose the cam torque Tca, the motor torque Tm balances with the torques Tca and Th without rotation of the motor shaft 102 or when the motor shaft 102 slightly rotates in the reverse direction of the set direction Ds. Therefore, the actual phase Pr in the present embodiment is held or changes toward a side corresponding to the reverse direction of the set direction Ds among the retard side and the advance side. When the motor torque Tm is generated in the set direction Ds to assist the cam torque Tca, the balance of the motor torque Tm with the torques Tca and Th disappears and therefore, the motor shaft 102 rotates in the set direction Ds. Therefore, the actual phase Pr changes toward the side corresponding to the set direction Ds among the retard side and the advance side.

From the above, the control circuit 120 of the present embodiment determines the present cam torque direction Dca based upon a correlation between a change state of the actual phase Pr occurring by generating the motor torque Tm in the set direction Ds and the set direction Ds. That is, when the actual phase Pr is held or changes to the side corresponding to the reverse direction of the set direction Ds, it is determined that the cam torque direction Dca is the reverse direction of the set direction Ds. When the actual phase Pr changes the side corresponding to the set direction Ds, it is determined that the cam torque direction Dca is the same direction as the set direction Ds. Thereby, the target rotational direction Dt is reversed from the set direction Ds to balance the torques Tm, Tca and Th. Therefore, the rotation of the motor shaft 102 caused by the above direction determination can be restricted to be very small.

After thus balancing the torques Tm, Tca and Th, the motor torque Tm is gradually reduced by the method according to a first embodiment to be eliminated, thereby ensuring the start performance of the internal combustion engine.

In a third embodiment, the power supply control system 6 executing S204 of the control processing at the stop time can correspond to "balancing means," "eliminating means" and "torque direction determining means."

(Fourth Embodiment)

Figure 17:
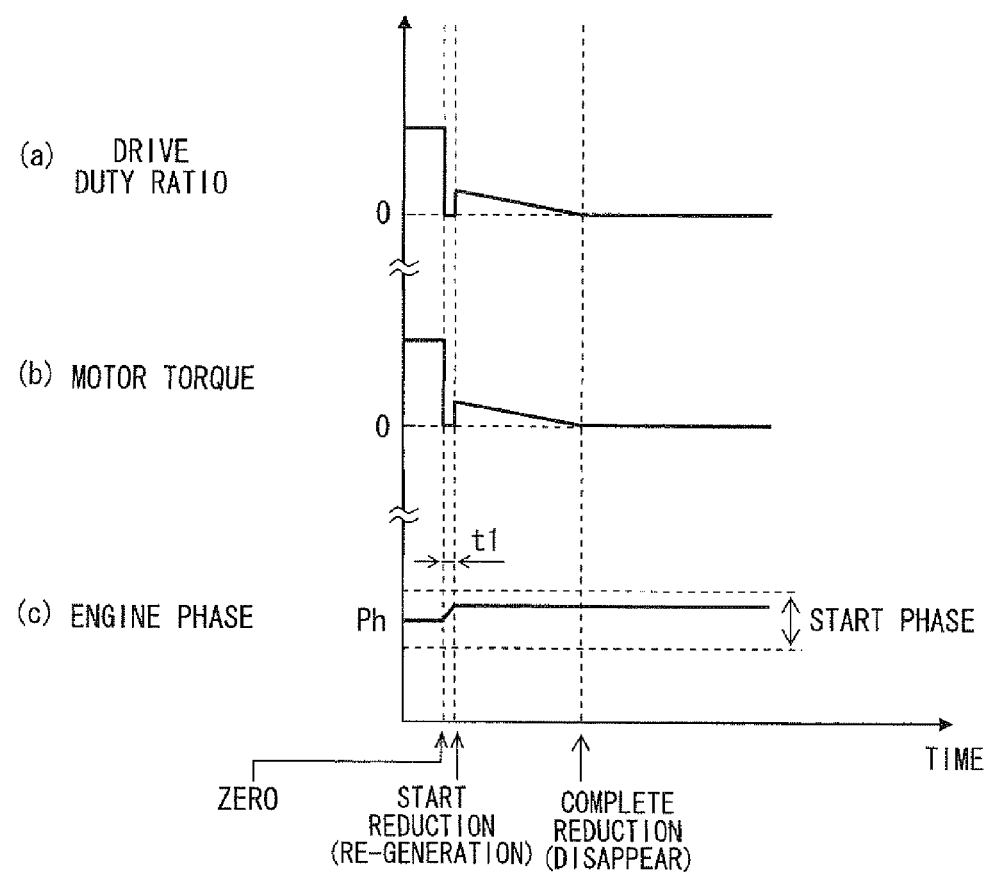
FIG. 17 is a graph illustrating values associated with exemplary torque eliminating processing with a correctness/incorrectness determination according to a fourth embodiment.

As shown in FIG. 17, a fourth embodiment is a modification of a first embodiment. In the torque eliminating processing with the correctness/incorrectness determination by S105 in a fourth embodiment, after determining the correctness/incorrectness of the determination direction Dca corresponding to a first embodiment, an increase or a decrease of the motor torque Tm is performed prior to gradually reducing the motor torque Tm.

More specifically, after the control circuit 120 makes the correctness/incorrectness determination of the determination direction Dca0 to balance the torques Tm, Tca and Th in the motor shaft 102, the control circuit 120 holds the target rotational direction Dt and the target drive system Ft as the OR control values outputted to the power supply block 134 of the drive circuit 130 and also sets the target rotational number St to a zero value. Thereby the drive unit 138 of the power supply block 134 sets the drive duty value Rd to a zero value as shown in FIG. 17(a) according to the OR control value from the control circuit 120 to reduce the motor torque Tm to a zero value as shown in FIG. 17(b). As a result, since the torque balance in the motor shaft 102 is disrupted, the motor shaft 102 starts to rotate in the actual cam direction Dca.

When the motor shaft 102 thus starts to rotate in the cam torque direction Dca, the friction force generated in the phase control mechanism 8 and the electric motor 4 changes from a static friction force in the torque balance state to a smaller dynamic friction force. For again realizing the torque balance to stop the rotation of the motor shaft 102, it is therefore sufficient to generate torque smaller than the torque before rotation corresponding to the initial value of the target rotational number St, as the motor torque Tm.

After the control circuit 120 reduces the motor torque Tm to a zero value, the control circuit 120 holds the target rotational direction Dt and the target drive system Ft as the OR control values outputted to the power supply block 134 and at the same time sets the target rotational number St to a balance realizing value smaller than the initial value. Thereby the drive unit 138 sets the power supply pattern switching state according to the OR control value from the control circuit 120 to again generate the motor torque Tm accurately opposing the cam torque Tca. The drive unit 138 sets the drive duty ratio Rd to a value corresponding to the above balance realizing value as shown in FIG. 17(a) according to the OR control value, and thereby realizes the re-balance with the torques Tca and Th by the motor torque Tm smaller than before the rotation of the motor shaft 102 as shown in FIG. 17(b). As shown in FIG. 17(c), time t1 from a point of first reducing the motor torque Tm to a zero value to a point of first more generating the motor torque Tm is determined in advance considering an estimated maximum rotational number of the motor shaft 102 or the like in such a manner that the engine phase is within a range of the start phase regardless of rotation of the motor shaft 102.

In the resulting re-balance state, the static friction force generated in the phase control mechanism 8 and the electric motor 4 becomes smaller than the static friction force in the torque balance state before the rotation of the motor shaft 102. After realizing the elimination according to a first embodiment by gradual reduction of the motor torque Tm, it is thereafter possible to avoid an event that the motor shaft 102 is made to rotate, by reduction of the static friction force behind the elimination of the motor torque Tm in the phase control mechanism 8 and the electric motor 4. That is, according to a fourth embodiment, it is possible to sufficiently prevent the error in start performance of the internal combustion engine resulting from, for example, an influence of the friction force unavoidably generated in the phase control mechanism 8 and the electric motor 4.

(Fifth Embodiment)

Figure 18:
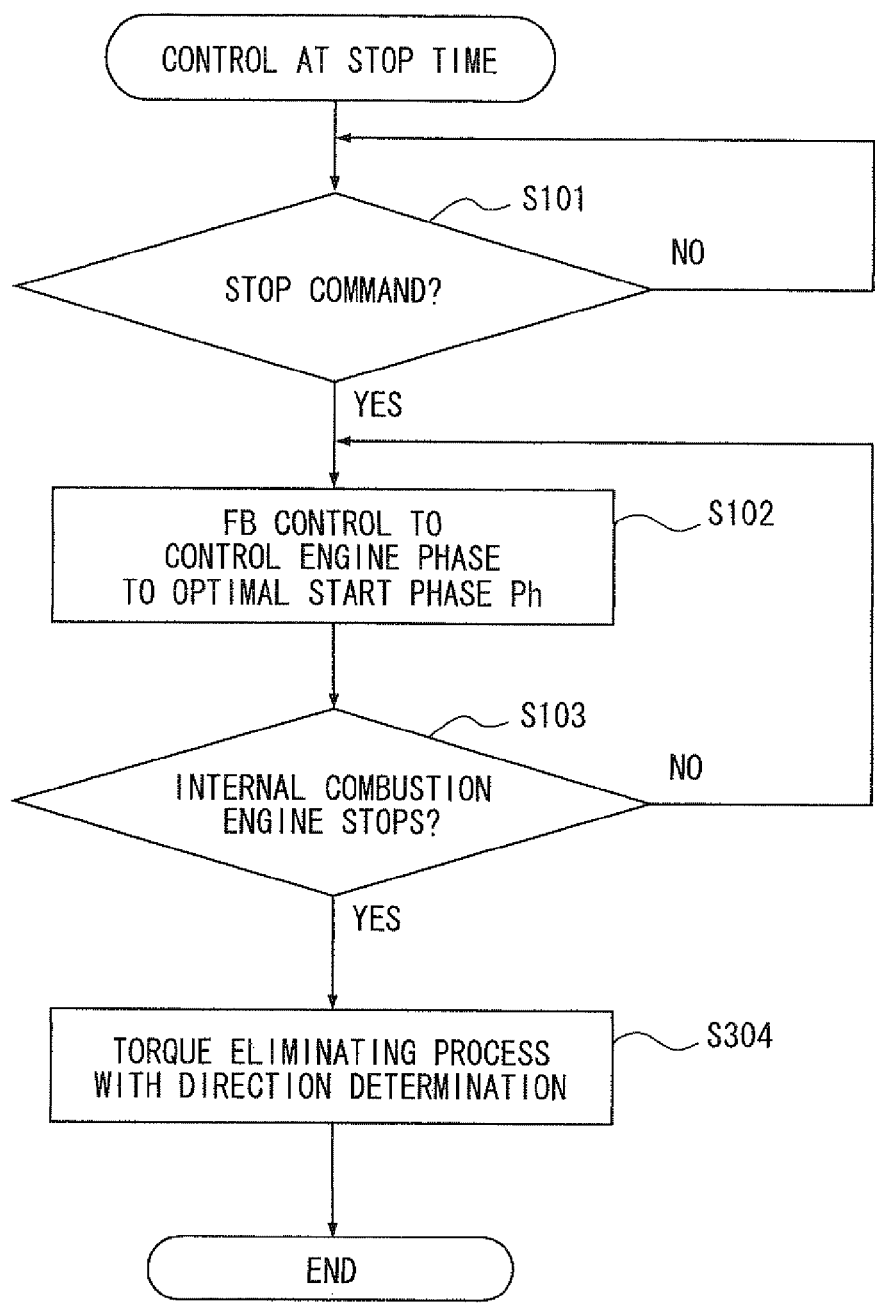
FIG. 18 is a flow chart illustrating exemplary control processing at a stop time of a power supply control system in a valve timing control device according to a fifth embodiment.
Figure 19:
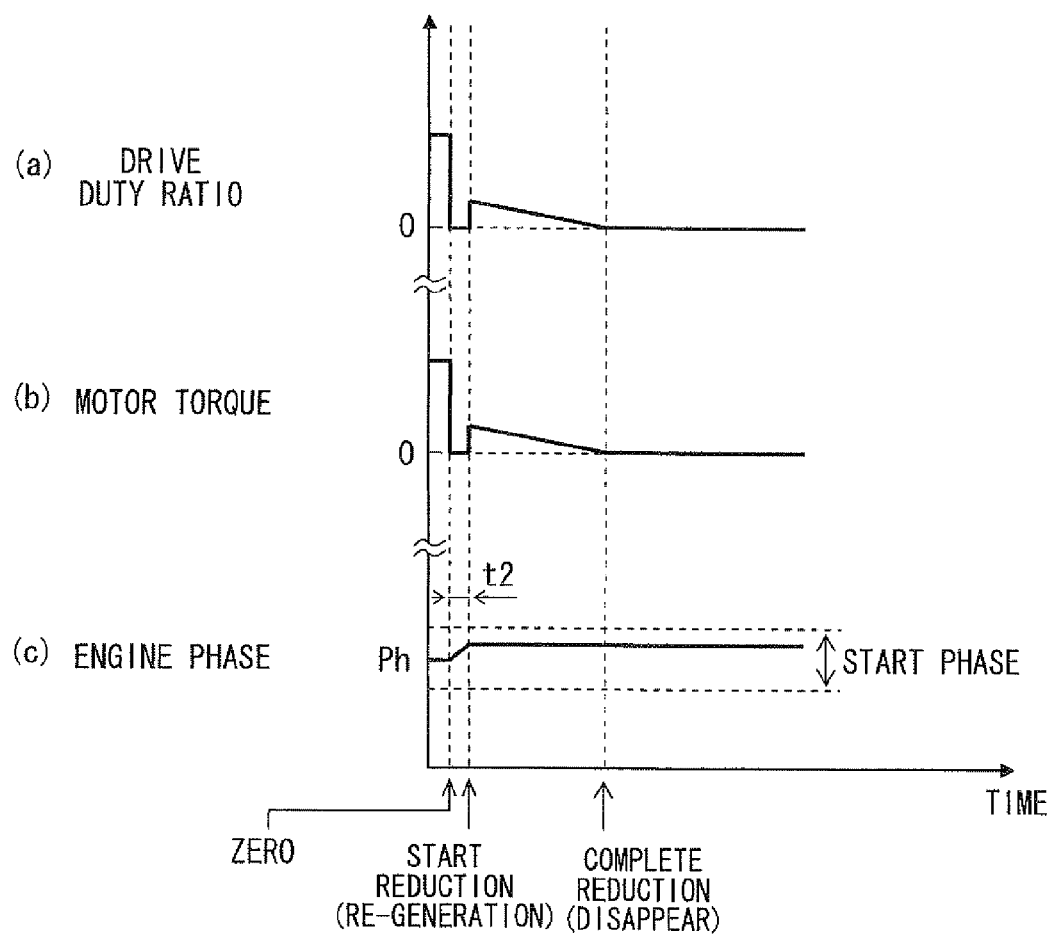
FIG. 19 is a graph illustrating values associated with the torque eliminating processing with a direction determination in FIG. 18.

As shown in FIG. 18, a fifth embodiment is a modification of a fourth embodiment. During control processing at a stop time in accordance with a fifth embodiment, S104 is not executed after executing S101 to S103, and the torque eliminating processing with the direction determination is executed as S304 different from S105 of a fourth embodiment. At the execution start time of the torque eliminating processing with the direction determination in the present embodiment, a generation state of the motor torque Tm occurs in which the engine phase is within a range of the start phase as shown in FIGS. 19(b) and 19(c) because of the state immediately after completing the execution of S103.

More specifically at S304, the control circuit 120 sets the control mode as the OR control mode and first sets the target rotational number St as the OR control value to a zero value, which is outputted to the power supply block 134 of the drive circuit 130. The drive unit 138 of the power supply block 134 sets the drive duty value Rd to a zero value as shown in FIG. 19(a) according to the OR control value from the control circuit 120 to reduce the motor torque Tm to a zero value as shown in FIG. 19(b). As a result, the motor shaft 102 starts to rotate in the actual cam direction Dca.

The actual phase Pr, when the motor torque Tm starts to rotate in the cam torque direction Dca, changes to a side corresponding to the actual cam torque direction Dca among the retard side and the advance side. Therefore, the control circuit 120 in the present embodiment determines the present cam torque direction Dca based upon a change state of the actual phase Pr generated by reducing the motor torque Tm to a zero value.

When the motor shaft 102 starts to rotate in the cam torque direction Dca, the friction force generated in the phase control mechanism 8 and the electric motor 4 changes from the static friction force to the dynamic friction force in the same way as in a fourth embodiment. Therefore, the control circuit 120 in the present embodiment sets the target rotational number St among the OR control values outputted to the power supply block 134 to the same balance value as in a fourth embodiment. The control circuit 120 further sets the target rotational direction Dt among the OR control values outputted to the power supply block 134 to the reverse direction of the cam torque direction Dca, that is, the determination direction Dca0, determined by reduction of the motor torque Tm and sets the target drive system Ft to the regular drive.

The drive unit 138 sets the power supply pattern switching state according to a fourth embodiment and the drive duty ratio Rd as shown in FIG. 19(a) by receiving the OR control value thus set, and thereby realizes the re-balance with the torques Tca and Th by the motor torque Tm which opposes the cam torque Tca and is smaller than before the rotation of the motor shaft 102 as shown in FIG. 19(b). As shown in FIG. 19(c), time t2 from a point of first reducing the motor torque Tm to a zero value to a point of first more generating the motor torque Tm after the direction determination is determined in advance considering an estimated maximum rotational number of the motor shaft 102 in such a manner that the engine phase is within a range of the start phase regardless of rotation of the motor shaft 102.

In the re-balance state thus realized, the static friction force generated in the phase control mechanism 8 and the electric motor 4 becomes smaller than before the rotation of the motor shaft 102. Accordingly, when the elimination of the motor torque Tm by gradual reduction thereof is realized by the method according to a first embodiment thereafter, it is possible to avoid the rotation of the motor shaft 102 by reduction of the friction force behind the elimination of the motor torque Tm. That is, according to a fifth embodiment, error in start performance of the internal combustion engine can be prevented.

In a fifth embodiment as explained so far, the power supply control system 6 executing S304 of the control processing at the stop time can correspond to "balancing means," "eliminating means" and "torque direction determining means."
(Modifications of a First to a Fifth Embodiments)

Modifications in accordance with a first to a fifth embodiment explained so far will be explained in greater detail hereinafter.

At S105 in a first and a second embodiment, the correct/incorrect determination of the determination direction Dca0 may be performed during gradual reduction of the motor torque Tm. At S204 in a third embodiment, at S105 in a fourth embodiment and at S304 in a fifth embodiment, the motor torque Tm may be gradually reduced and eliminated by the method according to a second embodiment. Further, at S105 in a fourth embodiment, the cam torque direction Dca may be determined by the method according to a third embodiment.
(Sixth Embodiment)

Figure 20:
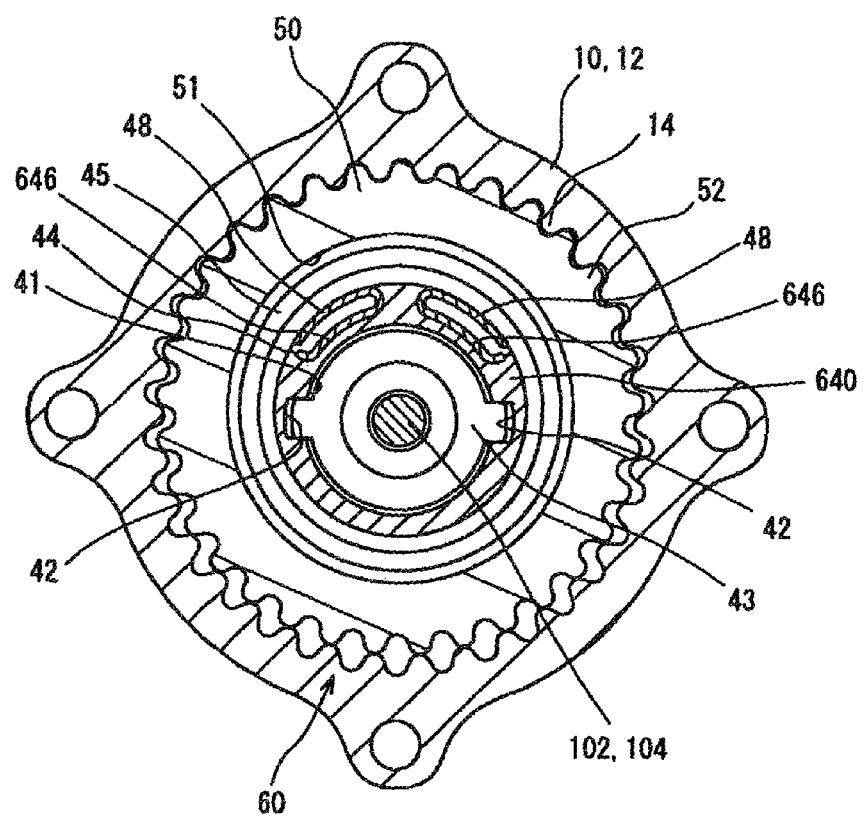
FIG. 20 is a diagram illustrating an exemplary construction of a phase control mechanism in a valve timing control device according to a sixth embodiment and a cross section taken along line IV-IV in FIG. 2.

As shown in FIG. 20, a sixth embodiment is a modification of a first embodiment. A planetary carrier 640 in a sixth embodiment is provided with a pair of recessed portions 646 arranged as shifted to an eccentric side in the eccentric part 44 relative to the internal gear parts 14 and 22 for accommodating the resilient members 48. The planetary carrier 640 rotates with the motor shaft 102 relative to the driving side rotary element 10 to generate resilient strain in each resilient member 48, so that the outer gear parts 52 and 54 of the planetary gear 50 are pressed against the internal gear parts 14 and 22 respectively by return forces of the resilient members 48.

Figure 21:
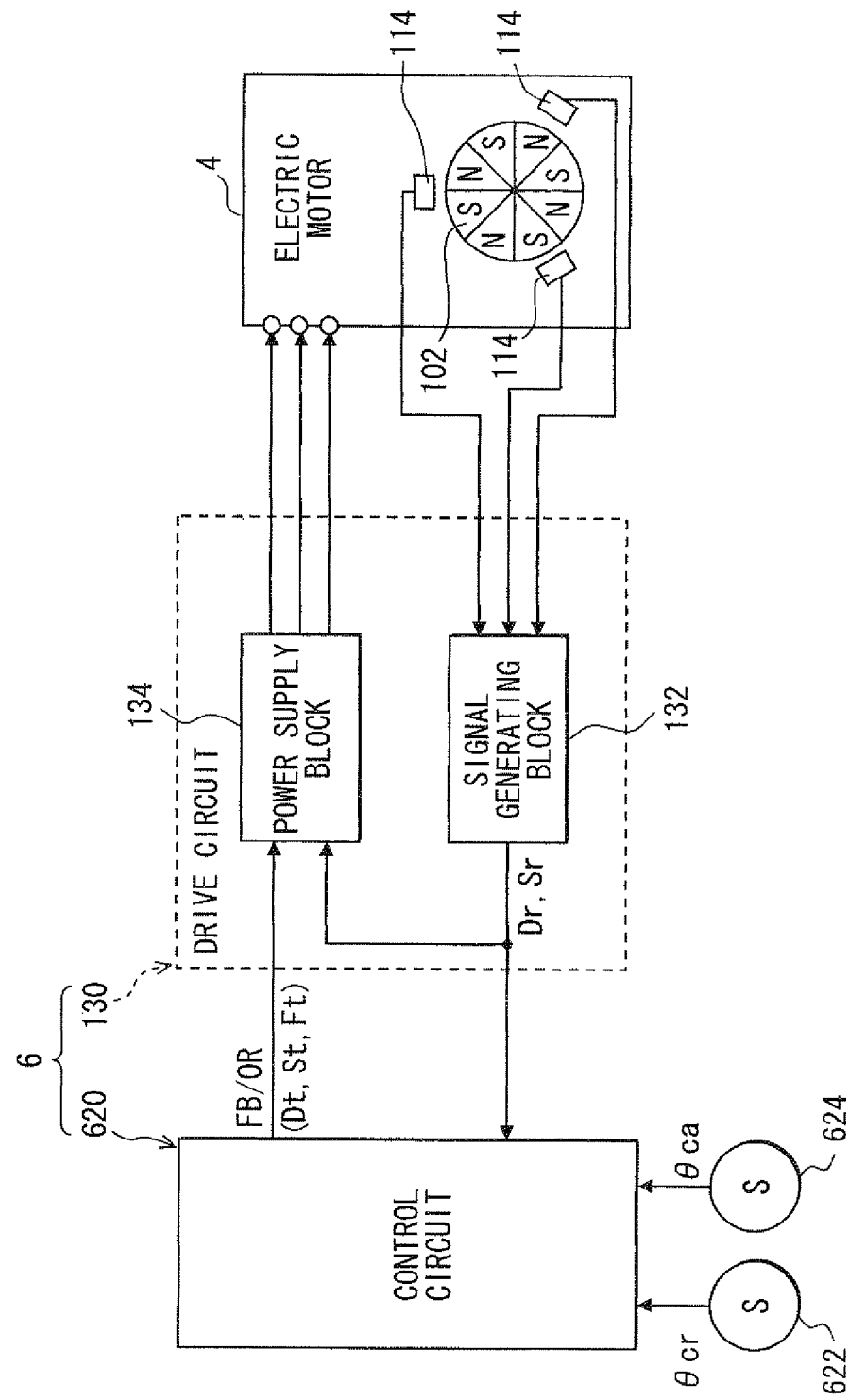
FIG. 21 is a block diagram illustrating an exemplary construction of a power supply control system in the valve timing control device according to a sixth embodiment.

As shown in FIG. 21, a crank sensor 622 for detecting a rotational angle θcr of the crank shaft and a cam sensor 624 for detecting a rotational angle θca of the cam shaft 2 are connected electrically to a control circuit 620. The control circuit 620 determines an operating state of the internal combustion engine based upon detection signals received from the respective sensors 622 and 624 and determines an operational state of the motor shaft 102 based upon signals received from the respective rotational sensors 114, realizing the accurate control of the motor power supply based upon the determination results.

Figure 22:
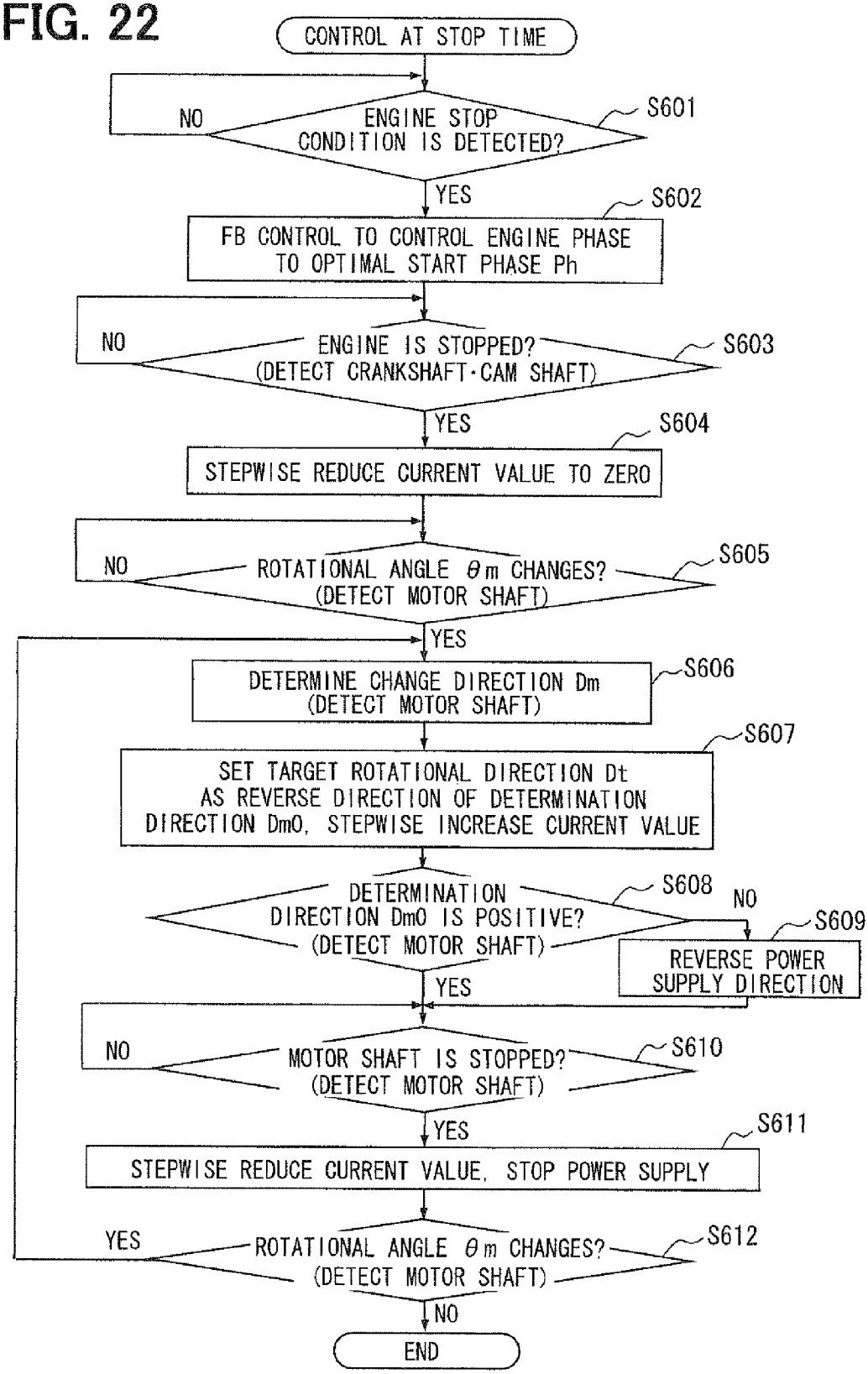
FIG. 22 is a flow chart illustrating exemplary control processing at a stop time of the power supply control system in the valve timing control device according to a sixth embodiment.

In the control processing at a stop time in a sixth embodiment, the power supply control processing S601 to S612 shown in FIG. 22 is executed instead of S101 to S105 in a first embodiment. Hereinafter, the power supply control processing in the present embodiment will be explained with reference to a flow in FIG. 22.

At S601 of the power supply control processing, the control circuit 620 determines whether or not a condition required for stopping the internal combustion engine, the condition hereinafter, referred to as the "engine stop condition," is detected. More specifically the engine stop condition can include at least one of the following conditions associated with the internal combustion engine: the ignition switch turned to the OFF position, a stopping of fuel injection, a stop associated with an idling stop system for example, a stop condition brought about when a brake is engaged and an accelerator pedal is disengaged, and the like. When such an engine stop condition is detected, the process proceeds to S602, otherwise, the process of S601 is repeated.

At S602, the control circuit 620 starts the FB control mode, corresponding to S102 in a first embodiment, to control the engine phase to the optimal start phase Ph or the phase in the vicinity thereof. At S603, the control circuit 620 maintains the FB control mode of S602 and determines whether or not the internal combustion engine is completely stopped based upon detection signals from the respective sensors 622 and 624 during the FB control mode. More specifically, when a detection signal from the crank sensor 622 represents a stop of the crank shaft having no change of the rotational angle θcr and a detection signal from the cam sensor 624 represents a stop of the cam shaft 2 having no change of the rotational angle θca, the control circuit 620 makes an engine stop determination, and the process proceeds to S604. Otherwise, the process of S603 is repeated. At S603, the stop of the internal combustion engine may be determined based upon the detection signal from the crank sensor 622 or the detection signal from the cam sensor 624.

Figure 23:
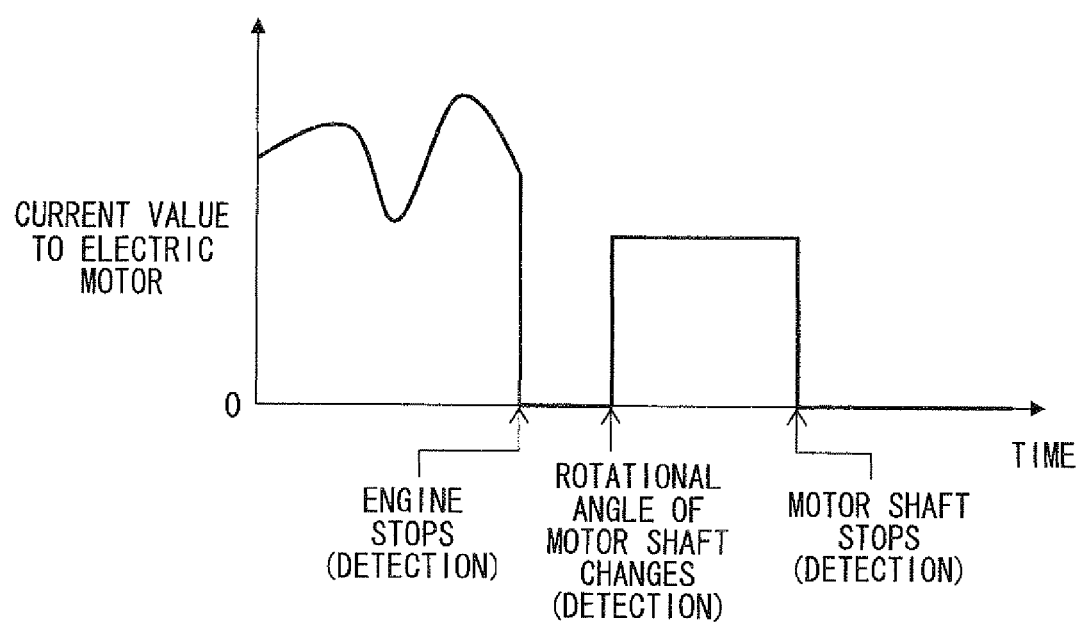
FIG. 23 is a graph illustrating exemplary values associated with power supply control processing associated with the control processing at the stop time of FIG. 22.

At S604, the control circuit 620 sets the control mode to the OR control mode and sets the target rotational number St as the OR control value to a zero value, which is outputted to the power supply block 134 of the drive circuit 130. The drive unit 138 of the power supply block 134 sets the drive duty value Rd to a zero value according to the OR control value from the control circuit 620. Accordingly, a current value which, in the present embodiment, is a power supply amount to the electric motor 4, is first stepwise reduced to a zero value as shown in FIG. 23 and also the motor torque Tm is first reduced to a zero value.

In the phase control mechanism 8 immediately after stopping the engine, strain energy due to resilient strain before the engine stop is usually accumulated in each resilient member 48. Therefore, the motor shaft 102 in which the torque balance is disrupted by reduction of the motor torque Tm releases the strain energy accumulated in each resilient member 48 and at the same time rotates in the actual cam torque direction Dca.

At S605, the control circuit 620 maintains the OR control mode of S604 and determines whether or not a rotational angle θm of the motor shaft 102 changes based upon detection signals from the respective rotational angle sensors 114 during the OR control mode. More specifically, when the rotational angle θm of the motor shaft 102 represented by the detection signals from the respective rotational angle sensors 114 changes by more than a set angle from a start time of S604 immediately before S605, the control circuit 620 makes an angle change determination that the rotational angle θm has changed, and the process proceeds to S606. Otherwise, the process of S605 is repeated. The set angle, which, in the present embodiment, is the determination condition of S605, is set in such a manner that a slight motion of the motor shaft 102 generated accidentally due to disturbances such as vehicle vibrations can be negligible, and also the strain energy is released by rotation of the motor shaft 102 until S602 to be described later. However, it should be noted that the engine phase does not exceed a range of the start phase.

At S606, the control circuit 620 maintains the OR control mode of S604 and at the same time determines the actual rotational direction Dr based upon the detection signal from each rotational angle sensor 114 as a change direction Dm of the rotational angle θm generated by reduction of the power supply amount.

At S607, the control circuit 620 sets the control mode as the OR control mode, and sets the target rotational direction Dt as the reverse direction of a determination direction Dm0 of the change direction Dm at S606. After the control circuit 620 sets the target rotational number St and the target drive system Ft to a set value and the brake drive respectively, the control circuit 620 outputs the set results and the set result of the target rotational direction Dt as the OR control values to the power supply block 134 of the drive circuit 130. The set value of the target rotational number St is a value for applying a brake torque to the motor shaft 102 in a direction opposing the determination direction Dm0 based upon the drive duty ratio Rd corresponding to the set value to balance the torques Tm, Tca and Th.

At S607, the drive unit 138 of the power supply block 134 which has thus received the OR control value from the control circuit 620 sets the power supply pattern switching state and the drive duty ratio Rd. Accordingly, when the determination direction Dm0 is correct, a current amount which is the power supply amount to the electric motor 4 stepwise increases as shown in FIG. 23 in the power supply direction of applying a brake torque to the motor shaft 102. Therefore, the motor torque Tm opposes the cam torque Tca to lower a changing speed of the rotational angle θm of the motor shaft 102, so that the torques Tm, Tca and Th are balanced. When the determination direction Dm0 is incorrect, the motor torque Tm generated by the power supply does not oppose the cam torque Tca, leading to an increase of the changing speed of the rotational angle θm of the motor shaft 102.

At S608, the control circuit 620 maintains the OR control mode of S607 and at the same time determines correctness/incorrectness of the determination direction Dm0 based upon the detection signal from each rotational angle sensor 114. More specifically when the changing speed of the rotational angle θm of the motor shaft 102 generated as then actual rotational number Sr of the electric motor 4 due to an increase of the power supply amount increases in the determination direction Dm0, the control circuit 620 makes a determination that the determination direction Dm0 is incorrect, and the process proceeds to S609. At S609, the control circuit 620 switches the target rotational direction Dt among the OR control values to reverse the power supply direction to the electric motor 4, thereby realizing the balance of the torques Tm, Tca and Th. Therefore, even when the determination direction Dm0 is incorrect, a rotational amount of the motor shaft 102 due to the determination can be restricted by rapid execution of S609.

After the execution of S609 and when it is determined at S608 that the determination direction Dm0 is correct, the process proceeds to S610 with the torques Tm, Tca and Th being balanced. At S610, the control circuit 620 maintains the OR control mode immediately before S610 among the OR control modes associated with S609 and S608, and, at the same time, determines based upon the detection signal from each rotational angle sensor 114, whether or not the motor shaft 102 stops. More specifically when the rotational angle θm represented by the detection signal from each rotational angle sensor 114 does not change for more than a predetermined time, the control circuit 620 makes the motor stop determination that the motor shaft 102 has stopped, and the process proceeds to S611. Otherwise, the process of S610 is repeated.

At S611, the control circuit 620 executes the OR control mode corresponding to S604, thereby stepwise reducing the current value which is the power supply amount to the electric motor 4 as shown in FIG. 23 to a zero value. Accordingly, since the power supply to the electric motor 4 stops, the motor torque Tm is completely eliminated. In the present embodiment in which the motor shaft 102 is stopped by the braking function as described above, since the motor torque Tm is reduced to a small amount by the time the motor torque Tm is eliminated, the magnetic retaining torque Th and the cam torque Tca tend to be easily balanced at the elimination time.

At S612, the control circuit 620 determines, according to S605, whether or not the rotational angle θm of the motor shaft 102 changes after stopping the power supply at S611. However, at S612, when the angle change determination is not made within a predetermined time, the control processing at the stop time is completed estimating that the motor shaft 102 is completely stopped by balancing the torques Th and Tca. The engine phase at the control processing completion time remains to be shifted within a range of the start phase relative to the optimal start phase Ph realized immediately before executing S604 or in the vicinity thereof. The engine phase remains to be shifted because the rotation of the motor shaft 102 by the power supply amount reduction is restricted to the order of the aforementioned set angle by the determinations of S605 and S612 and is restricted to be very small at the determination time of S608.

When the angle change determination is made at S612, the balance of the torques Th and Tca is presumed to be disrupted and the motor shaft 102 is presumed to be in a rotational state, and the process proceeds back to S606. Accordingly, S611 and S612 are replaced by S604 and S605, and S606 to S612 are repeated until the torques Th and Tca are balanced. Finally the control processing at the stop time is completed in a state where the motor shaft 102 is completely stopped.

As described above, after the control processing at the stop time in a sixth embodiment is completed, the rotation of the motor shaft 102 is prevented by the magnetic retaining torque Th having a peak value Thpk larger than an absolute value of the cam torque Tca. Thereby the engine phase is held to be within a range of the start phase as it is. Particularly after the control processing at the stop time in a sixth embodiment is completed, the strain energy accumulated in the phase control mechanism 8 immediately after the engine stop is released. Therefore, the rotation of the motor shaft 102 due to the release of the strain energy, finally the shift of the engine phase also can be restricted. As a result, according to a sixth embodiment, establishment of the start performance of the internal combustion engine can be ensured.

In a sixth embodiment explained so far, among the power supply control processing of the control processing at the stop time, the power supply control system 6 executing S607 to S610 can correspond to "balancing means," the power supply control system 6 executing S604, S605, S611 and S612 can correspond to "eliminating means." Among the power supply control processing of the control processing at the stop time, the power supply control system 6 executing S602, S604, S607, S609 and S611 can correspond to "power supply control means," the power supply control system 6 executing S603 can correspond to "engine determining means," the power supply control system 6 executing S605, S610 and S612 can correspond to "motor determining means," the power supply control system 6 executing S606 can correspond to "change direction determining means," and the power supply control system 6 executing S608 can correspond to "correct/incorrect determining means."

(Seventh Embodiment)

Figure 24:
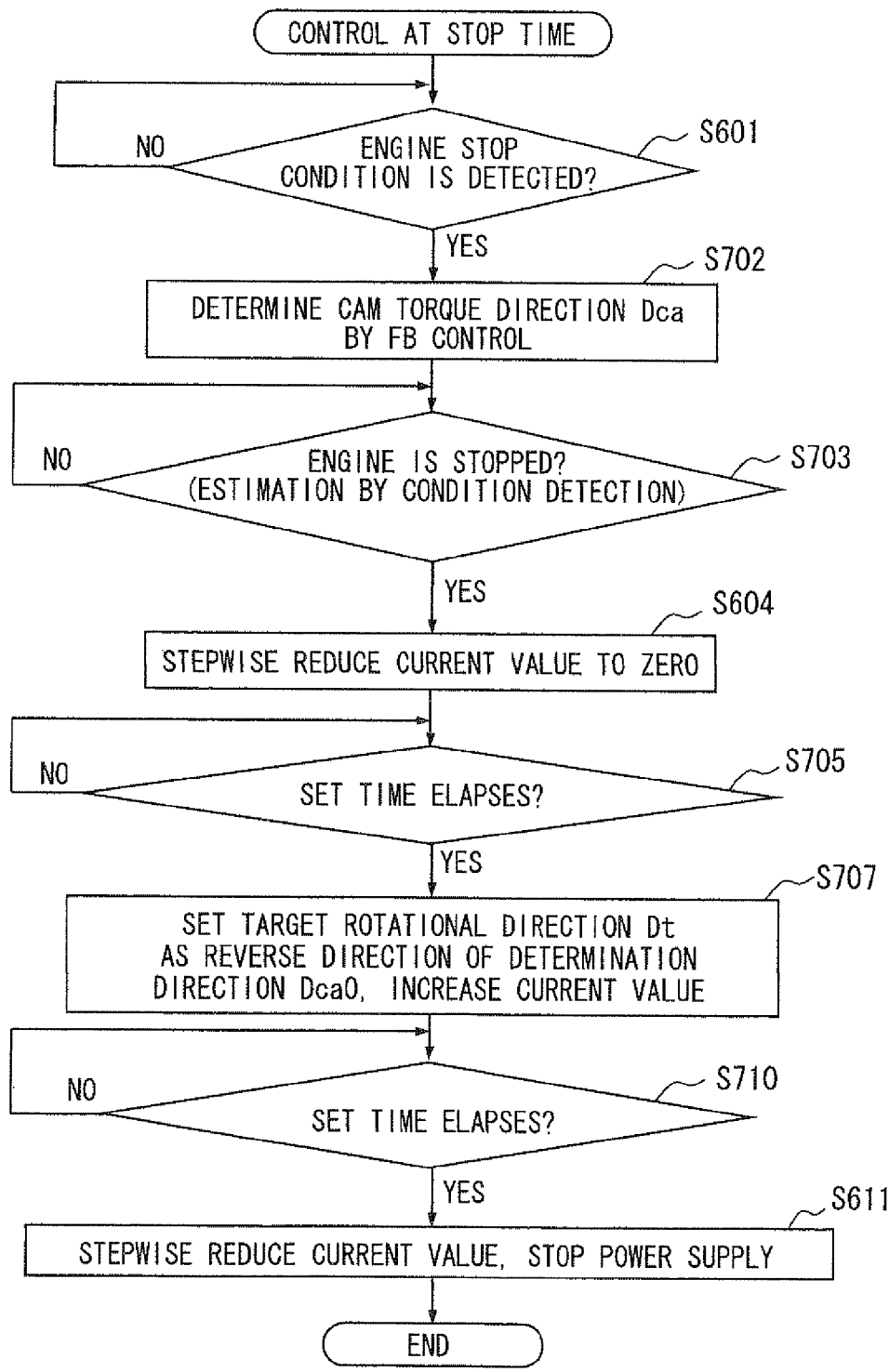
FIG. 24 is a flow chart illustrating exemplary control processing at a stop time of a power supply control system in a valve timing control device according to a seventh embodiment.

As shown in FIG. 24, a seventh embodiment is a modification of a sixth embodiment. In the control processing at a stop time in a seventh embodiment, S702, S703, S705, S707 and S710 of the power supply control processing are respectively executed instead of S602, S603, S605 and S606, S607 to S609, and S610 thereof.

More specifically at S702, the control circuit 620 executes the direction determining processing corresponding to S104 explained in a first embodiment to accurately determine the cam torque direction Dca under the FB control mode.

At S703, the control circuit 620 maintains the FB control mode of S702 and determines whether or not the internal combustion engine is completely stopped, based upon an estimation result on the complete stop time during the FB control mode. Whether or not the internal combustion engine is at the complete stop state is estimated based upon whether or not a required stop time, such as, for example, about 2 seconds, set in advance as the time required for the complete stop of the internal combustion engine, elapses after a point of detection of the engine stop condition by S601. When the stop required time elapses, the engine stop determination is made and the process proceeds to S604. Otherwise, the process of S703 is repeated.

Figure 25:
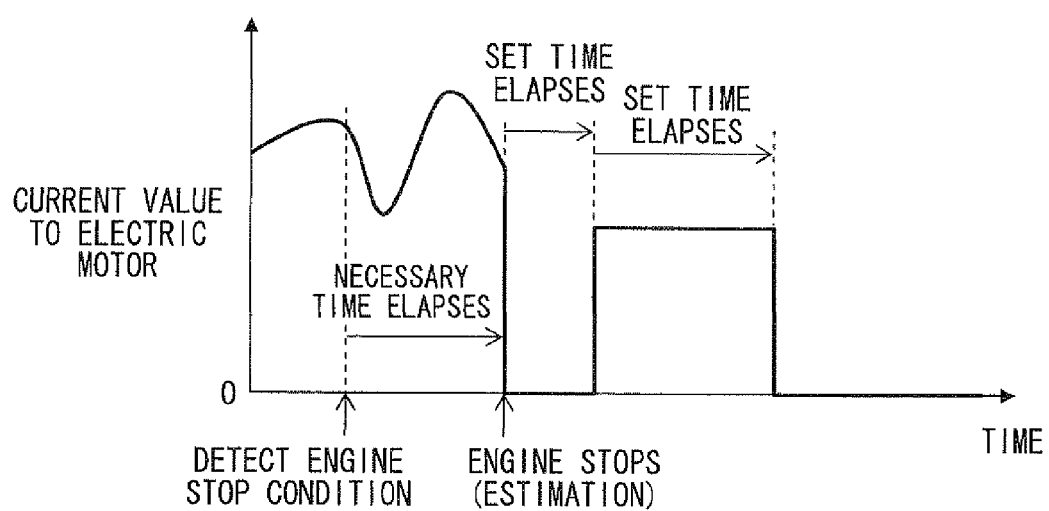
FIG. 25 is a graph illustrating exemplary values associated with power supply control processing of the control processing at the stop time shown in FIG. 24.

At S705 advanced from S604 in which the power supply amount to the electric motor 4 is first reduced as shown in FIG. 25, the control circuit 620 determines whether or not a set time elapses after the execution start of S604 while maintaining the OR control mode of S604. As a result, the process of S705 is repeated until a positive determination is made, at which point the process proceeds to S707. The set time as the determination condition of S705 is set, for example, on the order of 100 ms so that the strain energy is released by rotation of the motor shaft 102, but an engine phase does not exceed a range of the start phase.

At S707, the control circuit 620 sets the control mode as the OR control mode and sets the target rotational direction Dt as the reverse direction of the determination direction Dca0 of the cam torque direction Dca by S702. After the control circuit 620 sets the target rotational number St and the target drive system Ft to a set value and the regular drive respectively, the control circuit 620 outputs the set results and the set result of the target rotational direction Dt as the OR control values to the power supply block 134 of the drive circuit 130. The set value of the target rotational number St is a value for generating the motor torque Tm in a direction opposing the determination direction Dca0 based upon the drive duty ratio Rd corresponding to the set value to balance the torques Tm, Tca and Th.

At S707, the drive unit 138 of the power supply block 134, which has thus received the OR control value from the control circuit 620, sets the power supply pattern switching state and the drive duty ratio Rd. Accordingly, a current amount, which, in the present embodiment, is a power supply amount to the electric motor 4 stepwise increases as shown in FIG. 25 in the power supply direction of generating the motor torque Tm as opposed to the determination direction Dca0. Therefore, the motor torque Tm opposes the cam torque Tca to lower the changing speed of the rotational angle θm of the motor shaft 102, so that the torques Tm, Tca and Th can be easily balanced.

At S710 subsequent to S707 described above, the control circuit 708 determines whether or not a set time elapses after the execution start of S707 while maintaining the OR control mode of S707. As a result, the process of S710 is repeated until the positive determination is made, at which point the process proceeds to Sell for stopping the power supply as shown in FIG. 25. The set time as the determination condition of S710 is set as time required for stopping the motor shaft 102 by balancing torques Tm, Tca and Th by an increase of the power supply amount started at S707, for example, the order of 300 ms. After the process transfers from S710 to S611, wherein the power supply to the electric motor 4 is stopped, the control processing at the stop time is completed under a state where the motor shaft 102 is completely stopped by the balance of the torques Th and Tca.

According to a seventh embodiment as described above, since the engine stop determination is made by an indirect estimation using detection of the engine stop condition, the sensors 622 and 624 or the construction for connecting the sensors 622 and 624 electrically to the control circuit 620 is not necessary for the engine stop determination. According to a seventh embodiment, after the power supply amount is first reduced, the increase of the power supply amount and the stop of the power supply are automatically performed by sequence control, and at the same time, the release of the strain energy and the complete stop of the motor shaft 102 can be completely realized. Therefore, the simple power supply control processing can be executed. Accordingly, according to a seventh embodiment, it is possible to ensure the start performance of the internal combustion engine at a low cost.

In a seventh embodiment explained so far, among the power supply control processing of the control processing at the stop time, the power supply control system 6 executing S707 and S710 can correspond to "balancing means," the power supply control system 6 executing S604, S705, and S611 can correspond to "eliminating means" and the power supply control system 6 executing S702 can correspond to "torque direction determining means." Among the power supply control processing of the control processing at the stop time, the power supply control system 6 executing S702, S604, S705, S707, S710 and S611 can correspond to "power supply control means," and the power supply control system 6 executing S601 and S703 can correspond to "engine determining means."

(Eighth Embodiment)

Figure 26:
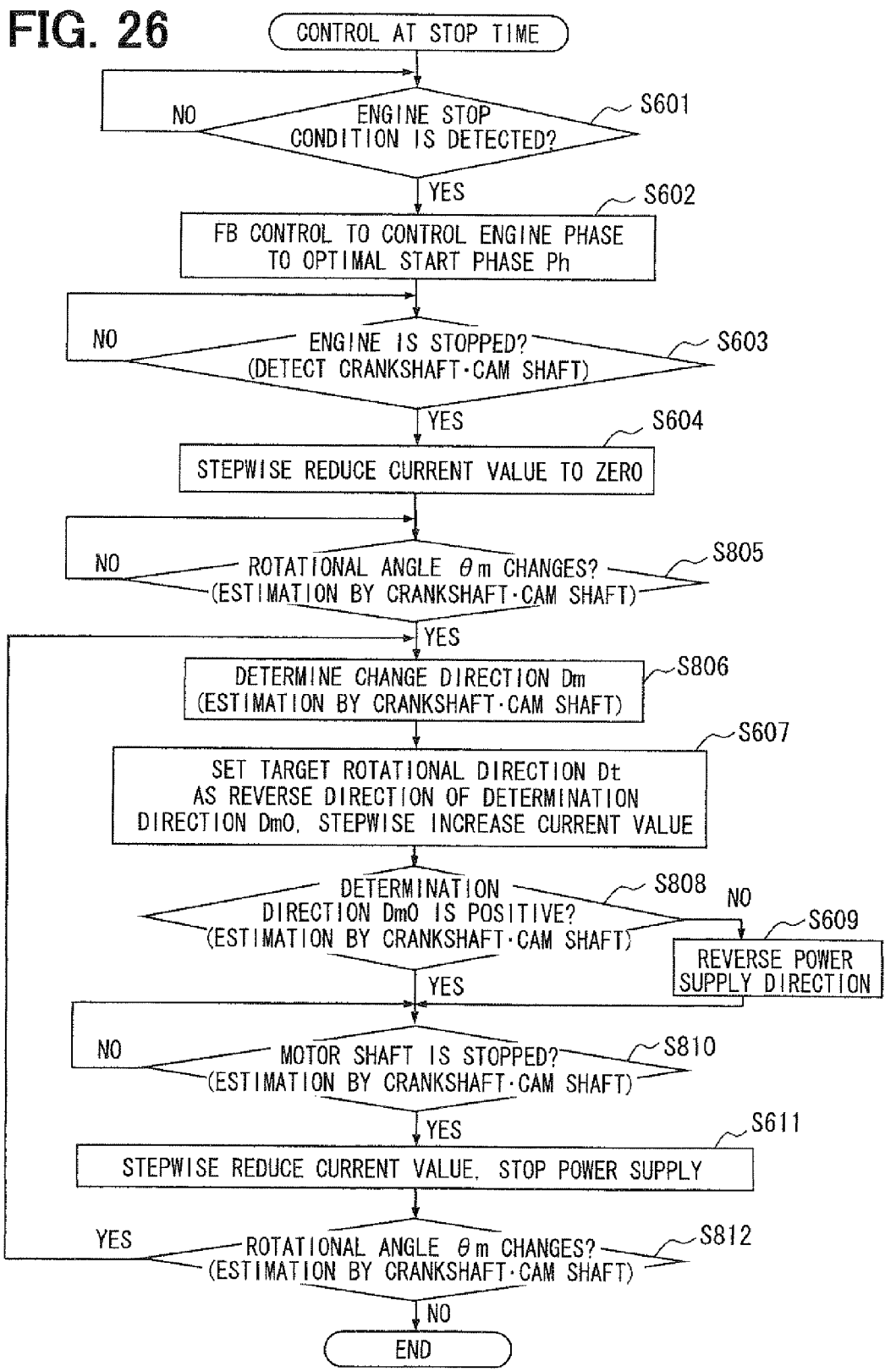
FIG. 26 is a flow chart illustrating control processing at a stop time of a power supply control system in a valve timing control device according to an eighth embodiment.

As shown in FIG. 26, an eighth embodiment is a modification of a sixth embodiment. In the control processing at a stop time in an eighth embodiment, S805, S806, S808, S810 and S812 of the power supply control processing are executed instead of S605, S606, S608, S610 and S612 thereof.

More specifically at S805, the control circuit 620 maintains the OR control mode of S604 and determines whether or not the rotational angle θm of the motor shaft 102 changes based upon detection signals from the crank sensor 622 and the cam sensor 624 during the OR control mode. More specifically the actual phase Pr of the engine phase is calculated based upon the rotational angles Qcr and Qca of the crank shaft and the cam shaft 2 represented respectively by the detection signals from the crank sensor 622 and the cam sensor 624. When the actual phase Pr changes by more than a set range after a start time of S604 immediately before S805, the control circuit 620 estimates that the rotational angle θm has changed. When the change of the rotational angle θm is thus estimated, the angle change determination is made and the process proceeds to S806. Otherwise, the process of S805 is repeated. The set range of the actual phase Pr, which is the determination condition of S805, is set in such a manner that a slight movement of the motor shaft 102, the crank shaft or the cam shaft 2 generated accidentally and also by release of the strain energy by rotation of the motor shaft 102, can be negligible while ensuring that the engine phase does not exceed a range of the start phase. At S805 after the engine stop, the change of the rotational angle θm may be determined based upon only a detection signal from the cam sensor 624.

At S806, the control circuit 620 maintains the OR control mode of S604 and determines the changing direction Dm of the rotational angle θm of the motor shaft 102 based upon detection signals from the sensors 622 and 624 during the OR control mode. More specifically, according to the determination of the cam torque direction Dca at S304 explained in a fifth embodiment, the determination is made based upon the change state of the actual phase Pr estimating that the cam torque direction Dca is equal to the change direction Dm. As described above, however, the actual phase Pr in the present embodiment is calculated based upon the rotational angles θcr and θca. Therefore, at S806 the change direction Dm is estimated in accordance with the change state of the actual phase Pr calculated based upon the rotational angles θcr and θca, and the estimation result is adopted as the determination direction Dm0. At S806 after the engine stop, the change direction Dm may be determined based upon only the detection signal from the cam sensor 624.

Figure 27:
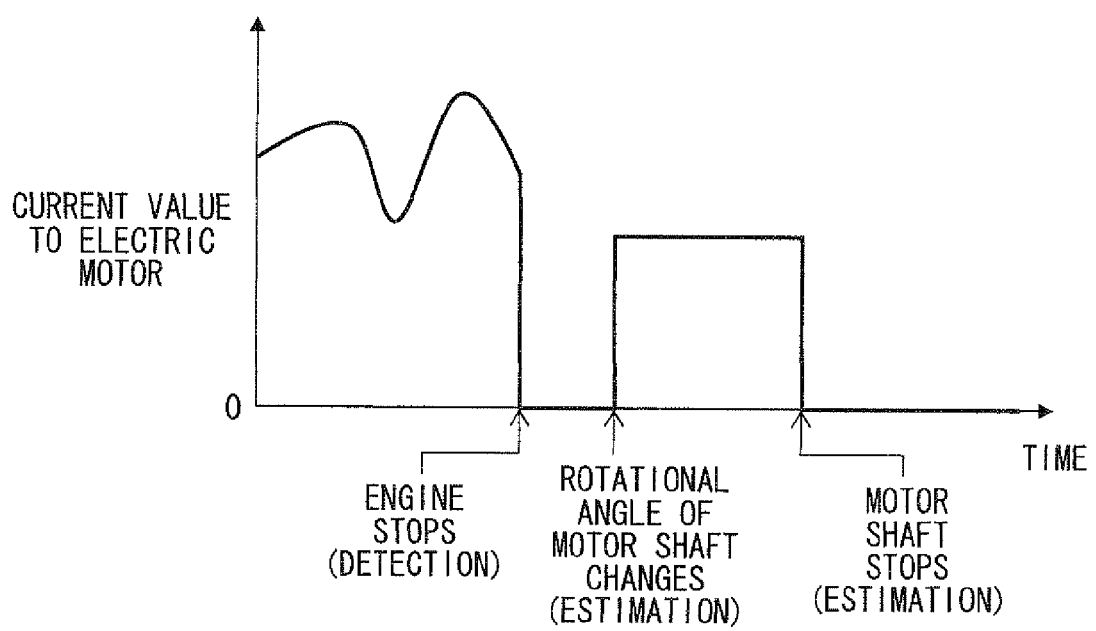
FIG. 27 is a graph illustrating exemplary values associated with power supply control processing of the control processing at the stop time shown in FIG. 26.

In a state where the power supply amount to the electric motor 4 is increased as shown in FIG. 27 at S607 after executing S805 and S806 as described above, at S808 the control circuit 620 maintains the OR control mode of S607 and at the same time determines correctness/incorrectness of the determination direction Dm0 based upon the detection signals from the sensors 622 and 624. More specifically when the changing speed of the rotational speed θm is estimated from the actual phase Pr calculated based upon the rotational angles θcr and θca and when the estimated speed increases in the determination direction Dm0, the control circuit 620 makes a determination that the determination direction Dm0 is incorrect, and the process proceeds to S609.

As a result, after the power supply direction to the electric motor 4 is reversed at S609 and when it is determined at S808 that the determination direction Dm0 is correct, the process proceeds to S810. At S810, the control circuit 620 maintains the OR control mode immediately before the process at S810 among the OR control modes of S609 and S808, and at the same time determines based upon the detection signals from the sensors 622 and 624 whether or not the motor shaft 102 stops. More specifically when the actual phase Pr calculated based upon the rotational angles θcr and θca does not change for more than a predetermined time, the control circuit 620 makes a motor stop determination by estimating that the motor shaft 102 has stopped, and the process proceeds to S611 for stopping the power supply as shown in FIG. 27. Otherwise, the process of S810 is repeated.

In a state where the power supply to the electric motor 4 is stopped at S611 continued, at S812 the control circuit 620 determines whether or not the rotational angle θm of the motor shaft 0102 changes, according to S805. However, at S812 when the angle change determination is made within a predetermined time, the control processing at the stop time is completed and when the angle change determination is made, the process proceeds back to S806.

According to an eighth embodiment as described above, the angle change determination, the change direction determination, the correct/incorrect determination and the motor stop determination in regard to the motor shaft 102 can be accurately made by the estimation using the rotational detections of the crank shaft and the cam shaft 2. An accurate estimation is possible because, in a case of the construction where the crank shaft and the cam shaft 2 are linked through the phase control mechanism 8 to the motor shaft 102, a correlation exists between motions of the crank shaft and the cam shaft 2 and the motion of the motor shaft 102. Therefore, the start performance of the internal combustion engine can be ensured also according to an eighth embodiment.

In an eighth embodiment explained so far, among the power supply control processing of the control processing at the stop time, the power supply control system 6 executing S607, S808, S609 and S810 can correspond to "balancing means," the power supply control system 6 executing S604, S805, S611 and S812 can correspond to "eliminating means." Among the power supply control processing of the control processing at the stop time, the power supply control system 6 executing S805, S810 and S812 can correspond to "motor determining means," the power supply control system 6 executing S806 can correspond to "change direction determining means," and the power supply control system 6 executing S808 can correspond to "correct/incorrect determining means."

(Ninth Embodiment)

Figure 28:
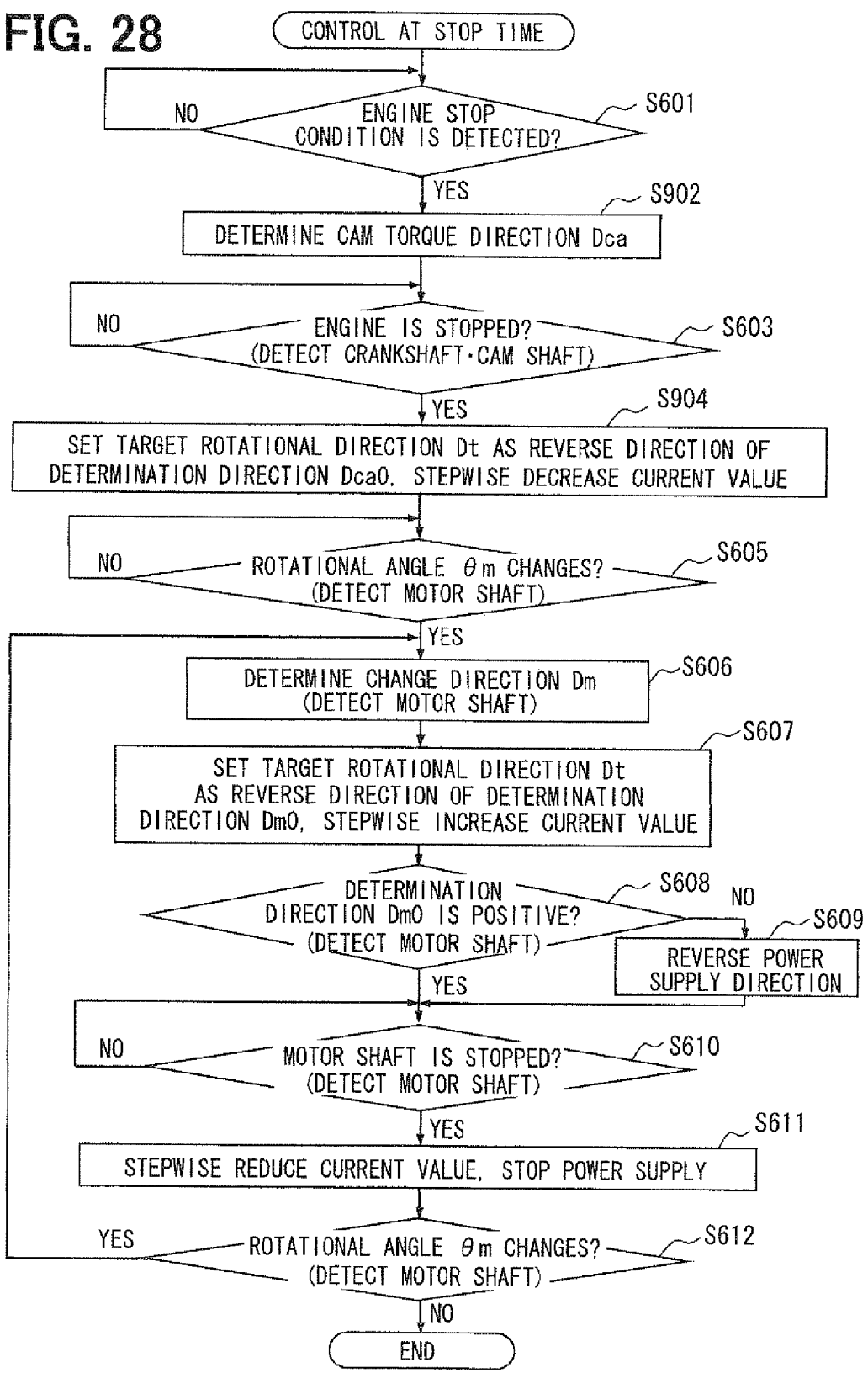
FIG. 28 is a flow chart illustrating control processing at a stop time of a power supply control system in a valve timing control device according to a ninth embodiment.

As shown in FIG. 28, a ninth embodiment is a modification of a sixth embodiment. In the control processing at a stop time in a ninth embodiment, S902 and S904 of the power supply control processing are executed instead of S602 and S604 thereof.

More specifically at S902, the control circuit 620 executes the direction determining processing corresponding to S104 explained in a first embodiment to accurately determine the cam torque direction Dca under the FB control mode.

At S603 an engine stop determination is made and the process proceeds to S904, wherein the control circuit 620 sets the control mode as the OR control mode and sets the target rotational direction Dt as the reverse direction of the determination direction Dca0 of the cam torque direction Dca at S902. After the control circuit 620 sets the target rotational number St and the target drive system Ft to a predetermined value and the regular drive respectively, the control circuit 620 outputs the set results and the set result of the target rotational direction Dt as the OR control values to the power supply block 134 of the drive circuit 130. The predetermined value set as the target rotational number St is a value for rotating the motor shaft 102 in the actual cam torque direction Dca while releasing the strain energy by increasing each of a current value supplied to the electric motor 4 and the motor torque Tm to a predetermined value larger than a zero value, by the drive duty ratio Rd corresponding to the predetermined value.

Figure 29:
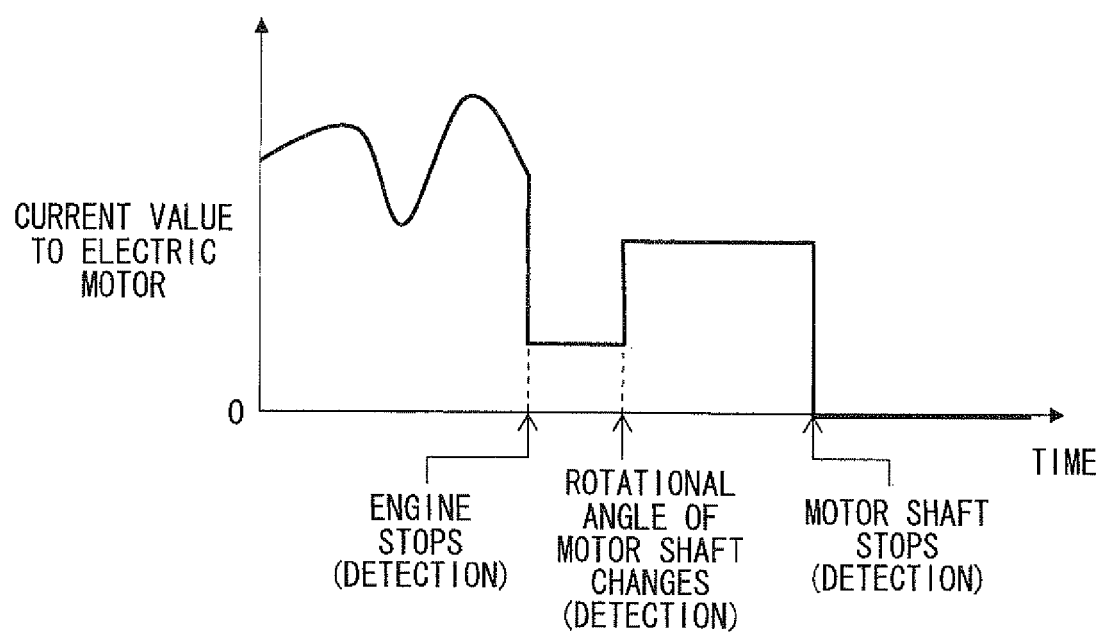
FIG. 29 is a graph illustrating values associated with power supply control processing of the control processing at the stop time shown in FIG. 28.

At S904, the drive unit 138 of the power supply block 134 which has thus received the OR control value from the control circuit 620 sets the power supply pattern switching state and the drive duty ratio Rd. Accordingly, a power supply amount to the electric motor 4 first stepwise reduces to a predetermined value larger than a zero value as shown in FIG. 29 and in response to it, the motor torque Tm is first reduced to a predetermined value. Therefore, the motor shaft 102 rotates with release of the strain energy. At S605 and S606 subsequent to S904, in a state of maintaining the OR control mode at S904, a determination of a change in the rotational angle θm and a determination of the change direction Dm are to be made.

According to a ninth embodiment as described above, since a width by which the power supply amount is first reduced is restricted, a rapid rotation of the motor shaft 102 caused by the release of the strain energy is difficult to generate. Such restriction further restricts the shift of the engine phase generated due to the rapid rotation of the motor shaft 102, making it possible to ensure the start performance of the internal combustion engine.

In a ninth embodiment explained so far, among the power supply control processing of the control processing at the stop time, the power supply control system 6 executing S611 and S612 can correspond to "eliminating means" and the power supply control system 6 executing S902, S904, S607, S609 and S611 can correspond to "power supply control means."

(Tenth Embodiment)

Figure 30:
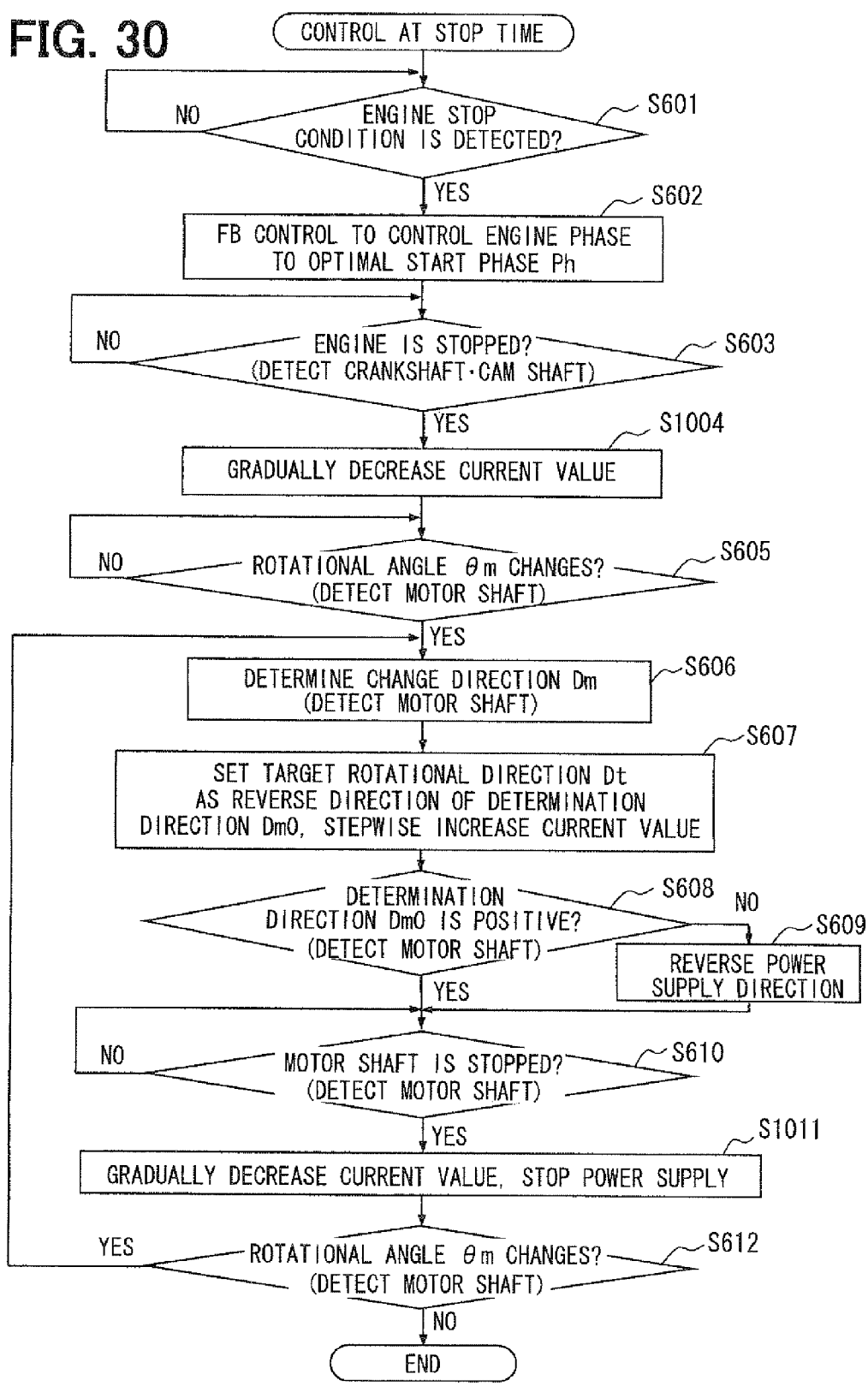
FIG. 30 is a flow chart illustrating control processing at a stop time of a power supply control system in a valve timing control device according to a tenth embodiment.

As shown in FIG. 30, a tenth embodiment is a modification of a ninth embodiment. In the control processing at a stop time in a tenth embodiment, S1004 and S1011 of the power supply control processing are executed instead of S904 and S611 thereof.

More specifically at S1004 the control circuit 620 sets the control mode as the OR control mode and sets the target rotational direction Dt as the reverse direction of the determination direction Dca0 and sets the target drive system Ft to the regular drive in the same way as a ninth embodiment. On the other hand, at S1004 in the present embodiment, the control circuit 620 gradually increases the target rotational number St from a value such as, in the present example, a zero value, at a completion time at S603 immediately before S1004.

Figure 31:
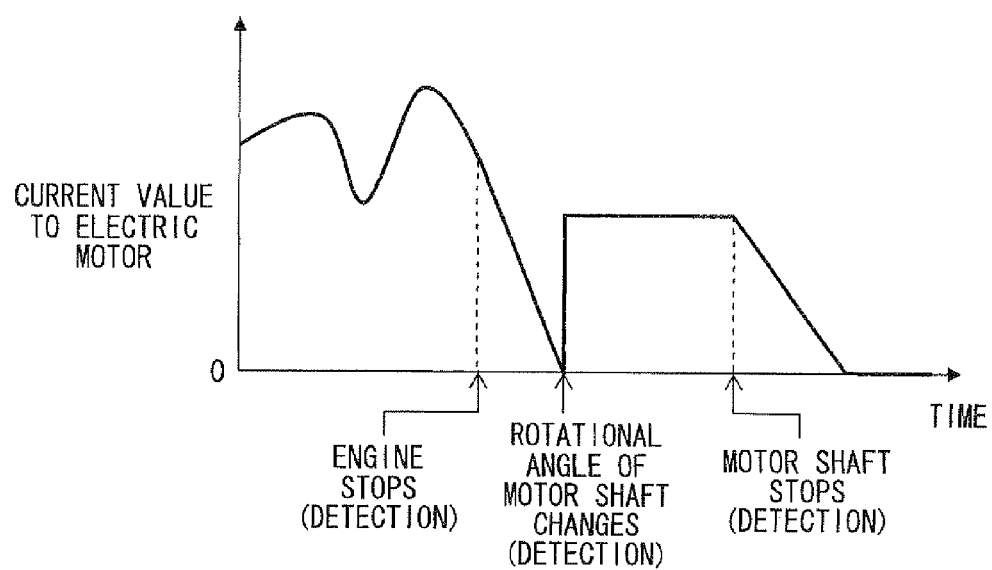
FIG. 31 is a graph illustrating values associated with power supply control processing of the control processing at the stop time shown in FIG. 30.

At S1004, the drive unit 138 of the power supply block 134 in the drive circuit 130 receiving Dt, Ft and St thus set as the OR control values from the control circuit 620 sets the power supply pattern switching state and the drive duty ratio Rd. Here, particularly the drive duty ratio Rd is set in such a manner as to gradually reduce according to the target rotational number St. Accordingly, a power supply amount to the electric motor 4 first stepwise reduces as shown in FIG. 31 and in response to it, the motor torque Tm is first reduced. Therefore, the motor shaft 102 rotates with release of the strain energy. At S605 and S606 subsequent to S1004, in a state of maintaining the OR control mode at S1004, a determination of a change in the rotational angle θm and a determination of the change direction Dm are to be made. However, when the power supply amount to the electric motor reaches a zero value before the process proceeds to S606, at S605 the rotational angle θm of the motor shaft 102 changes, the control circuit 620 holds the target rotational number St to a zero value. Thereby the power supply amount of the electric motor is held to a zero value until the execution start of S607.

Thus the power supply amount is first gradually reduced and thereafter, the power supply amount is increased. Then, the process proceeds to S1011, wherein the control circuit 620 performs the OR control mode according to S1004, thereby gradually reducing a current value as the power supply amount to the electric motor 4 as shown in FIG. 31. However, at S1011 the power supply amount continues to gradually reduce to a zero value, thereby stopping the power supply to the electric motor 4 to completely eliminate the motor torque Tm.

According to a tenth embodiment, the rapid rotation of the motor shaft 102 caused by the release of the strain energy and the power supply stop can be prevented by gradual reduction of the power supply amount. Accordingly, it is possible to avoid shifting of the engine phase due to the rapid rotation of the motor shaft 102, thereby ensuring the start performance of the internal combustion engine.

In a tenth embodiment as explained so far, with regard to the power supply control processing, and in particular, the control processing at the stop time, the power supply control system 6 executing at least S1011 and S612 can correspond to "eliminating means" and the power supply control system 6 executing S602, S1004, S607, S609 and S1011 can correspond to "power supply control means."

(Eleventh Embodiment)

Figure 32:
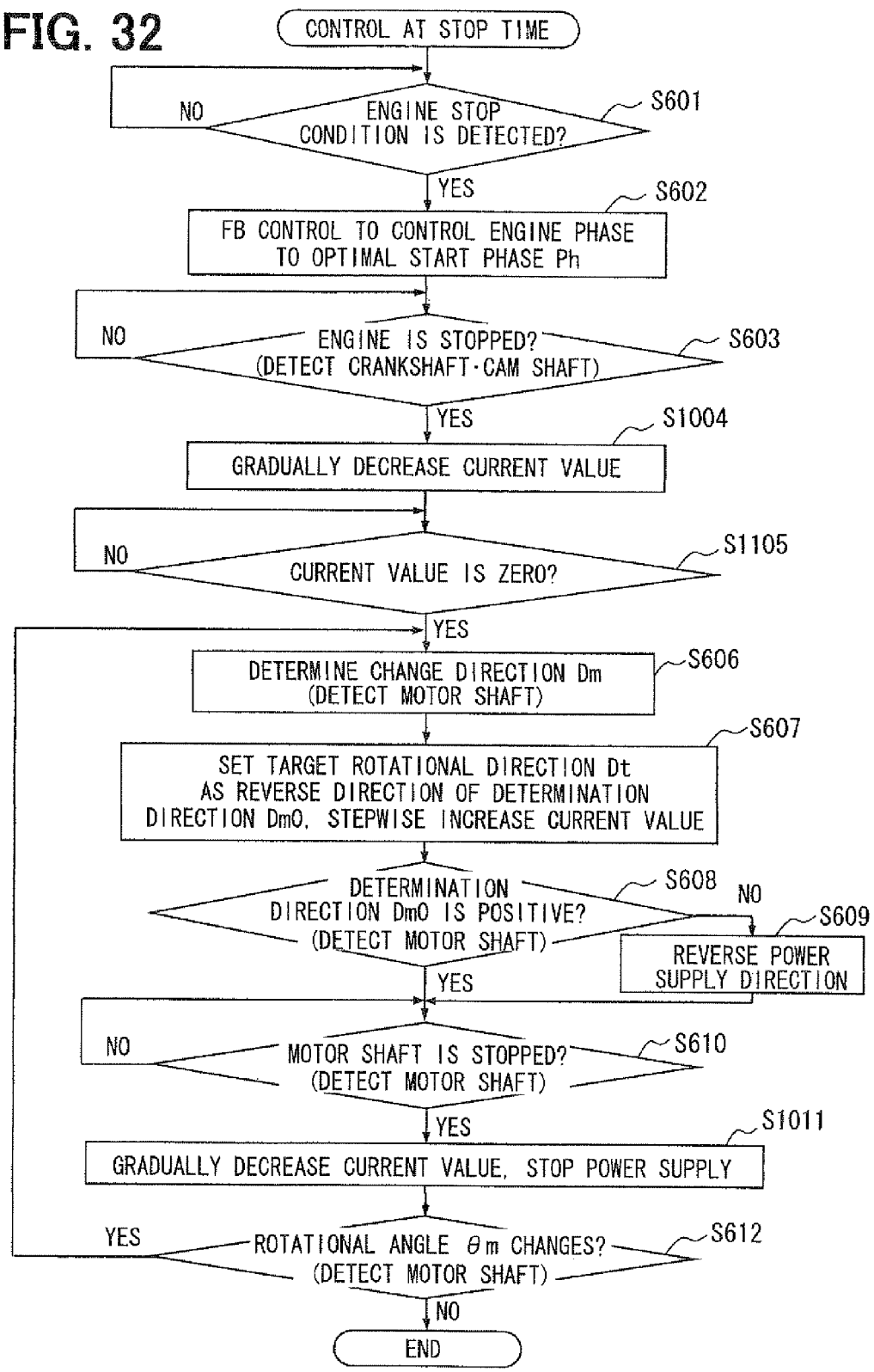
FIG. 32 is a flow chart illustrating control processing at a stop time of a power supply control system in a valve timing control device according to an eleventh embodiment.

As shown in FIG. 32, an eleventh embodiment is a modification of a tenth embodiment. In the control processing at a stop time in an eleventh embodiment, S1105 of the power supply control processing is executed instead of S605 thereof.

More specifically, at S1105, the control circuit 620 maintains the OR control mode at S1004 and determines whether or not a current value as a power supply value to the electric motor 4 in the middle of gradually reducing reaches a zero value. More specifically, the determination at S1105 may be made by providing a detection value of the current value flowing in the inverter part 136 of the power supply block 134 electrically connected to the electric motor 4 to the control circuit 620 from the drive circuit 130 or may be made based upon the target rotational number St set as the OR control value by the control circuit 620.

Figure 33:
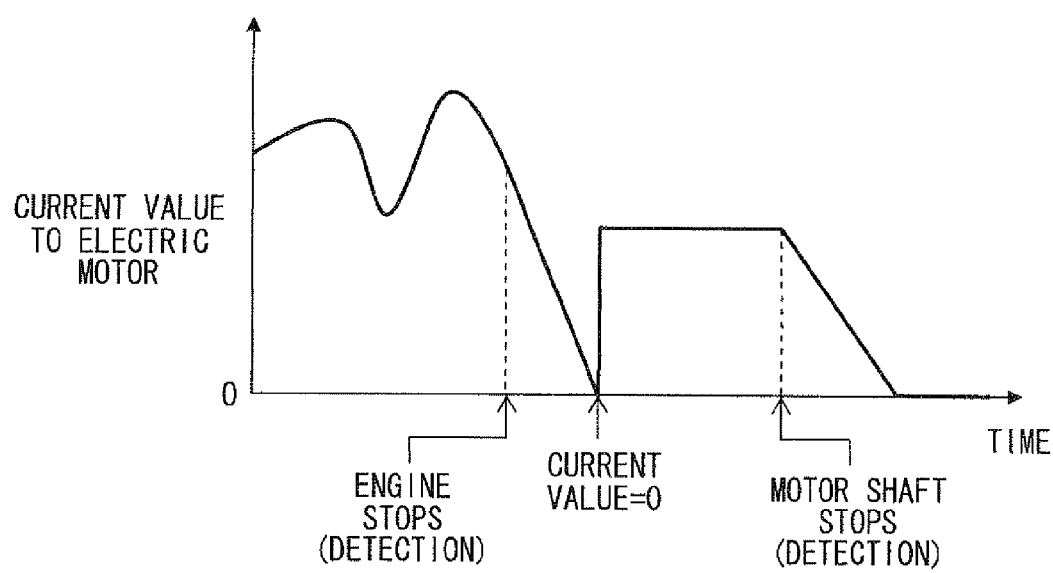
FIG. 33 is a graph illustrating values associated with power supply control processing of the control processing at the stop time shown in FIG. 32.

When it is determined that the power supply amount to the electric motor 4 has reached a zero value, the process proceeds to S606 for determining the change direction Dm of the rotational angle θm in the motor shaft 102 and then proceeds to S607 for increasing the power supply amount to the electric motor 4 as shown in FIG. 33. Otherwise, the process of S1105 is repeated. Therefore, in the present embodiment, a gradual reduction time from a start at S1004 to when the power supply amount reaches a zero value at S1105 is set so that the rotational angle θm of the motor shaft 102 changes to release the strain energy, but the engine phase does not exceed a range of the start phase.

According to an eleventh embodiment as described above, even if the change of the rotational angle θm of the motor shaft 102 is determined by estimating based upon the power supply amount becoming zero during a gradually reducing, it is possible to restrict the rapid rotation of the motor shaft 102 by the change direction determination and the increase of the power supply amount. Therefore, according to an eleventh embodiment, the shift of the engine phase is restricted, making it possible to ensure the start performance of the internal combustion engine.

In an eleventh embodiment as explained so far, among the power supply control processing of the control processing at the stop time, the power supply control system 6 executing S1004, S1105, S1011 and S612 can correspond to "eliminating means," the power supply control system 6 executing S602, S1004, S1105, S607, S609 and S1011 can correspond to "power supply control means," and the power supply control system 6 executing S610 and S612 can correspond to "motor determining means"

(Twelfth Embodiment)

Figure 34:
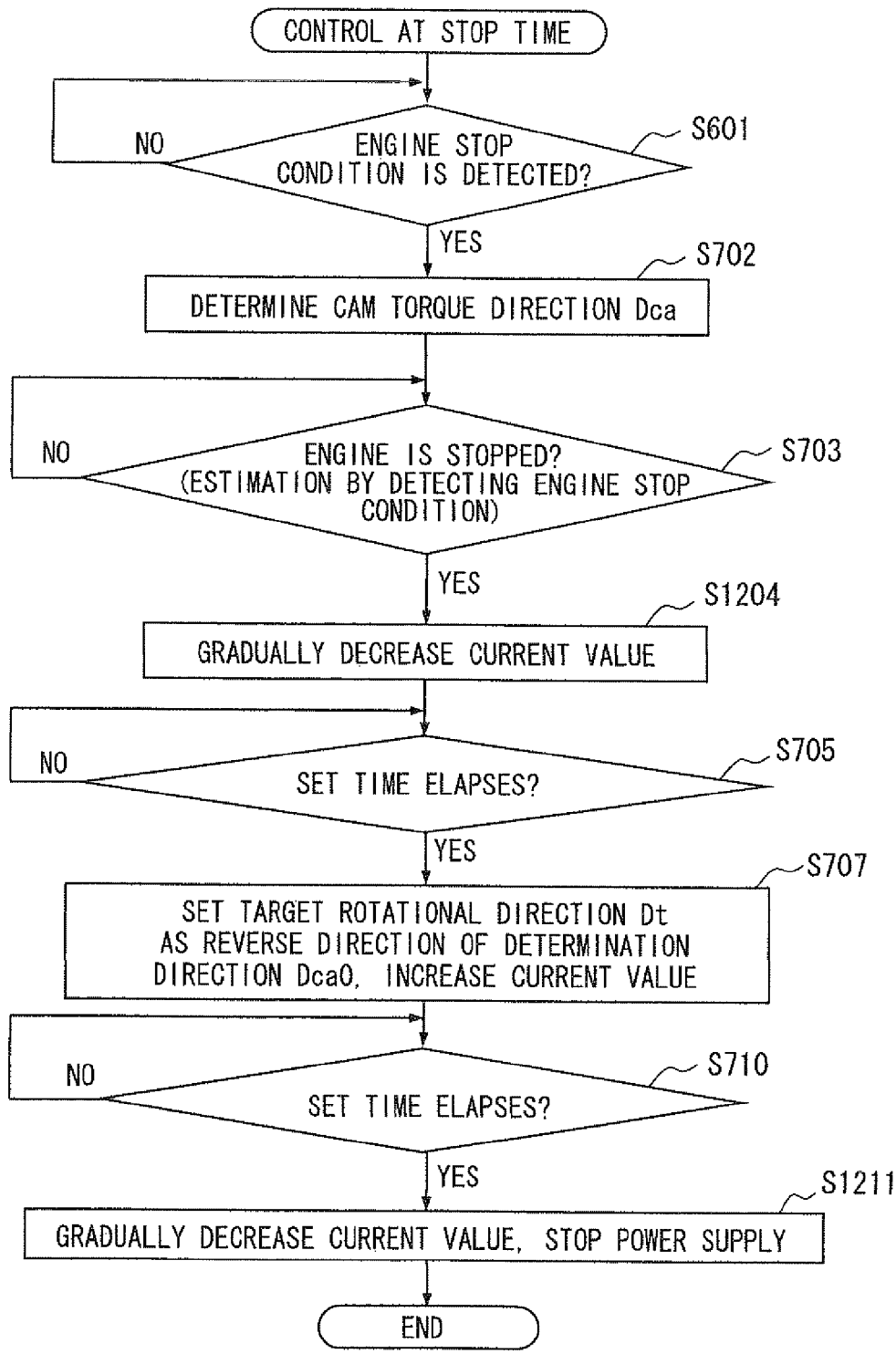
FIG. 34 is a flow chart illustrating control processing at a stop time of a power supply control system in a valve timing control device according to a twelfth embodiment.

As shown in FIG. 34, a twelfth embodiment is a modification of a seventh embodiment. In the control processing at a stop time in a tenth embodiment, S1204 and S1211 of the power supply control processing are executed instead of S604 and S611 thereof.

Figure 35:
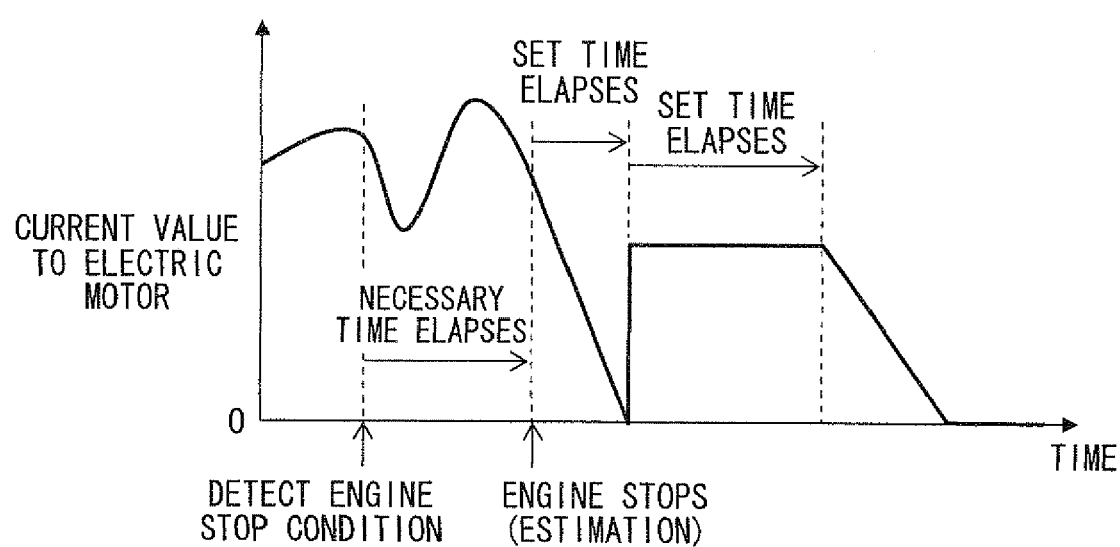
FIG. 35 is a graph illustrating values associated with power supply control processing of the control processing at the stop time shown in FIG. 34.

More specifically, at S1204, the control circuit 620 first gradually reduces a power supply amount to the electric motor 4 as shown in FIG. 35 according to S1004 explained in a tenth embodiment and first gradually reduces also the motor torque Tm. Thereby, the motor shaft 102 rotates with release of the strain energy. Subsequently, at S705, a determination is made as to whether or not the set time elapses, similar to that in a seventh embodiment, after a point of the execution start at S1204.

Thus the power supply amount is gradually reduced and thereafter, the power supply amount is increased. Then the process proceeds to S1211. The power supply amount to the electric motor 4 is gradually reduced as shown in FIG. 35 according to S1011 explained in a tenth embodiment. Thereby the power supply to the electric motor 4 is stopped to completely eliminate the motor torque Tm.

According to a twelfth embodiment as described above, it is possible to prevent the rapid rotation of the motor shaft 102 caused by the release of the strain energy and the power supply stop, and also the increase of the power supply amount and the stop of the power supply can be automatically performed by sequence control. Accordingly, it is possible to restrict an event that the engine phase is shifted due to the rapid rotation of the motor shaft 102, by the simple power supply control processing to ensure the start performance of the internal combustion engine at low costs.

In a twelfth embodiment explained so far, the power supply control system 6 executing S1204, S705 and S611 can correspond to "eliminating means" and the power supply control system 6 executing S702, S1204, S705, S707, S710 and S1211 can correspond to "power supply control means."

(Thirteenth Embodiment)

Figure 36:
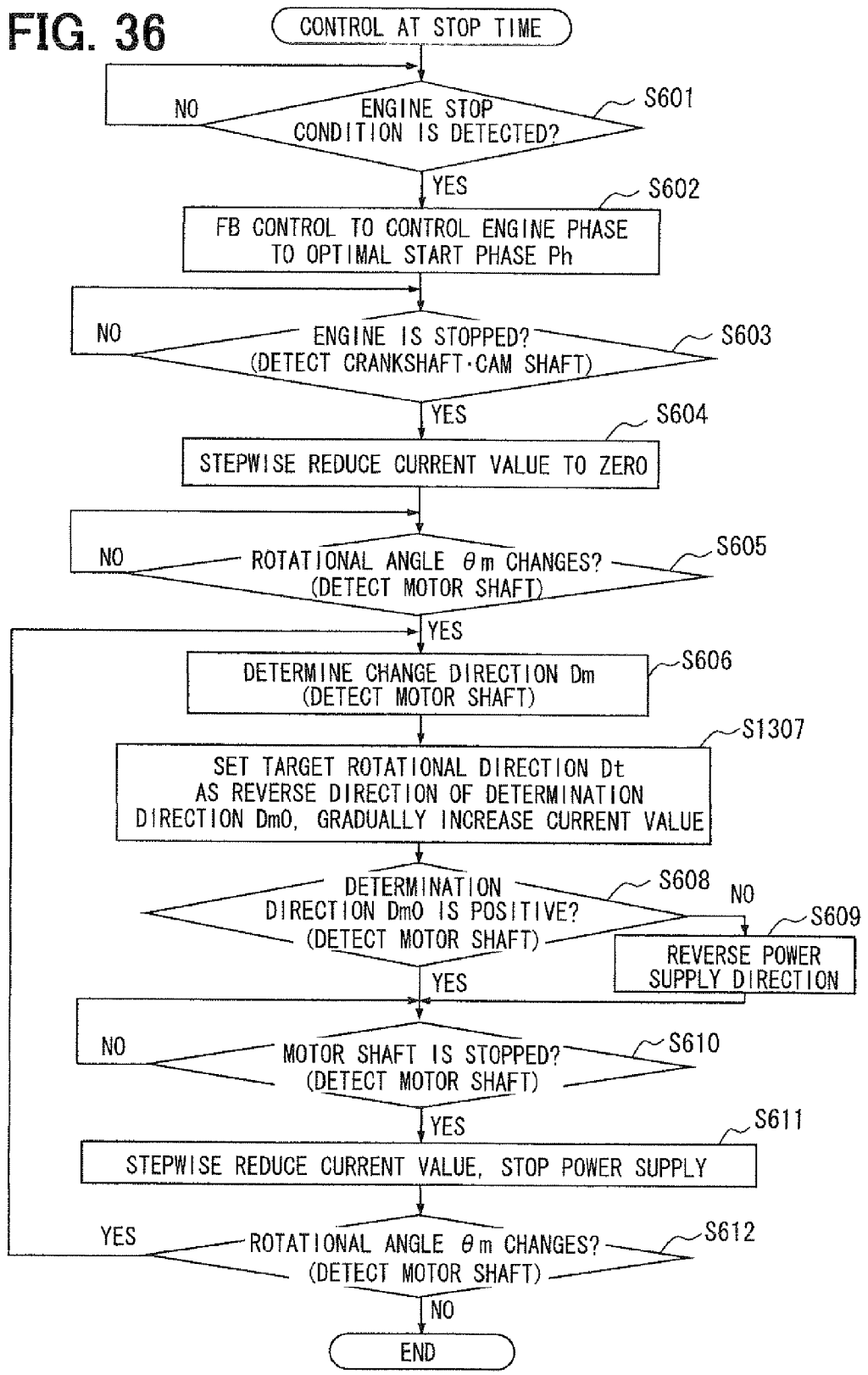
FIG. 36 is a flow chart illustrating control processing at a stop time of a power supply control system in a valve timing control device according to a thirteenth embodiment.

As shown in FIG. 36, a thirteenth embodiment is a modification of a sixth embodiment. In the control processing at a stop time in a thirteenth embodiment, S1307 of the power supply control processing is executed instead of S607 thereof.

More specifically, at S1307, the control circuit 620 sets the control mode as the OR control mode and sets the target rotational direction Dt as the reverse direction of the determination direction Dm0 and sets the target drive system Ft to the brake drive in the same way as a sixth embodiment. However, at S1307 in the present embodiment, the control circuit 620 gradually increases the target rotational number St from the value, which, in the present example is, a zero value, at a completion time at S606 immediately before S1307, to the set value similar to that in a sixth embodiment.

Figure 37:
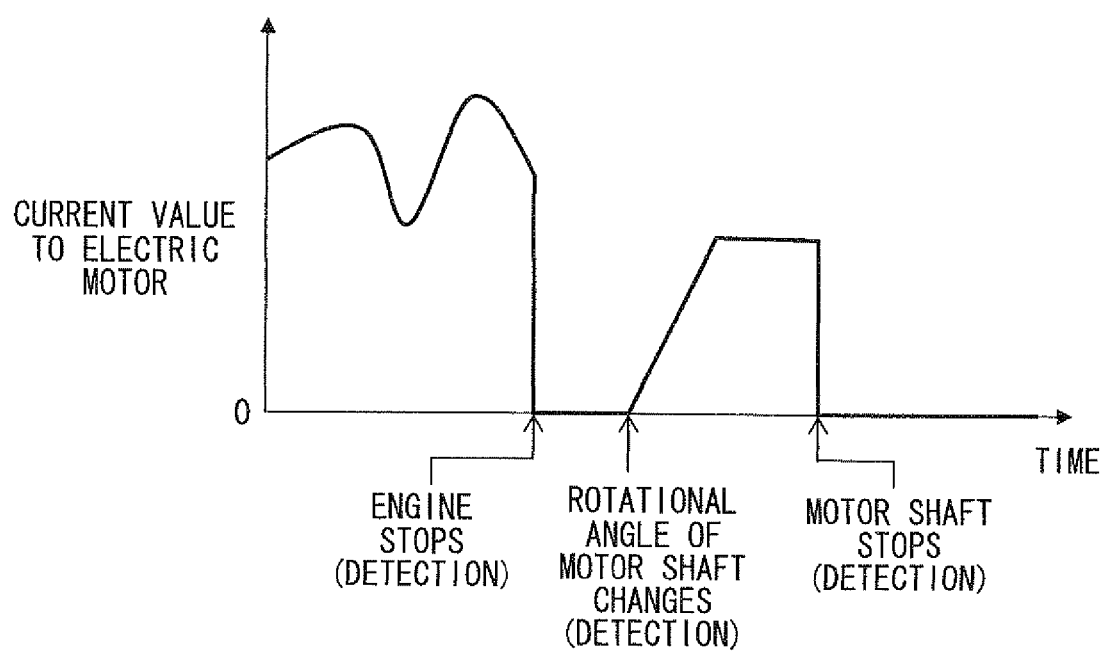
FIG. 37 is a graph illustrating values associated with power supply control processing of the control processing at the stop time shown in FIG. 36.

At S1307, the drive unit 138 of the power supply block 134 in the drive circuit 130 receiving Dt, Ft and St thus set as the OR control values from the control circuit 620, sets the power supply pattern switching state and the drive duty ratio Rd. Particularly, the drive duty ratio Rd is set in such a manner as to gradually increase according to the target rotational number St. Accordingly, when the determination direction Dm0 is correct, the power supply amount to the electric motor 4 is gradually increased as shown in FIG. 37 in the power supply direction of applying a brake torque to the motor shaft 102 and the motor torque Tm opposing the cam torque Tca gradually increases. Therefore, the change speed of the rotational angle θm in the motor shaft 102 results in gradually reducing.

According to a thirteenth embodiment as described above, in the phase control mechanism 8 in which the strain energy is released by first reducing the power supply amount, an event that the resilient strain is generated in each resilient member 48 due to an excessive increase of the motor torque Tm to re-accumulate the strain energy can be restricted with a gradual increase of the power supply amount. Therefore, it is possible to enhance a restricting effect to the rotation of the motor shaft 102 and the shift of the engine phase after completing the control processing at the stop time.

In a thirteenth embodiment explained so far, with regard to the power supply control processing, and, in particular, the control processing at the stop time, the power supply control system 6 executing S1307 and S608 to S610 can correspond to "balancing means" and the power supply control system 6 executing S602, S604, S1307, S609, and S611 can correspond to "power supply control means."

(Fourteenth Embodiment)

Figure 38:
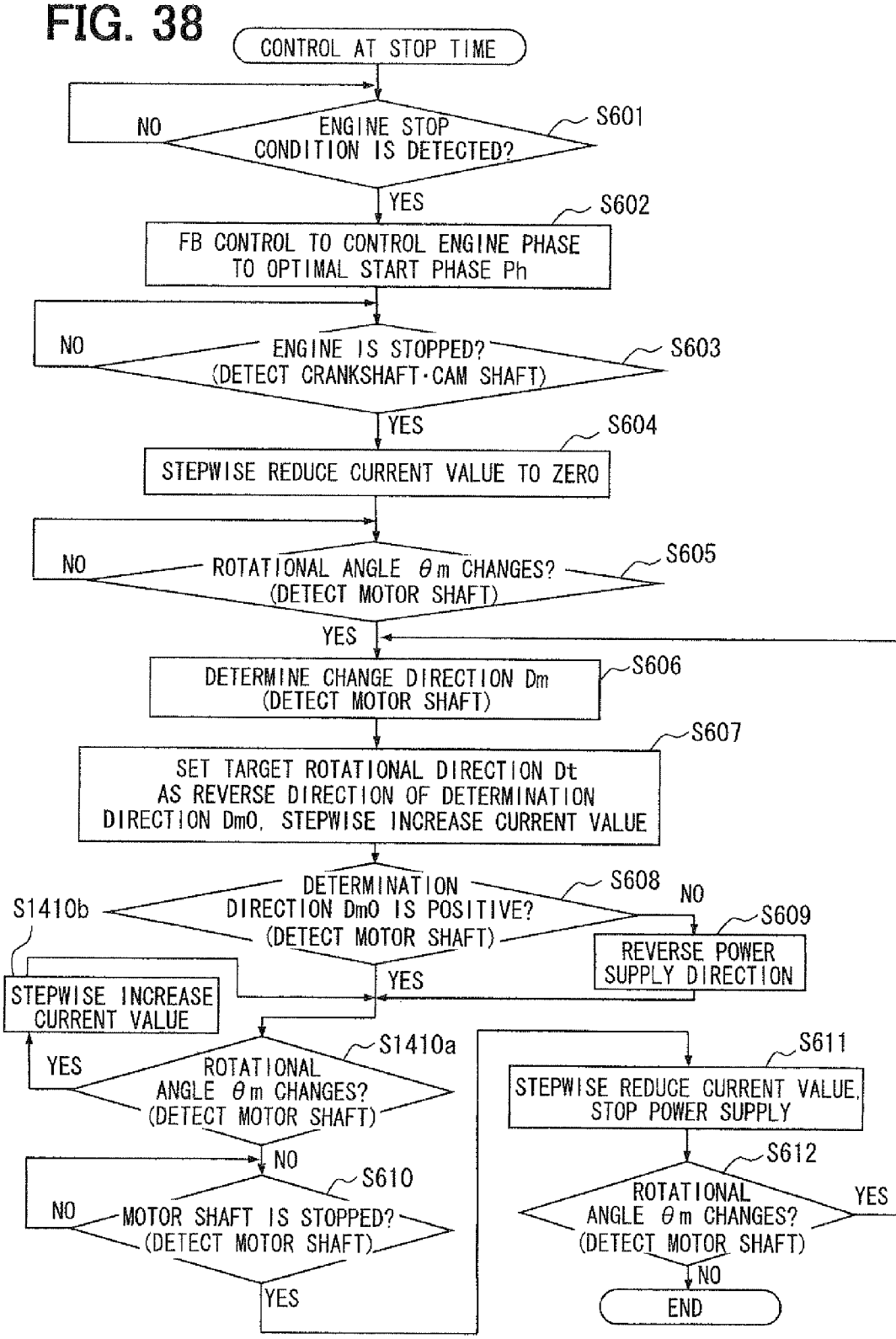
FIG. 38 is a flow chart illustrating control processing at a stop time of a power supply control system in a valve timing control device according to a fourteenth embodiment.

As shown in FIG. 38, a fourteenth embodiment is a modification of a sixth embodiment. In the control processing at a stop time in a fourteenth embodiment, S1410a and S1410b are executed prior to execution of S610 in the power supply control processing.

More specifically, after executing S609 and when it is determined at S608 that the determination direction Dm0 is correct, the process proceeds to S1410a. At S1410a, the control circuit 620 maintains the OR control mode immediately before the process at S1410a among the OR control modes at S609 and S608 and at the same time determines according to S605, explained herein above in connection with a sixth embodiment, whether or not the rotational angle θm of the motor shaft 102 changes from an increase start of the power supply amount. However, at S1401a, when the angle change determination is not made within a predetermined time, it is determined that the torques Tm, Tca and Th are balanced, and then the process proceeds to S610, wherein a stop of the motor shaft 102 is determined while maintaining the OR control mode at S1401a. At S1401a, when the angle change determination is made within the predetermined time, the process proceeds to S1410b.

At S1401b, the control circuit 620 sets the control mode as the OR control mode and sets the target rotational direction Dt as the reverse direction of the determination direction Dm0 and sets the target drive system Ft to the brake drive in the same way as a case of S607. On the other hand, at S1410b, the control circuit 620 sets the target rotational number St to a value larger than the set value in a case of S607.

Figure 39:
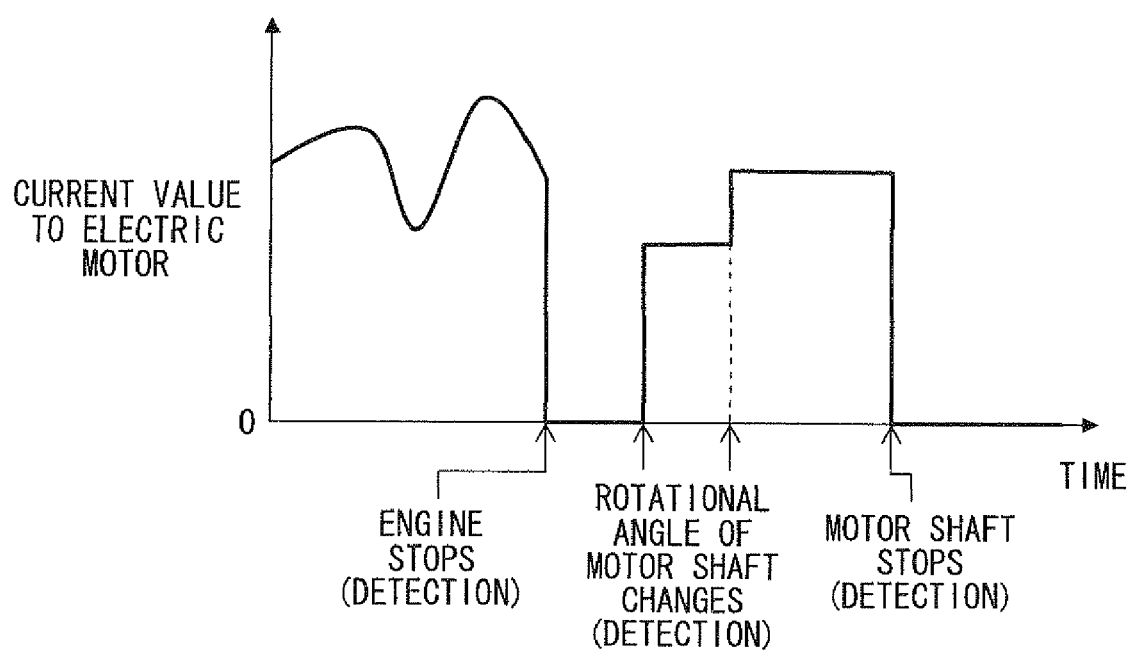
FIG. 39 is a graph illustrating values associated with power supply control processing of the control processing at the stop time shown in FIG. 38.

At S1401b, the drive unit 138 of the power supply block 134 in the drive circuit 130 receiving Dt, Ft and St thus set as the OR control values from the control circuit 620 sets the power supply pattern switching state and the drive duty ratio Rd. Particularly, the drive duty ratio Rd is set in such a manner as to increase according to the target rotational number St. Accordingly, the power supply amount to the electric motor 4 is stepwise increased as shown in FIG. 39 in the power supply direction of applying a brake torque to the motor shaft 102 and the motor torque Tm also opposing the cam torque Tca further increases. Therefore, a change of the rotational angle θm of the motor shaft 102 can be prevented. Because of the above described function, even in a state where the change of the rotational angle θm of the motor shaft 102 can not be prevented by the previous increase of the power supply amount, the rotational amount of the motor shaft 102 due to the change can be restricted to a very small amount. After executing S1401b, the process proceeds back to S1401a, wherein the balance of the torques Tm, Tca and Th is first more confirmed.

According to a fourteenth embodiment as described above, even when the torques Tm, Ma and Th can not be balanced, even by increasing the power supply amount after first reducing the power supply amount and the motor shaft 102 continues to rotate, more increase of the power supply amount is immediately performed, making it possible to restrict the shift of the engine phase.

In a fourteenth embodiment, as explained so far, among the power supply control processing of the control processing at the stop time, the power supply control system 6 executing S607 to S609, S1410a, S1401b and S610 can correspond to "balancing means," the power supply control system 6 executing S609, S1410b and S611 can correspond to "power supply control means," and the power supply control system 6 executing S605, S1410a, S610 and S612 can correspond to "motor determining means"

(Fifteenth Embodiment)

Figure 40:
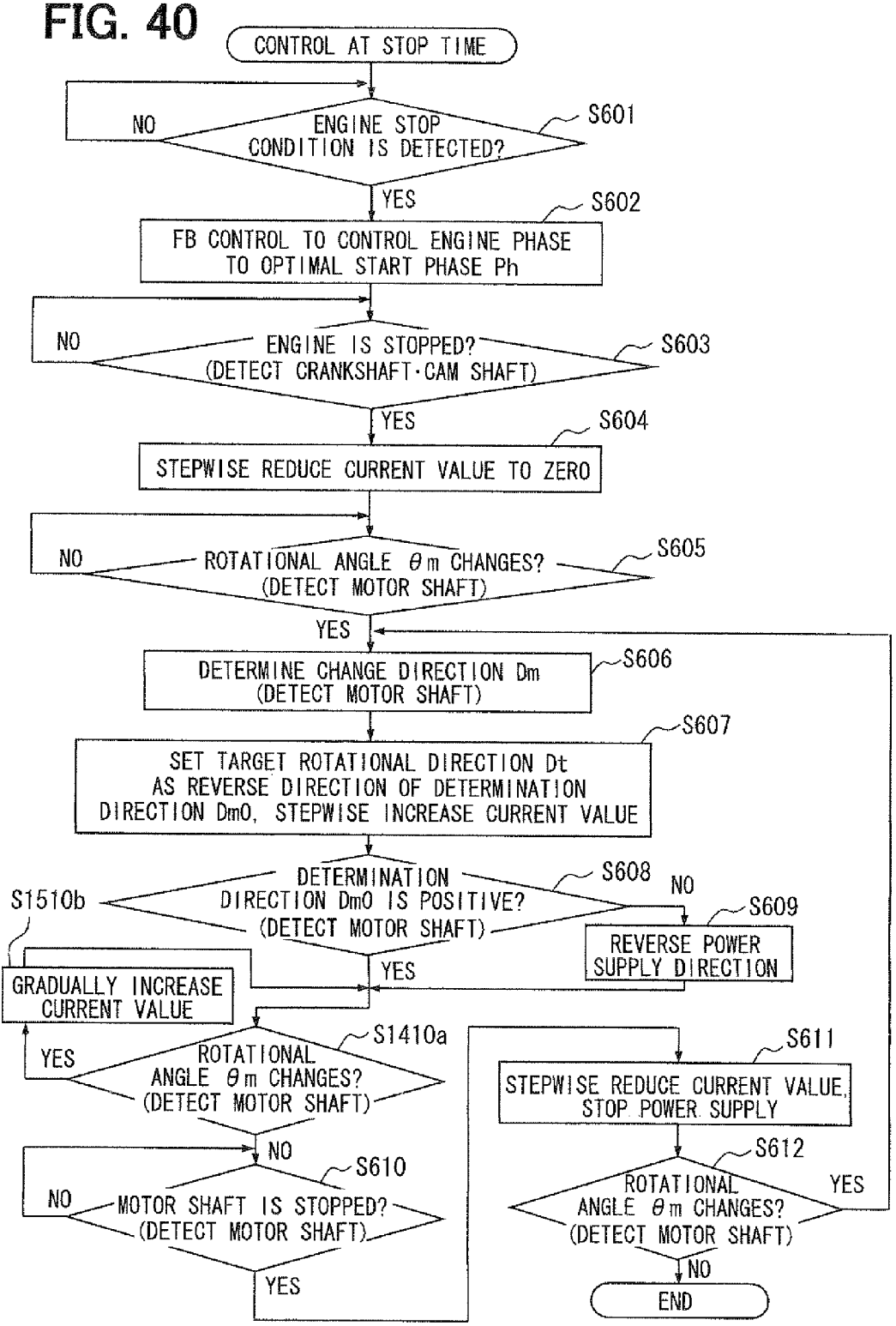
FIG. 40 is a flow chart illustrating control processing at a stop time of a power supply control system in a valve timing control device according to a fifteenth embodiment.

As shown in FIG. 40, a fifteenth embodiment is a modification of a fourteenth embodiment. In the control processing at a stop time in a fifteenth embodiment, S1510b of the power supply control processing is executed instead of S1410b thereof.

More specifically, when at S1410a the angle change determination is made, the process proceeds to S1510b. At S1510b, the control circuit 620 sets the control mode as the OR control mode and sets the target rotational direction Dt as the reverse direction of the determination direction Dm0 and sets the target drive system Ft to the brake drive in the same way as a case of S1410b. At S1510b, the control circuit 620 gradually increases the target rotational number St from the same set value as that at S607 to a value larger than the set value.

At S1510b, the drive unit 138 of the power supply block 134 in the drive circuit 130 receiving Dt, Ft and St thus set as the OR control values from the control circuit 620 sets the power supply pattern switching state and the drive duty ratio Rd. Particularly, the drive duty ratio Rd is set in such a manner as to further gradually increase according to the target rotational number St as shown in FIG. 41.

Figure 41:
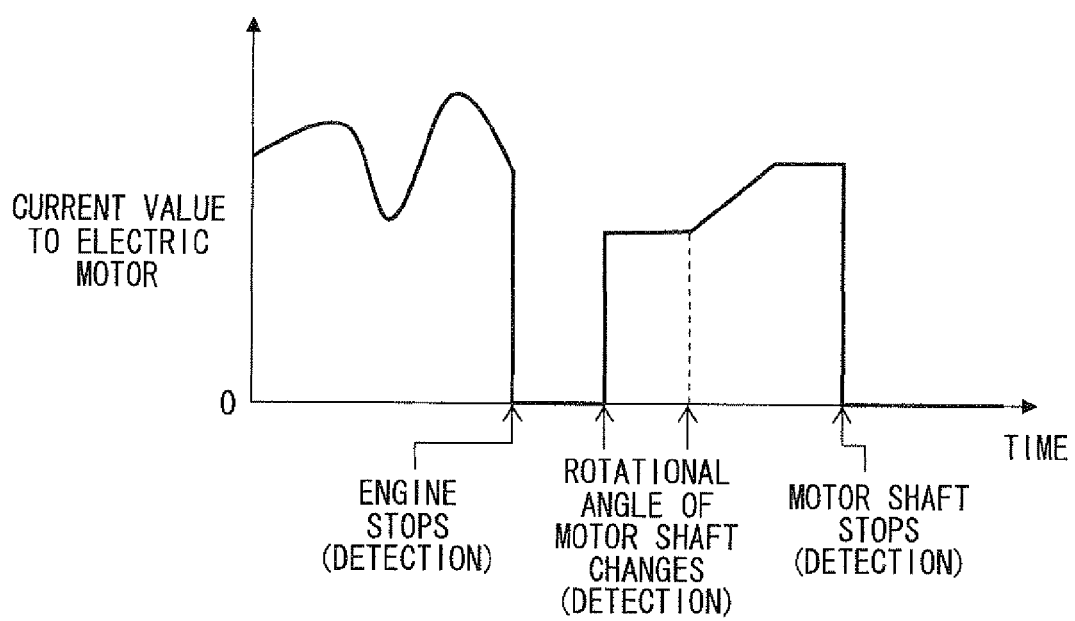
FIG. 41 is a graph illustrating values associated with power supply control processing of the control processing at the stop time shown in FIG. 40.

Accordingly, the power supply amount to the electric motor 4 is gradually increased as shown in FIG. 41 in the power supply direction of applying a brake torque to the motor shaft 102 and the motor torque Tm opposing the cam torque Tca further gradually increases. Therefore, the change of the rotational angle θm of the motor shaft 102 can be realized while gradually reducing a speed of the change and restricting re-accumulation of the strain energy due to an excessive increase of the motor torque Tm. Because of the above described function, even in a state where the change of the rotational angle θm of the motor shaft 102 can not be prevented, the rotational amount of the motor shaft 102 due to the change can be restricted to a very small amount.

According to a fifteenth embodiment as described above, even when the torques Tm, Tca and Th can not be balanced even by increasing the power supply amount after first reducing the power supply amount and the motor shaft 102 continues to rotate, more increase of the power supply amount is performed, thereby making it possible to restrict the shift of the engine phase.

In a fifteenth embodiment as explained so far, among the power supply control processing of the control processing at the stop time, the power supply control system 6 executing S607 and S608, S1410a, S1501b and S610 can correspond to "balancing means" and the power supply control system 6 executing S602, S604, S607, S609, S1510b and S611 can correspond to "power supply control means."

(Modifications in a Sixth to Fifteenth Embodiments)

Modifications specific to a sixth to a fifteenth embodiments described above will be explained hereinafter.

In the power supply control processing in an eighth embodiment, the change determination of the rotational angle θm, the direction determination of the change direction Dm of the rotational angle θm and the correct/incorrect determination of the determination direction Dm0 of the motor shaft 102, and the stop determination of the motor shaft 102 may be made based upon a detection value of a physical amount other than the rotational angles θcr and θca representing the motions of the crank shaft and the cam shaft, for example, a detection value of a tension of a timing chain wound around and between the crank shaft and the sprocket 13 or torque acting on the cam shaft. In the power supply control processing in a ninth to fifteenth embodiments, the change determination of the rotational angle θm, the direction determination of the change direction Dm of the rotational angle θm and the correct/incorrect determination of the determination direction Dm0 of the motor shaft 102, and the stop determination of the motor shaft 102 may be made based upon detection values of physical amounts representing the rotational angles θcr and θca or the motions of the crank shaft and the cam shaft other than the rotational angles θcr and θca according to the above modification.

In the power supply control processing of an eighth to eleventh and a thirteenth to fifteenth embodiments, the engine stop determination may be made based upon the indirection estimation using the detection of the engine stop condition according to a seventh embodiment. In the power supply control processing in a ninth embodiment, the increase of the power supply amount or the power supply stop may be automatically performed by sequence control according to a seventh embodiment. In the power supply control processing in a thirteenth embodiment, the increase of the power supply amount or the power supply stop may be automatically performed by sequence control according to a seventh or twelfth embodiment.

In the power supply control processing in a thirteenth to fifteenth embodiments, the power supply amount to the electric motor 4 may be first reduced to a value larger than a zero value according to a ninth embodiment. In the power supply control processing in a thirteenth to fifteenth embodiments, the power supply amount to the electric motor 4 may be first gradually reduced until the angle change determination is made according to a tenth embodiment. In the power supply control processing in a thirteenth to fifteenth embodiments, the power supply amount to the electric motor 4 may be first gradually reduced to a zero value according to an eleventh embodiment.

(Other Embodiments)

In the above description, plural embodiments are explained, but are not interpreted to be limiting to only those embodiments and can be applied within a contemplated scope.

More specifically, as to the power supply control system 6, the construction other than a combination of two circuits of the control circuit 120 or 620 and the drive circuit 130 as described above may be adopted as needed as long as it controls the motor torque Tm by controlling the power supply to the electric motor 4. Here, for example, one electrical circuit may achieve both functions of the control circuit 120 or 620 and the drive circuit 130. In the drive circuit 130, a partial function thereof may be realized by a microcomputer.

As the electric motor 4, a motor other than the aforementioned brushless motor may be adopted as needed as long as the motor generates the magnetic retaining torque Th and the motor torque Tm by power supply. In regard to an arrangement of the permanent magnets 106 in the electric motor 4, the permanent magnet 106 may be embedded inside the motor shaft 102, for example, the rotor portion 105 thereof. The magnetic retaining torque Th of the electric motor 4 may be the torque generated in the motor shaft 4 as follows. A formed magnetic field of the permanent magnet provided in one of the motor shaft 102 and the motor stator 103 acts on a magnetic body provided in the other of the motor shaft 102 and the motor stator 103 to create a magnetic attraction force acting between the permanent magnet and the magnetic body, thereby generating the torque in the motor shaft 102. The permanent magnet for generating the magnetic retaining torque Th may be a magnet for forming a magnetic pole of the motor shaft 4 sensed by the rotational angle sensor 114 other than the magnet 160 provided for generating the motor torque Tm by the power supply as described above or may be a magnet exclusive for generating the magnetic retaining torque Th at a power supply stop state. The magnetic body for generating the magnetic retaining torque Th may be a core exclusive for generating the magnetic retaining torque Th at a power supply stop state other than the core 108 around which the coil 109 for generating the motor torque Tm by the power supply as described is wound.

As the phase control mechanism 8 combined with the electric motor 4, a mechanism other than the mechanism provided with the aforementioned differential gear mechanism 60 may be adopted as needed as long as the mechanism controls the engine phase in accordance with the torque balance in the motor shaft 102 while transmitting the cam torque Tca to the motor shaft 102.

While various of the exemplary embodiments described herein are applied to a device for controlling the valve timing of the intake valve as described above, such exemplary embodiments and alternatives or modifications may further be applied to a device for controlling valve timing of the exhaust valve or a device for controlling valve timing of the intake valve and the exhaust valve both as needed.

The invention claimed is:

1. A valve timing control device in an internal combustion engine, the valve timing control device for controlling valve timing of at least one of an intake valve and an exhaust valve opened/closed by a cam shaft through torque transmission from a crank shaft, the valve timing control device comprising:
   an electric motor including a motor shaft, the electric motor generating a magnetic retaining torque and a motor torque in the motor shaft based on a power supply supplied thereto;
   a control unit coupled to the electric motor and controlling the motor torque by controlling the power supply supplied to the electric motor; and
   a phase control mechanism coupled to the cam shaft and the motor shaft, the phase control mechanism transmitting a cam torque alternating between a positive and a negative direction in response to rotation of the cam shaft to the motor shaft and controlling a relative phase between the crank shaft and the cam shaft in accordance with a torque balance in the motor shaft, wherein:
   the control unit includes:
      engine determining means for determining an operating state of the internal combustion engine; and
      power supply control means for performing control of the power supply supplied to the electric motor, the power supply control means stopping the power supply supplied to the electric motor after an amount of the power supply supplied to the electric motor is first reduced and then increased when the engine determining means makes an engine stop determination.

2. A valve timing control device according to claim 1, wherein:
   the phase control mechanism includes a resilient member having a resilient strain caused by rotation of the motor shaft.

3. A valve timing control device according to claim 1, wherein:
   the engine determining means makes the engine stop determination based on detecting a stop of at least one of the crank shaft and the cam shaft.

4. A valve timing control device according to claim 1, wherein:
   the engine determining means is further for estimating a stop time and thereby makes the engine stop determination by detecting an essential condition for stopping the internal combustion engine.

5. A valve timing control device according to claim 1, wherein:
   the power supply control means first reduces the amount of the power supply supplied to the electric motor to a zero value and then increases the amount of the power supply after being reduced.

6. A valve timing control device according to claim 1, wherein:
   the power supply control means first reduces the amount of the power supply supplied to the electric motor to a predetermined value larger than a zero value and then increases the amount of the power supply after being reduced.

7. A valve timing control device according to claim 1, wherein:
   the power supply control means first gradually reduces the amount of the power supply supplied to the electric motor and then increases the amount of the power supply after being reduced.

8. A valve timing control device according to claim 1, wherein:
   the power supply control means first reduces the amount of the power supply supplied to the electric motor and then gradually increases the power supply amount after being reduced.

9. A valve timing control device according to claim 1, wherein:
   the power supply control means gradually reduces the amount of the power supply to a zero value after being increased, thereby stopping the power supply to the electric motor.

10. A valve timing control device according to claim 1, wherein:
    the control unit further includes motor determining means for determining an operational state of the motor shaft; and
    the power supply control means increases the amount of the power supply supplied to the electric motor when the motor determining means makes an angle change determination that a rotational angle of the motor shaft changes after the amount of the power supply supplied to the electric motor first starts to reduce.

11. A valve timing control device according to claim 10, wherein:
    the motor determining means is further for making the angle change determination by detecting a movement of the motor shaft.

12. A valve timing control device according to claim 10, wherein:
    the motor determining means is further for estimating a movement of the motor shaft by detecting a movement of at least one of the crank shaft and the cam shaft, thus making the angle change determination.

13. A valve timing control device according to claim 10, wherein:
    the power supply control means is further for increasing the power supply amount to the electric motor in a power supply direction of applying a brake torque to the motor shaft when the motor determining means makes the angle change determination.

14. A valve timing control device according to claim 13, wherein:
    the control unit further includes change direction determining means for determining a change direction of a rotational angle of the motor shaft based on an operational state of the motor shaft generated by first reducing the power supply amount to the electric motor; and
    the power supply control means is further for applying a brake torque in a direction against the determination direction as determined by the change direction determining means.

15. A valve timing control device according to claim 14, wherein:
    the change direction determining means determines the change direction by detecting the movement of the motor shaft.

16. A valve timing control device according to claim 14, wherein:
    the change direction determining means detects the movement of at least one of the crank shaft and the cam shaft to estimate the movement of the motor shaft, determining the change direction.

17. A valve timing control device according to claim 14, wherein:
    the control unit further includes correct/incorrect determining means for determining correct/incorrect in the determination direction based on an operational state of the motor shaft generated by increasing the amount of the power supply supplied to the electric motor.

18. A valve timing control device according to claim 17, wherein:
the correctness/incorrectness determining means determines the correctness/incorrectness of the determination direction by detecting the movement of the motor shaft.

19. A valve timing control device according to claim 17, wherein:
the correctness/incorrectness determining means is further for detecting the movement of at least one of the crank shaft and the cam shaft so as to estimate the movement of the motor shaft, thereby determining the correctness/incorrectness of the determination direction.

20. A valve timing control device according to claim 17, wherein:
the power supply control means is further for reversing a direction in which the power supply is supplied to the electric motor in a case where the correctness/incorrectness determining means makes a determination that the determination direction is incorrect.

21. A valve timing control device according to claim 10, wherein:
the power supply control means is further for further increasing the amount of the power supply supplied to the electric motor when the motor determining means again makes the angle change determination after starting an increase of the amount of the power supply.

22. A valve timing control device according to claim 1, wherein:
the power supply control means increases the amount of the power supply supplied to the electric motor when a set time elapses after first starting to reduce the amount of the power supply.

23. A valve timing control device according to claim 22, wherein:
the power supply control means increases the amount of the power supply in the power supply direction of generating the motor torque the motor shaft in a direction against the cam torque when the set time elapses.

24. A valve timing control device according to claim 23, wherein:
the control unit further includes torque direction determining means for determining a cam torque direction which represents one of a positive and a negative direction of the cam torque acting on the motor shaft; and
based on the power supply direction, the motor torque is generated in the reverse direction of the determination direction by the torque direction determining means.

25. A valve timing control device according to claim 24, wherein:
the power supply control means is further for feedback-controlling the power supply supplied to the electric motor based on a phase difference between an actual phase and a target phase of the relative phase before first reducing the amount of the power supply supplied to the electric motor; and
the torque direction determining means is further for determining the cam torque direction based on a shift generated in the actual phase and at least one physical amount correlated with the actual phase by the feedback control of the power supply control means.

26. A valve timing control device according to claim 1, wherein:
the control unit further includes motor determining means for determining an operational state of the motor shaft; and
the power supply control means is further for stopping the power supply supplied to the electric motor when the motor determining means makes a motor stop determination that the motor shaft stops after starting an increase of the amount of the power supply supplied to the electric motor.

27. A valve timing control device according to claim 26, wherein:
the motor determining means is further for making the motor stop determination by detecting a stop of the motor shaft.

28. A valve timing control device according to claim 26, wherein:
the motor determining means is further for detecting a stop of at least one of the crank shaft and the cam shaft to estimate the stop of the motor shaft, thereby making the motor stop determination.

29. A valve timing control device according to claim 1, wherein:
the power supply control means is further for stopping the power supply to the electric motor when a set time elapses after the amount of the power supply supplied to the electric motor starts to increase.

30. A valve timing control device according to claim 1, wherein:
the control unit further includes motor determining means for determining an operational state of the motor shaft; and
the power supply control means, when the motor determining means makes an angle change determination that a rotational angle of the motor shaft changes after the power supply supplied to the electric motor stops, is further for repeating the power supply control whereby the stop of the power supply is replaced by first reducing the power supply amount to the electric motor.

31. A valve timing control device according to claim 1, wherein:
a peak value of the magnetic retaining torque is set larger than an absolute value of the cam torque acting on the motor shaft at a stop state of the internal combustion engine.

32. A valve timing control device according to claim 1, wherein:
the electric motor includes:
a motor stator forming a magnetic field by the power supply; and
a permanent magnet provided in an outer peripheral wall of the motor shaft arranged in an inner periphery side of the motor stator to rotate with the motor shaft due to torque associated with the action of the formed magnetic field of the motor stator on the permanent magnet.

* * * * *